US007688922B2

(12) United States Patent
Kondo et al.

(10) Patent No.: US 7,688,922 B2
(45) Date of Patent: Mar. 30, 2010

(54) TRANSMITTING APPARATUS AND TRANSMITTING METHOD, RECEIVING APPARATUS AND RECEIVING METHOD, TRANSCEIVER APPARATUS, COMMUNICATION APPARATUS AND METHOD, RECORDING MEDIUM, AND PROGRAM

(75) Inventors: Tetsujiro Kondo, Tokyo (JP); Hiroto Kimura, Tokyo (JP); Tsutomu Watanabe, Kanagawa (JP); Masaaki Hattori, Chiba (JP); Gakuho Fukushi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/388,980

(22) Filed: Feb. 19, 2009

(65) Prior Publication Data

US 2009/0213959 A1 Aug. 27, 2009

Related U.S. Application Data

(63) Continuation of application No. 10/521,247, filed as application No. PCT/JP03/08825 on Jul. 11, 2003, now Pat. No. 7,515,661.

(30) Foreign Application Priority Data

Jul. 16, 2002 (JP) ............................ 2002-206469

(51) Int. Cl.
*H04L 25/08* (2006.01)

(52) U.S. Cl. ....................... 375/346; 375/220; 375/285; 375/296; 370/465; 455/452; 455/513; 455/63.1; 455/114.1; 455/115.1

(58) Field of Classification Search ................. 375/140, 375/141, 146, 147, 220, 285, 296, 340, 346; 370/231, 237, 278, 282, 317, 318, 320, 331–333, 370/342, 441, 464, 465, 479; 455/436, 439, 455/442, 452.2, 13.4, 501, 507, 513, 63.1, 455/67.11, 550.1, 553.1, 114.2, 115.1, 115.3, 455/296

See application file for complete search history.

(56) References Cited

U.S. PATENT DOCUMENTS

| | | | |
|---|---|---|---|
| 5,465,399 A | 11/1995 | Oberholtzer et al. | |
| 5,701,294 A | 12/1997 | Ward et al. | |
| 5,764,699 A | 6/1998 | Needham et al. | |
| 5,982,819 A | 11/1999 | Womack et al. | |
| 6,208,663 B1 | 3/2001 | Schramm et al. | |
| 6,801,512 B1 | 10/2004 | Cudak et al. | |
| 6,901,046 B2 | 5/2005 | Hsu et al. | |
| 7,065,125 B1 * | 6/2006 | Miller et al. | 375/130 |

FOREIGN PATENT DOCUMENTS

| | | |
|---|---|---|
| EP | 1 061 473 | 12/2000 |
| JP | 2000-29497 | 1/2000 |
| JP | 2000-174897 | 6/2000 |
| JP | 2000 174897 | 6/2000 |
| JP | 2000-307720 | 11/2000 |
| JP | 2002-6900 | 1/2002 |
| JP | 2002-73097 | 3/2002 |
| JP | 2003 7720 | 1/2003 |
| WO | WO 01 02929 | 1/2001 |

OTHER PUBLICATIONS

Patent Abstracts of Japan, vol. 1995, No. 05, Jun. 30, 1995 & JP 07 036494 A (Matsushita Electric Ind. Co. Ltd.), Feb. 7, 1995.

Patent Abstracts of Japan, vol. 2002, No. 04, Aug. 4, 2002 & JP 2001 350499 A (Canon Inc.), Dec. 21, 2001.

* cited by examiner

*Primary Examiner*—Dac V Ha
(74) *Attorney, Agent, or Firm*—Frommer Lawrence & Haug LLP; William S. Frommer

(57) ABSTRACT

A transmitting apparatus, a transmitting method, a receiving apparatus, a receiving method, a transceiver, a communication apparatus and method, a recording medium, and a program in which high quality voice can be decoded. A cellular telephone outputs coded voice data and also supplies uncoded voice sample data to a switching center while a telephone call is not made. Based on voice data used for the previous calculation processing and newly input voice data, the switching center performs calculation processing for quality-improving data for improving the quality of voice to be output from a cellular telephone that receives the coded voice data. The switching center stores the optimal quality-improving data as a user information database in association with the cellular telephone. The cellular telephone decodes the coded voice data based on the optimal quality-improving data supplied from the switching center.

4 Claims, 45 Drawing Sheets

FIG. 26A

| NOISE | MODULATION METHOD | BIT RATE | CODING METHOD | CODE-BOOK | CLASS STRUCTURE | PREDICTIVE STRUCTURE | PREDICTIVE COEFFICIENT | . . . |
|---|---|---|---|---|---|---|---|---|
| HIGH | A | B | C | A | B | C | A | |
| MIDDLE | B | C | A | B | C | A | B | |
| LOW | C | A | B | C | A | B | C | |

FIG. 26B

| SIGNAL INTENSITY | MODULATION METHOD | BIT RATE | CODING METHOD | CODE-BOOK | CLASS STRUCTURE | PREDICTIVE STRUCTURE | PREDICTIVE COEFFICIENT | . . . |
|---|---|---|---|---|---|---|---|---|
| HIGH | B | C | A | B | C | A | B | |
| MIDDLE | C | A | B | C | A | B | C | |
| LOW | A | B | C | A | B | C | A | |

FIG. 26C

| FRE-QUENCY | MODULATION METHOD | BIT RATE | CODING METHOD | CODE-BOOK | CLASS STRUCTURE | PREDICTIVE STRUCTURE | PREDICTIVE COEFFICIENT | . . . |
|---|---|---|---|---|---|---|---|---|
| HIGH | C | A | B | C | A | B | C | |
| MIDDLE | A | B | C | A | B | C | A | |
| LOW | B | C | A | B | C | A | B | |

FIG. 27A

| COMMUNICATING PARTY | MODULATION METHOD | BIT RATE | CODING METHOD | CODE-BOOK | CLASS STRUCTURE | PREDICTIVE STRUCTURE | PREDICTIVE COEFFICIENT | . . . |
|---|---|---|---|---|---|---|---|---|
| FIRST USER | A | C | A | D | B | C | B | |
| SECOND USER | A | A | A | A | A | A | A | |
| THIRD USER | B | D | C | E | A | D | C | |
| FOURTH USER | B | B | C | G | C | H | D | |
| ⋮ | | | | | | | | |

FIG. 27B

| COMMUNICATING PARTY | PRIORITY | MODULATION METHOD | BIT RATE | CODING METHOD | CODE-BOOK | CLASS STRUCTURE | PREDICTIVE STRUCTURE | PREDICTIVE COEFFICIENT | . . . |
|---|---|---|---|---|---|---|---|---|---|
| FIRST USER | 1 | A | B | C | D | A | B | C | |
| | 2 | B | C | D | A | B | C | D | |
| | 3 | C | D | A | B | C | D | A | |
| | 4 | D | A | B | C | D | A | B | |
| | ⋮ | ⋮ | ⋮ | ⋮ | ⋮ | ⋮ | ⋮ | ⋮ | |

TRANSMITTING APPARATUS AND TRANSMITTING METHOD, RECEIVING APPARATUS AND RECEIVING METHOD, TRANSCEIVER APPARATUS, COMMUNICATION APPARATUS AND METHOD, RECORDING MEDIUM, AND PROGRAM

CONTINUATION DATA

This is a continuation of U.S. application Ser. No. 10/521,247 Jun. 24, 2005 now U.S. Pat. No. 7,515,661 which is a 371 of PCT/JP03/08825 filed on Jul. 11, 2003 that claims a priority to Japanese Patent Application No. 2002-206469 filed on Jul. 16, 2002, the entirety all of which being hereby incorporated herein by reference.

TECHNICAL FIELD

The present invention relates to transmitting apparatuses and transmitting methods, receiving apparatuses and receiving methods, transceiver apparatuses, communication apparatuses and methods, recording media, and programs. In particular, the invention relates to a transmitting apparatus and a transmitting method, a receiving apparatus and a receiving method, a transceiver apparatus, a communication apparatus and method, a recording medium, and a program in which communication using high quality voice can be achieved in, for example, cellular telephones.

BACKGROUND ART

In voice communication, for example, in cellular telephones, due to restricted transmission bands, the quality of the received voice is much lower than the quality of the actual voice output by a user.

Accordingly, in known cellular telephones, to improve the quality of the received voice, signal processing, such as filtering, is performed on the received voice to adjust the frequency spectrum of the voice.

However, since the characteristic of the voice varies according to the user, the quality of voice having different frequency characteristics cannot be sufficiently improved merely by performing filtering on the received voice by using a filter having the same tap coefficient.

DISCLOSURE OF INVENTION

The present invention has been made in view of the above-described background. It is an object of the present invention to obtain the sufficiently improved voice quality for each user.

A transmitting apparatus of the present invention includes: coding means for coding voice data and for outputting coded voice data; transmitting means for transmitting the coded voice data; parameter storage means for storing a parameter concerning the coding performed by the coding means and a parameter concerning the transmission performed by the transmitting means in association with specifying information for specifying a receiving side that receives the coded voice data; and parameter setting means for selecting and setting, based on the specifying information, the parameter concerning the coding performed by the coding means and the parameter concerning the transmission performed by the transmitting means stored in the parameter storage means.

A transmitting method of the present invention includes: a coding step of coding voice data and outputting coded voice data; a transmission control step of controlling the transmission of the coded voice data; a parameter storage control step of controlling the storage of a parameter concerning the coding performed by processing of the coding step and a parameter concerning the transmission controlled by processing of the transmission control step in association with specifying information for specifying a receiving side that receives the coded voice data; and a parameter setting step of selecting and setting, based on the specifying information, the parameter concerning the coding performed by the processing of the coding step and the parameter concerning the transmission controlled by the processing of the transmission control step, the storage of the parameters being controlled by processing of the parameter storage control step.

A first recording medium of the present invention includes: a coding step of coding voice data and outputting coded voice data; a transmission control step of controlling the transmission of the coded voice data; a parameter storage control step of controlling the storage of a parameter concerning the coding performed by processing of the coding step and a parameter concerning the transmission controlled by processing of the transmission control step in association with specifying information for specifying a receiving side that receives the coded voice data; and a parameter setting step of selecting and setting, based on the specifying information, the parameter concerning the coding performed by the processing of the coding step and the parameter concerning the transmission controlled by the processing of the transmission control step, the storage of the parameters being controlled by processing of the parameter storage control step.

A first program of the present invention includes: a coding step of coding voice data and outputting coded voice data; a transmission control step of controlling the transmission of the coded voice data; a parameter storage control step of controlling the storage of a parameter concerning the coding performed by processing of the coding step and a parameter concerning the transmission controlled by processing of the transmission control step in association with specifying information for specifying a receiving side that receives the coded voice data; and a parameter setting step of selecting and setting, based on the specifying information, the parameter concerning the coding performed by the processing of the coding step and the parameter concerning the transmission controlled by the processing of the transmission control step, the storage of the parameters being controlled by processing of the parameter storage control step.

A receiving apparatus of the present invention includes: receiving means for receiving coded voice data; decoding means for decoding the coded voice data received by the receiving means; parameter storage means for storing a parameter concerning the reception performed by the receiving means and a parameter concerning the decoding performed by the decoding means in association with specifying information for specifying a transmitting side that transmits the coded voice data; and parameter setting means for selecting and setting, based on the specifying information, the parameter concerning the reception performed by the receiving means and the parameter concerning the decoding performed by the decoding means stored in the parameter storage means.

A receiving method of the present invention includes: a reception control step of controlling the reception of coded voice data; a decoding step of decoding the coded voice data whose reception is controlled by processing of the reception control step; a parameter storage control step of controlling the storage of a parameter concerning the reception controlled by the processing of the reception control step and a parameter concerning the decoding performed by processing of the decoding step in association with specifying information for specifying a transmitting side that transmits the coded voice data; and a parameter setting step of selecting and setting, based on the specifying information, the parameter concerning the reception controlled by the processing of the reception control step and the parameter concerning the decoding performed by the processing of the decoding step, the storage of the parameters being controlled by processing of the parameter storage control step.

A second recording medium of the present invention includes: a reception control step of controlling reception of the coded voice data; a decoding step of decoding the coded voice data whose reception is controlled by processing of the reception control step; a parameter storage control step of controlling the storage of a parameter concerning the reception controlled by the processing of the reception control step and a parameter concerning the decoding performed by processing of the decoding step in association with specifying information for specifying a transmitting side that transmits the coded voice data; and a parameter setting step of selecting and setting, based on the specifying information, the parameter concerning the reception controlled by the processing of the reception control step and the parameter concerning the decoding performed by the processing of the decoding step, the storage of the parameters being controlled by processing of the parameter storage control step.

A second program of the present invention includes: a reception control step of controlling the reception of coded voice data; a decoding step of decoding the coded voice data whose reception is controlled by processing of the reception control step; a parameter storage control step of controlling the storage of a parameter concerning the reception controlled by the processing of the reception control step and a parameter concerning the decoding performed by processing of the decoding step in association with specifying information for specifying a transmitting side that transmits the coded voice data; and a parameter setting step of selecting and setting, based on the specifying information, the parameter concerning the reception controlled by the processing of the reception control step and the parameter concerning the decoding performed by the processing of the decoding step, the storage of the parameters being controlled by processing of the parameter storage control step.

A transceiver of the present invention includes: coding means for coding voice data and for outputting coded voice data; transmitting means for transmitting the coded voice data; first parameter storage means for storing a parameter concerning the coding performed by the coding means and a parameter concerning the transmission performed by the transmitting means in association with first specifying information for specifying a receiving side that receives the coded voice data; first parameter setting means for selecting and setting, based on the first specifying information, the parameter concerning the coding performed by the coding means and the parameter concerning the transmission performed by the transmitting means stored in the first parameter storage means; receiving means for receiving the coded voice data; decoding means for decoding the coded voice data received by the receiving means; second parameter storage means for storing a parameter concerning the reception performed by the receiving means and a parameter concerning the decoding performed by the decoding means in association with second specifying information for specifying a transmitting side that transmits the coded voice data; and second parameter setting means for selecting and setting, based on the second specifying information, the parameter concerning the reception performed by the receiving means and the parameter concerning the decoding performed by the decoding means stored in the second parameter storage means.

A first communication apparatus of the present invention includes: acquiring means for acquiring from a transceiver quality-improving data for improving the quality of decoded voice data obtained by decoding coded voice data; storage means for storing the quality-improving data acquired by the acquiring means in association with specifying information for specifying the transceiver; and supply means for supplying the quality-improving data stored in the storage means to the transceiver specified by the specifying information.

A first communication method of the present invention includes: an acquiring control step of controlling the acquisition from a transceiver quality-improving data for improving the quality of decoded voice data obtained by decoding coded voice data; a storage control step of controlling the storage of the quality-improving data whose acquisition is controlled by processing of the acquiring control step in association with specifying information for specifying the transceiver; and a supply control step of controlling the supplying of the quality-improving data whose storage is controlled by processing of the storage control step to the transceiver specified by the specifying information.

A third recording medium of the present invention includes: an acquiring control step of controlling the acquisition from the transceiver quality-improving data for improving the quality of decoded voice data obtained by decoding coded voice data; a storage control step of controlling the storage of the quality-improving data whose acquisition is controlled by processing of the acquiring control step in association with specifying information for specifying the transceiver; and a supply control step of controlling the supplying of the quality-improving data whose storage is controlled by processing of the storage control step to the transceiver specified by the specifying information.

A third program of the present invention includes: an acquiring control step of controlling the acquisition from the transceiver quality-improving data for improving the quality of decoded voice data obtained by decoding coded voice data; a storage control step of controlling the storage of the quality-improving data whose acquisition is controlled by processing of the acquiring control step in association with specifying information for specifying the transceiver; and a supply control step of controlling the supplying of the quality-improving data whose storage is controlled by processing of the storage control step to the transceiver specified by the specifying information.

A second communication apparatus of the present invention includes: acquiring means for acquiring a feature concerning the transmission and reception of coded voice data from a transceiver; calculating means for calculating quality-improving data for improving the quality of decoded voice data obtained by decoding the coded voice data based on the feature acquired by the acquiring means; and supply means for supplying the quality-improving data calculated by the calculating means to the transceiver from which the feature is acquired.

A second communication method of the present invention includes: an acquiring control step of controlling the acquisition of a feature concerning the transmission and reception of coded voice data from a transceiver; a calculating step of calculating quality-improving data for improving the quality of decoded voice data obtained by decoding the coded voice data based on the feature whose acquisition is controlled by processing of the acquiring control step; and a supply control step of controlling the supplying of the quality-improving data calculated by processing of the calculating step to the transceiver from which the feature is acquired.

A fourth recording medium of the present invention includes: an acquiring control step of controlling the acquisition of a feature concerning the transmission and reception of coded voice data from the transceiver; a calculating step of calculating quality-improving data for improving the quality of decoded voice data obtained by decoding the coded voice data based on the feature whose acquisition is controlled by processing of the acquiring control step; and a supply control step of controlling the supplying of the quality-improving data calculated by processing of the calculating step to the transceiver from which the feature is acquired.

A fourth program of the present invention includes: an acquiring control step of controlling the acquisition of a feature concerning the transmission and reception of coded voice data from the transceiver; a calculating step of calculating quality-improving data for improving the quality of decoded voice data obtained by decoding the coded voice data based on the feature whose acquisition is controlled by processing of the acquiring control step; and a supply control step of controlling the supplying of the quality-improving data calculated by processing of the calculating step to the transceiver from which the feature is acquired.

According to the transmitting apparatus, the transmitting method, and the first program of the present invention, voice data is coded, and the coded voice data is transmitted. Meanwhile, a parameter concerning the coding and a parameter concerning the transmission are stored in association with specifying information for specifying a receiving side. Based on this specifying information, the stored parameter concerning the coding and the stored parameter concerning the transmission are selected and set.

According to the receiving apparatus, the receiving method, and the second program of the present invention, coded voice data is received and decoded. A parameter concerning the reception and a parameter concerning the decoding are stored in association with specifying information for specifying a transmitting side that transmits the coded voice data. Based on the specifying information, the stored parameter concerning the reception and a parameter concerning the decoding are selected and set.

According to the transceiver of the present invention, voice data is coded and the coded voice data is output and transmitted. Meanwhile, a parameter concerning the coding a parameter concerning the transmission are stored in association with first specifying information for specifying a receiving side that receives the coded voice data. Based on the first specifying information, the stored parameter concerning the coding and the stored parameter concerning the transmission are selected and set. The coded voice data is received and decoded. Meanwhile, a parameter concerning the reception and a parameter concerning the decoding are stored in association with second specifying information for specifying a transmitting side that transmits the coded voice data. Based on the second specifying information, the stored parameter concerning the reception and the stored parameter concerning the decoding are selected and stored.

According to the first communication apparatus, the first communication method, and the third program of the present invention, quality-improving data for improving the quality of decoded voice data obtained by decoding coded voice data is obtained from a transceiver. The obtained quality-improving data is stored in association with specifying information for specifying the transceiver, and the stored quality-improving data is supplied to the transceiver specified by the specifying information.

According to the second communication apparatus, the second communication method, and the fourth program of the present invention, a feature concerning the transmission and reception of coded voice data is obtained from a transceiver. Based on the obtained feature, quality-improving data for improving the quality of decoded voice data obtained by decoding the coded voice data is calculated, and the calculated quality-improving data is the supplied to the transceiver that has sent the feature.

BRIEF DESCRIPTION OF THE DRAWINGS

FIG. 26A illustrates an example of a default database.

FIG. 26B illustrates an example of a default database.

FIG. 26C illustrates an example of a default database.

FIG. 27A illustrates an example of a user information database.

FIG. 27B illustrates an example of a user information database.

BEST MODE FOR CARRYING OUT THE INVENTION

Figure 1:
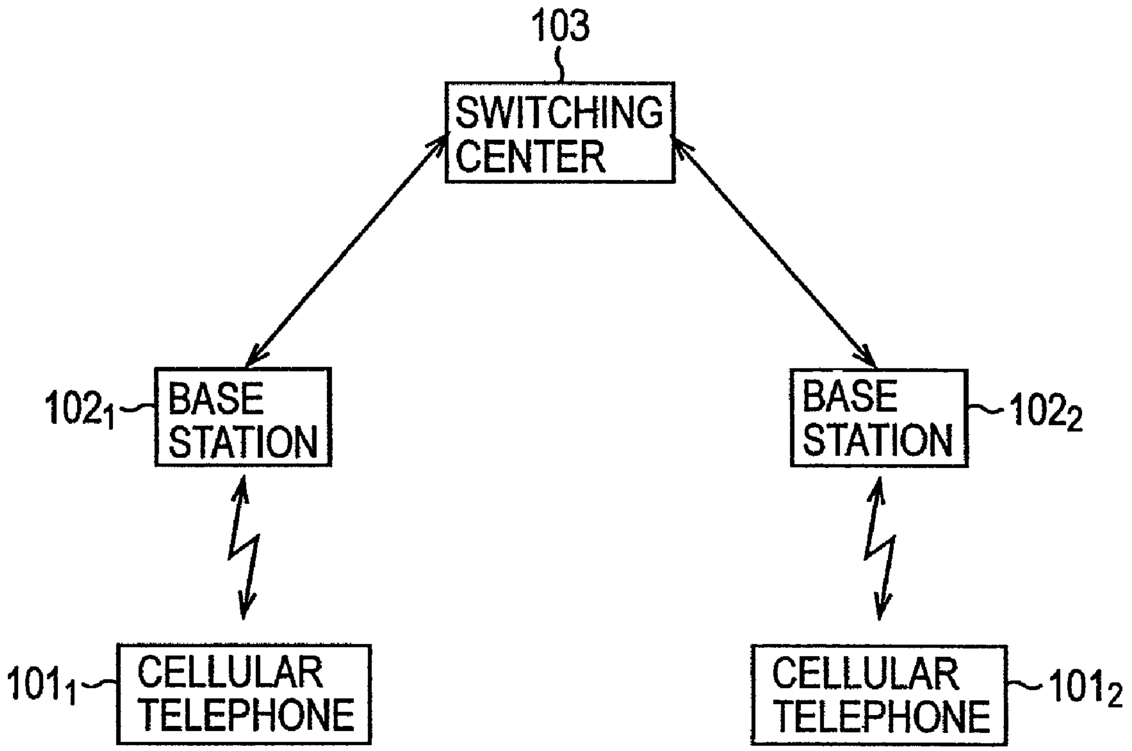
FIG. 1 is a block diagram illustrating an example of the configuration of an embodiment of a transmission system to which the present invention is applied.

FIG. 1 illustrates the configuration of an embodiment of a transmission system (system is a set of a plurality of logical units, and it is not essential that the units be in the same housing) to which the present invention is applied.

In this transmission system, cellular telephones $\mathbf{101}_1$ and $\mathbf{101}_2$ wirelessly perform transmission and reception with base stations $\mathbf{102}_1$ and $\mathbf{102}_2$, respectively, and the base stations $\mathbf{102}_1$ and $\mathbf{102}_2$ perform transmission and reception with a switching center 103. Accordingly, voice can be ultimately sent and received between the cellular telephones $\mathbf{101}_1$ and $\mathbf{101}_2$ via the base stations $\mathbf{102}_1$ and $\mathbf{102}_2$ and the switching center 103. The base stations $\mathbf{102}_1$ and $\mathbf{102}_2$ may be the same station or different stations.

The cellular telephones $\mathbf{101}_1$ and $\mathbf{101}_2$ are hereinafter referred to as the "cellular telephone 101" unless they have to be individually distinguished.

Figure 2:
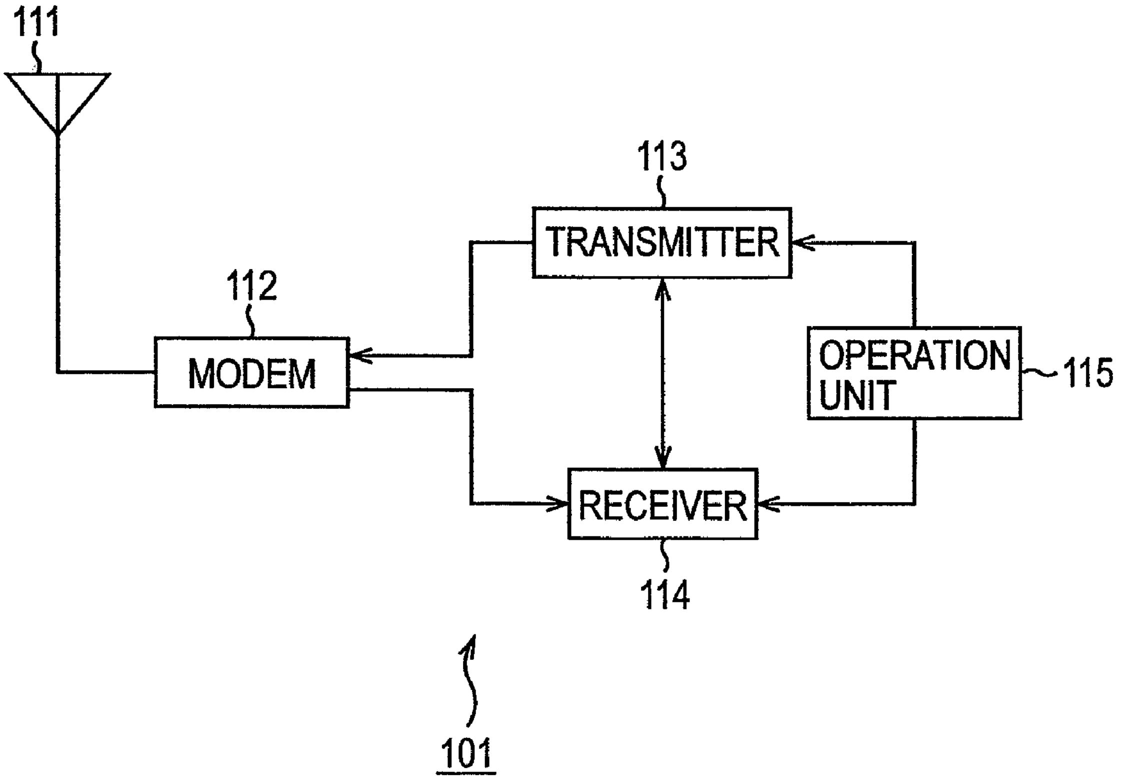
FIG. 2 is a block diagram illustrating an example of the configuration of a cellular telephone 101.

FIG. 2 illustrates an example of the configuration of the cellular telephone $\mathbf{101}_1$ shown in FIG. 1. The cellular telephone $\mathbf{101}_2$ is configured similarly to the cellular telephone $\mathbf{101}_1$, and thus, an explanation thereof is omitted.

An antenna 111 receives radio waves from the base station $\mathbf{102}_1$ or $\mathbf{102}_2$ and supplies them to a modem 112, and also transmits a signal from the modem 112 to the base station $\mathbf{102}_1$ or $\mathbf{102}_2$ by radio waves. The modem 112 demodulates a signal from the antenna 111 according to, for example, a CDMA (Code Division Multiple Access) method, and supplies the resulting demodulated signal to a receiver 114. The modem 112 also modulates transmission data supplied from a transmitter 113 according to, for example, the CDMA method, and supplies the resulting modulated signal to the antenna 111. The transmitter 113 performs predetermined processing, such as coding, on the user's voice input into the transmitter 113 to obtain transmission data, and supplies it to the modem 112. The receiver 114 receives data, which is a demodulated signal, from the modem 112, so as to decode the signal into high quality voice and outputs it.

An operation unit 115 is operated by a user when inputting the telephone number of a receiving side or predetermined commands, and an operation signal corresponding to the operation is supplied to the transmitter 113 or the receiver 114.

Information can be sent and received between the transmitter 113 and the receiver 114 if necessary.

Figure 3:
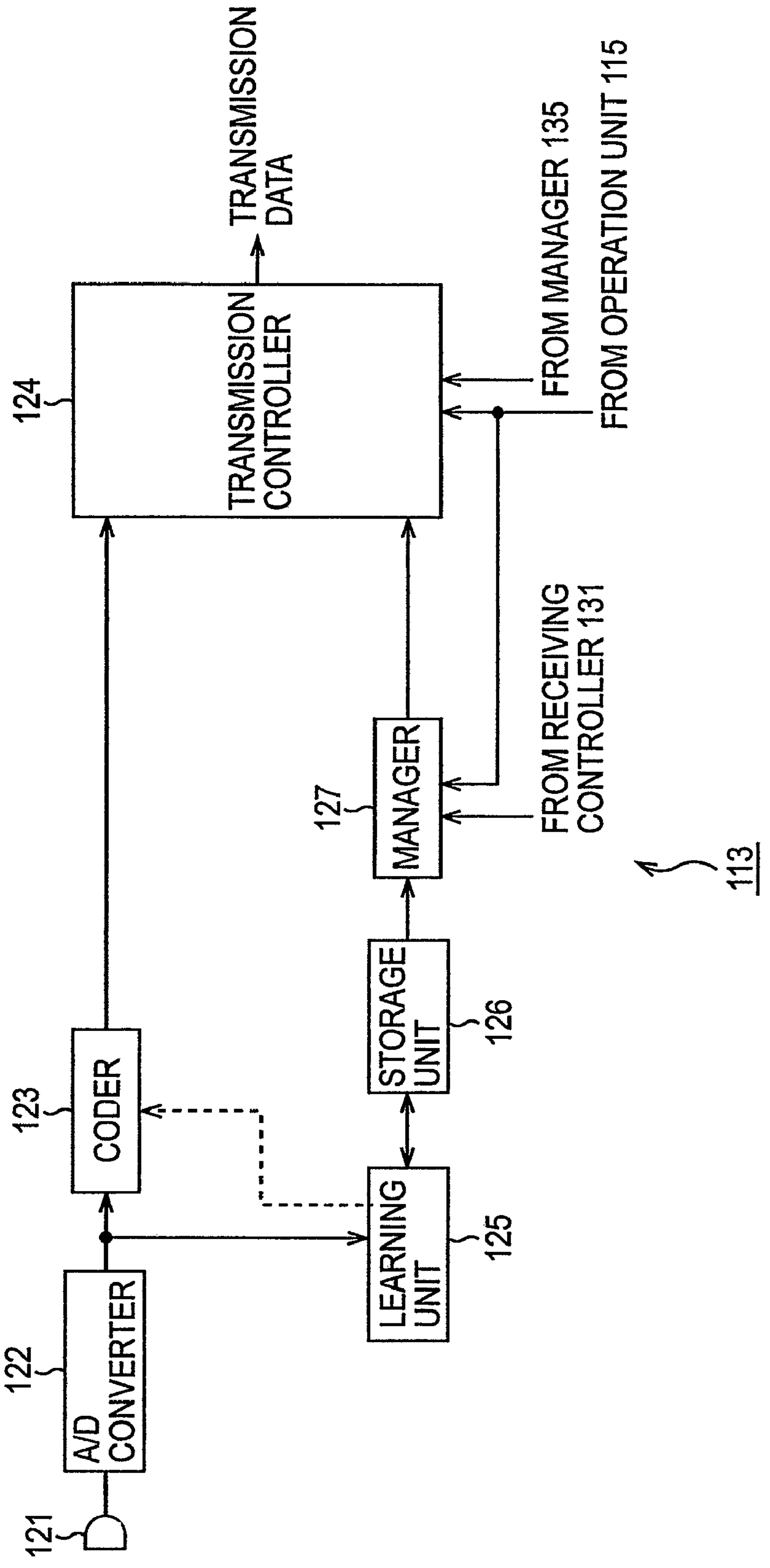
FIG. 3 is a block diagram illustrating an example of the configuration of a transmitter 113.

FIG. 3 illustrates an example of the configuration of the transmitter 113 shown in FIG. 2.

A user's voice is input into a microphone 121, and the microphone 121 outputs the user's voice as a voice signal, which is an electric signal, to an A/D (Analog/Digital) converter 122. The A/D converter 122 converts the analog voice signal from the microphone 121 into digital voice data, and outputs it to a coder 123 and a learning unit 125.

The coder 123 codes the voice data from the A/D converter 122 according to a predetermined coding method, and outputs the resulting coded voice data to a transmission controller 124.

The transmission controller 124 controls the transmission of the coded voice data output from the coder 123 and data output from a manager 127, which is described below. That is, the transmission controller 124 selects the coded voice data output from the coder 123 or the data output from the manager 127, which is discussed below, and outputs the selected data to the modem 112 (FIG. 2) as transmission data according to a predetermined transmission timing. The transmission controller 124 outputs, not only the coded voice data and quality-improving data, but also outputs, as transmission data, the telephone number of a receiving side, the telephone number of the cellular telephone 101, which is a calling side, or other information, which is input by operating the operation unit 115, if necessary.

The learning unit 125 performs learning of quality-improving data for improving the quality of voice output from a receiving side which receives the coded voice data output from the coder 123 based on voice data used for past learning and new voice data input from the A/D converter 122. When obtaining new quality-improving data by learning, the learning unit 125 supplies it to a storage unit 126.

The storage unit 126 stores the quality-improving data supplied from the learning unit 125.

The manager 127 manages the transmission of the quality-improving data stored in the storage unit 126 while referring to information supplied from the receiver 114 if necessary.

In the transmitter 113 configured as described above, the user's voice input into the microphone 121 is supplied to the coder 123 and the learning unit 125 via the A/D converter 122.

The coder 123 codes the voice data supplied from the A/D converter 122, and outputs the resulting coded voice data to the transmission controller 124. The transmission controller 124 outputs the coded voice data supplied from the coder 123 to the modem 112 (FIG. 2) as transmission data.

Meanwhile, the learning unit 125 conducts learning of quality-improving data based on the voice data used for past learning and new voice data input from the A/D converter 122, and supplies the resulting quality-improving data to the storage unit 126 and stores it therein.

In the learning unit 125, quality-improving data is learned based on, not only user's new voice data, but also voice data used for past learning. Accordingly, as the user makes a telephone call more times, quality-improving data that allows coded voice data obtained by coding the user's voice data to be decoded into higher-quality voice data can be obtained.

The manager 127 then reads the quality-improving data stored in the storage unit 126 and supplies it to the transmission controller 124 according to a predetermined timing. The transmission controller 124 outputs, according to a predetermined transmission timing, the quality-improving data output from the manager 127 to the modem 112 (FIG. 2) as the transmission data.

As described above, the transmitter 113 transmits, not only coded voice data as the voice for normal calling, but also the quality-improving data.

Figure 4:
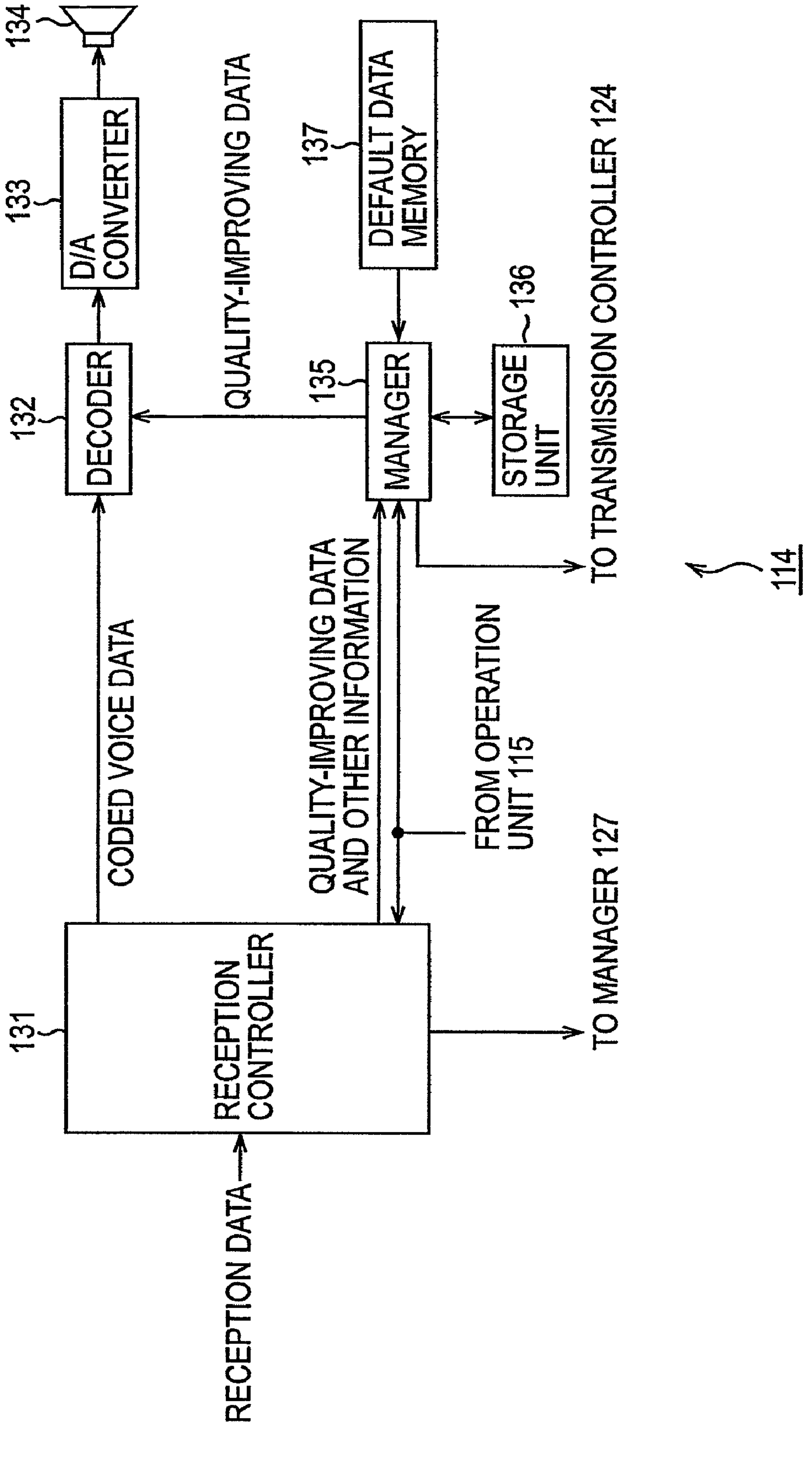
FIG. 4 is a block diagram illustrating an example of the configuration of a receiver 114.

FIG. 4 illustrates an example of the configuration of the receiver 114 shown in FIG. 2.

Reception data as a demodulated signal output from the modem 112 shown in FIG. 2 is supplied to a reception controller 131, and the reception controller 131 receives the reception data. Then, when the reception data is coded voice data, the reception controller 131 supplies it to a decoder 132, and when the reception data is quality-improving data, the reception controller 131 supplies it to a manager 135.

The reception data contains, not only the coded voice data and the quality-improving data, but also the telephone number of a calling side and other information. The reception controller 131 supplies such information to the manager 135 and the transmitter 113 (manager 127) if necessary.

The decoder 132 decodes the coded voice data supplied from the reception controller 132 by using the quality-improving data supplied from the manager 135 so as to obtain high-quality decoded voice data, and supplies it to a D/A (Digital/Analog) converter 133.

The D/A converter 133 converts the digital decoded voice data output from the decoder 132, and supplies the resulting analog voice signal to a speaker 134. The speaker 134 outputs voice corresponding to the voice signal output from the D/A converter 133.

The manager 135 manages quality-improving data. More specifically, when receiving a call, the manager 135 receives the telephone number of a calling side from the reception controller 131, and selects quality-improving data stored in a storage unit 136 or a default data memory 137 based on the telephone number and supplies the selected data to the decoder 132. The manager 135 also receives the latest quality-improving data from the reception controller 131, and updates the data stored in the storage unit 136 by the latest quality-improving data.

The storage unit 136 is formed of, for example, a writable EEPROM (Electrically Erasable Programmable Read-only Memory), and stores the quality-improving data supplied from the manager 135 in association with specifying information for specifying a calling side that has sent the quality-improving data, for example, the telephone number of the calling side.

The default memory 137 is formed of, for example, a ROM (Read-only Memory), and stores default quality-improving data in advance.

In the receiver 114 configured as described above, when receiving a call, the reception controller 131 receives the reception data and supplies the telephone number of a calling side contained in the reception data to the manager 135. The manager 135 receives, for example, the telephone number of the calling side from the reception controller 131, and, when voice communication is ready to be performed, the manager 135 performs quality-improving data setting processing for setting quality-improving data used for voice communication according to the flowchart shown in FIG. 5.

In the quality-improving data setting processing, in step S141, the manager 135 searches the storage unit 136 for the telephone number of a calling side, and proceeds to step S142. In step S142, the manager 135 determines whether the telephone number of the calling side has been found (whether it is stored in the storage unit 136) as a result of search in step S141.

If it is determined in step S142 that the telephone number of the calling side has been found, the process proceeds to step S143. In step S143, the manager 135 selects the quality-improving data associated with the telephone number of the calling side from the quality-improving data stored in the storage unit 136, and supplies the selected data to the decoder 132 and sets it. The quality-improving data setting processing is then completed.

If it is determined in step S142 that the telephone number of the calling side has not been found, the process proceeds to step S144. In step S144, the manager 135 reads the default quality-improving data (hereinafter sometimes referred to as "default data") from the default data memory 137, and supplies it to the decoder 132 and sets it. The quality-improving data setting processing is then completed.

Figure 5:
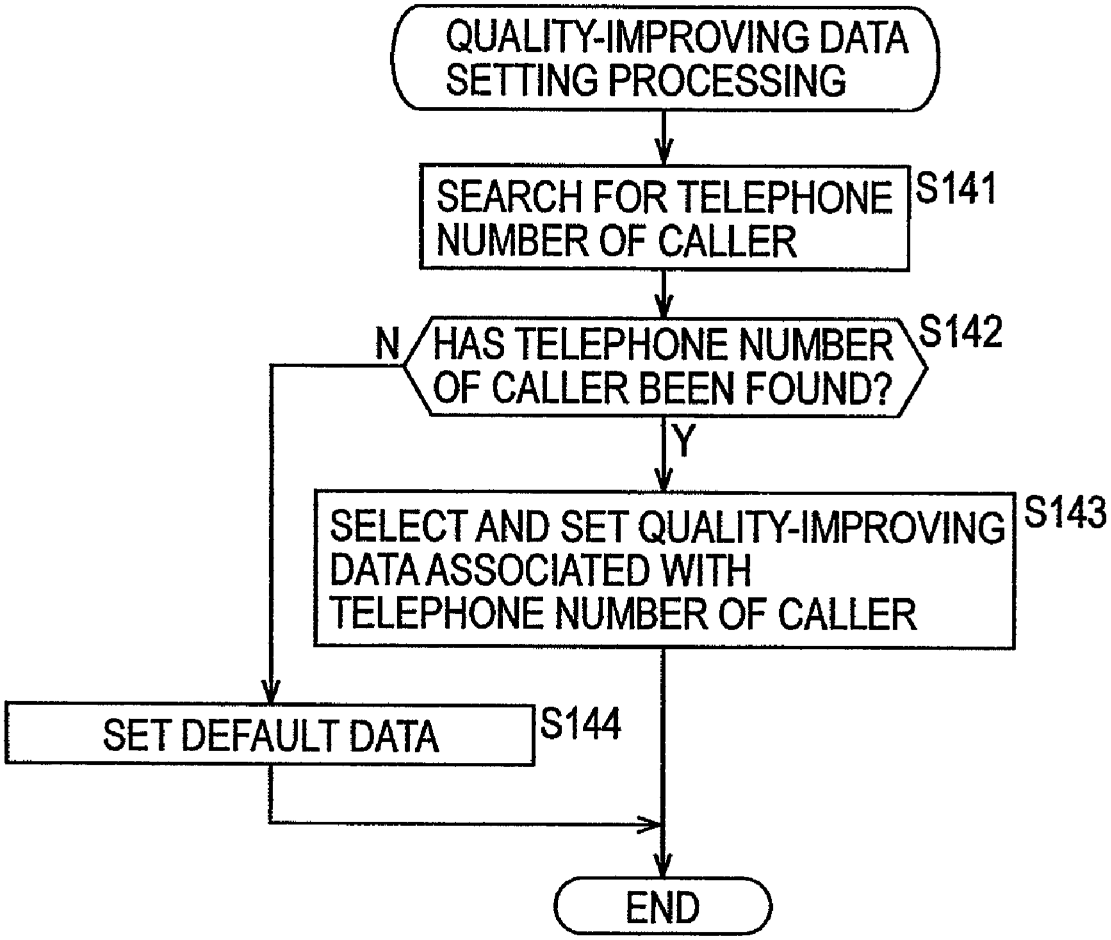
FIG. 5 is a flowchart illustrating quality-improving data setting processing performed by the receiver 114.

In the embodiment shown in FIG. 5, when the telephone number of the calling side is found, i.e., when the telephone number of the calling side is stored in the storage unit 136, the quality-improving data associated with the telephone number of the calling side is set in the decoder 132. However, even when the telephone number of the calling side has been found, the operation unit 115 (FIG. 2) may be operated to control the manager 135 to set the default data in the decoder 132.

After the quality-improving data is set in the decoder 132 as described above and when the supply of the coded voice data sent from a calling side to the reception controller 131 as the reception data is started, the coded voice data is supplied to the decoder 132 from the reception controller 131. The decoder 132 then decodes the coded voice data sent from the calling side and supplied from the reception controller 131 based on the quality-improving data set by the quality-improving data setting processing shown in FIG. 5 performed after receiving a call, i.e., the quality-improving data associated with the telephone number of the calling side, and outputs the decoded voice data. The decoded voice data is supplied to the speaker 134 from the decoder 132 via the D/A converter 133 and is output from the speaker 134.

Meanwhile, upon receiving the quality-improving data from the calling side as the reception data, the reception controller 131 supplies the quality-improving data to the manager 135. The manager 135 associates the quality-improving data supplied from the reception controller 131 with the telephone number of the calling side that has sent the quality-improving data, and supplies the quality-improving data to the storage unit 136 and stores it therein.

As discussed above, the quality-improving data stored in the storage unit 136 in association with the telephone number of the calling side has been obtained by the learning in the learning unit 125 of the transmitter 113 (FIG. 3) based on the user's voice of the calling side, and is used for decoding the coded voice data obtained by coding the user's voice of the calling side into high-quality decoded voice data.

Then, the decoder 132 of the receiver 114 decodes the coded voice data sent from the calling side based on the quality-improving data associated with the telephone number of the calling side. Accordingly, decoding processing suitable for the coded voice data sent from the calling side can be performed (different decoding processing in accordance with the characteristic of the user's voice corresponding to the coded voice data), thereby obtaining high-quality decoded voice data.

In order to obtain the high-quality decoded voice data by performing decoding processing suitable for the coded voice data sent from the calling side, as discussed above, the decoder 132 must perform processing by using the quality-improving data obtained by the learning in the learning unit 125 of the transmitter 113 (FIG. 3) of the calling side. To perform this processing, it is necessary that the quality-improving data be stored in the storage unit 136 in association with the telephone number of the calling side.

Then, the transmitter 113 (FIG. 3) of the calling side (transmitting side) performs quality-improving data transmission processing for transmitting the latest quality-improving data obtained by learning to the incoming side (receiving side). The receiver 114 of the incoming side then performs quality-improving data updating processing for updating the data in the storage unit 136 by the quality-improving data transmitted by performing the quality-improving data transmission processing at the calling side.

The quality-improving data transmission processing and the quality-improving data updating processing are described below, assuming that the cellular telephone $\mathbf{101}_1$ is a calling side and the cellular telephone $\mathbf{101}_2$ is an incoming side.

Figure 6:
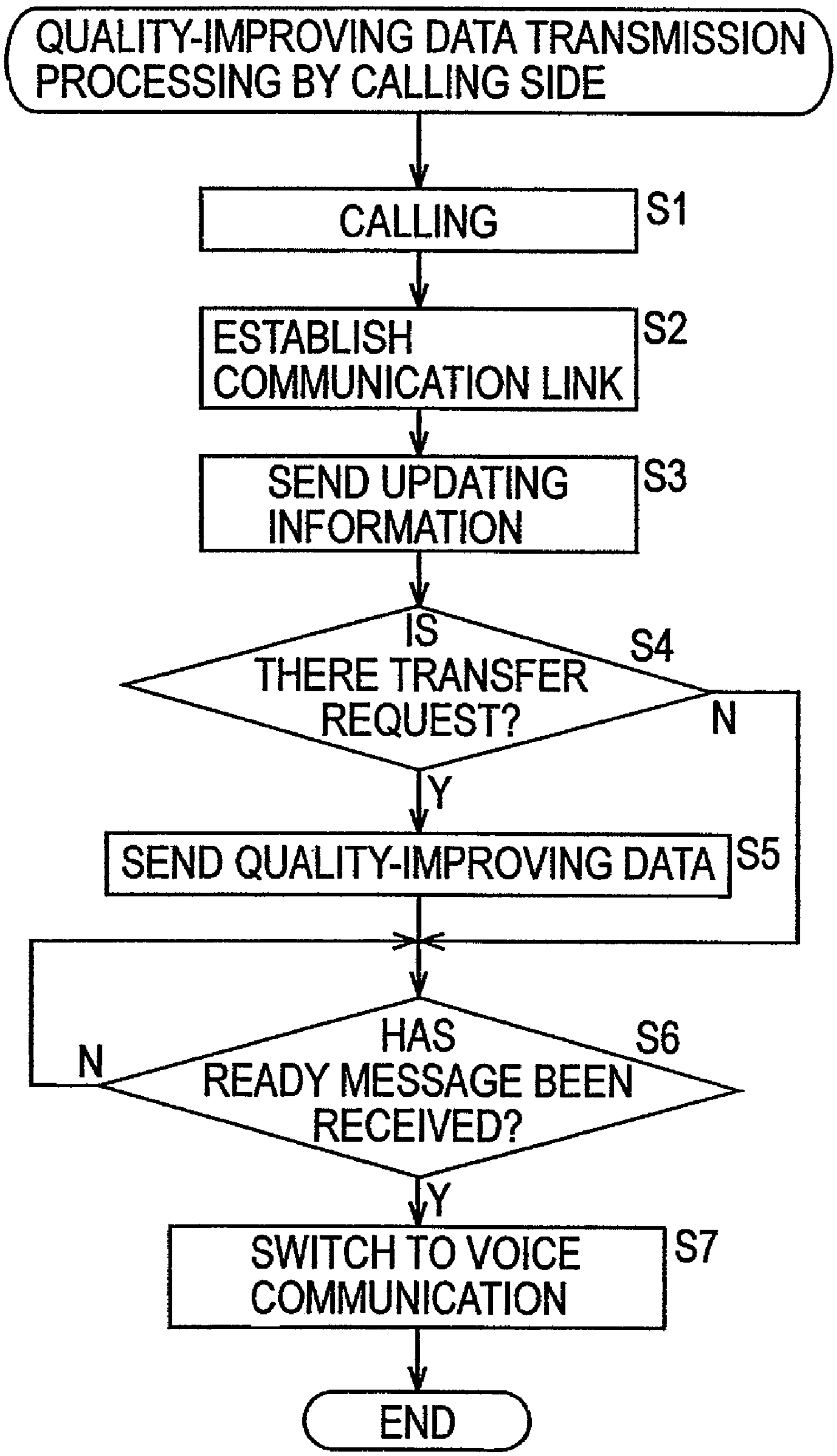
FIG. 6 is a flowchart illustrating a first embodiment of quality-improving data transmission processing by a calling side.

FIG. 6 is a flowchart illustrating a first embodiment of the quality-improving data transmission processing.

In the cellular telephone $\mathbf{101}_1$ at the calling side, when the user operates the operation unit 115 (FIG. 2) to input the telephone number of the cellular telephone $\mathbf{101}_2$ of the incoming side, the transmitter 113 starts quality-improving data transmission processing.

More specifically, in the quality-improving data transmission processing, in step S1, the transmission controller 124 of the transmitter 113 (FIG. 3) outputs the telephone number of the cellular telephone $\mathbf{101}_2$ input by operating the input unit 115 as the transmission data, thereby calling the cellular telephone $\mathbf{101}_2$.

Then, the user of the cellular telephone $\mathbf{101}_2$ operates the operation unit 115 in response to the call from the cellular telephone $\mathbf{101}_1$ to set the cellular telephone $\mathbf{101}_2$ in the off-hook state. The process then proceeds to step S2 in which the transmission controller 124 establishes a communication link with the cellular telephone $\mathbf{101}_2$, and the process proceeds to step S3.

In step S3, the manager 127 transmits updating information indicating the updating situation of the quality-improving data stored in the storage unit 126 to the transmission controller 124. The transmission controller 124 selects and outputs the updating information as the transmission data, and the process proceeds to step S4.

When obtaining new quality-improving data through learning, the learning unit 125 stores the quality-improving data in the storage unit 126 in association with the time and date (including the month and year) at which the quality-improving data was obtained. As the updating information, the time and date associated with the quality-improving data can be used.

When receiving the updating information from the cellular telephone $\mathbf{101}_1$ at the calling side, the cellular telephone $\mathbf{101}_2$ at the incoming side sends a transfer request to send the latest quality-improving data if necessary, which is discussed below. Thus, in step S4, the manager 127 determines whether a transfer request has been received from the cellular telephone $\mathbf{101}_2$ at the incoming side.

If it is determined in step S4 that a transfer request has not been received, i.e., that a transfer request from the cellular telephone $\mathbf{101}_2$ at the incoming side has not been received by the reception controller 131 of the receiver 114 of the cellular telephone $\mathbf{101}_1$ as the reception data, the process proceeds to step S6 by skipping step S5.

If it is determined in step S4 that a transfer request has been received, i.e., that a transfer request from the cellular telephone $\mathbf{101}_2$ at the incoming side has been received by the reception controller 131 of the receiver 114 of the cellular telephone $\mathbf{101}_1$ as the reception data, and the transfer request has been supplied to the manager 127 of the transmitter 113, the process proceeds to step S5. In step S5, the manager 127 reads the latest quality-improving data from the storage unit 126, and supplies it to the transmission controller 124. Also in step S5, the transmission controller 124 selects the latest quality-improving data supplied from the manager 127 and transmits it as the transmission data. It should be noted that the quality-improving data is transmitted together with the time and date at which the quality-improving data was obtained through learning, i.e., together with the updating information.

Then, the process proceeds from step S5 to step S6 in which the manager 127 determines whether a ready message has been received from the cellular telephone $\mathbf{101}_2$ at the incoming side.

That is, when normal voice communication is ready, the cellular telephone $\mathbf{101}_2$ at the incoming side sends a ready message indicating that preparations for voice communication have been finished. In step S6, such a ready message is received from the cellular telephone $\mathbf{101}_2$.

If it is determined in step S6 that a ready message has not been received, i.e., that a ready message from the cellular telephone $\mathbf{101}_2$ at the incoming side has not been received by the reception controller 131 of the receiver 114 of the cellular telephone $\mathbf{101}_1$ as the reception data, the process returns to step S6 to wait for a ready message.

If it is determined in step S6 that a ready message has been received, i.e., that a ready message from the cellular telephone $101_2$ at the incoming side has been received by the reception controller 131 of the receiver 114 of the cellular telephone $101_1$ as the reception data, and has been supplied to the manager 127 of the transmitter 113, the process proceeds to step S7. In step S7, the transmission controller 124 selects the output of the coder 123 so that voice communication can be performed, i.e., so that the coded voice data output from the coder 123 can be selected as the transmission data. The quality-improving data transmission processing is then completed.

Figure 7:
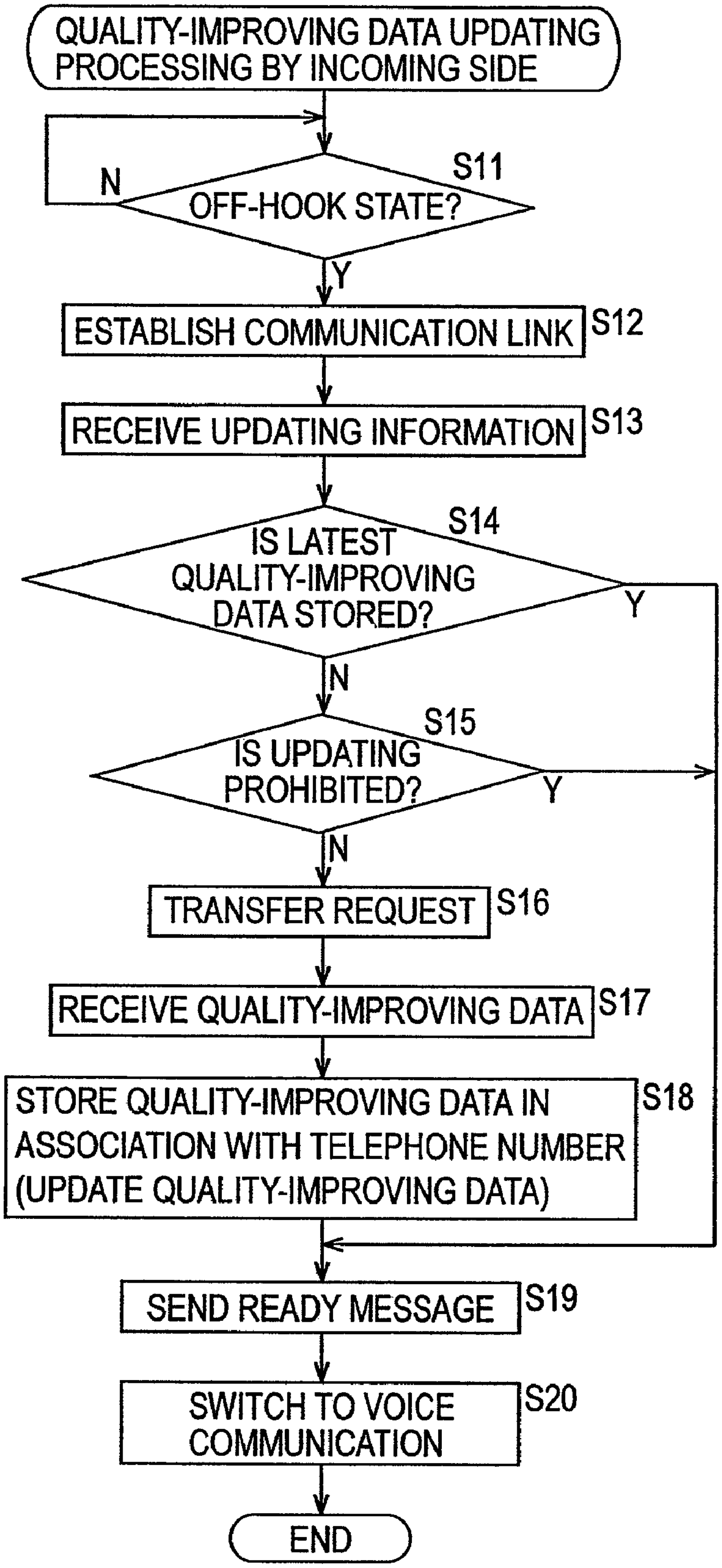
FIG. 7 is a flowchart illustrating a first embodiment of quality-improving data updating processing performed by an incoming side.

A description is now given, with reference to the flowchart of FIG. 7, of quality-improving data updating processing by the cellular telephone $101_2$ at the incoming side when the quality-improving data transmission processing shown in FIG. 6 is performed by the cellular telephone $101_1$ at the calling side.

In the cellular telephone $101_2$ at the incoming side when, for example, receiving a call, the receiver 114 (FIG. 4) starts quality-improving data updating processing.

More specifically, in the quality-improving data updating processing, in step S11, the reception controller 131 determines whether the cellular telephone $101_2$ is in the off-hook state by the user's operation on the operation unit 115. If it is determined that the cellular telephone $101_2$ is not in the off-hook state, the process returns to step S11.

If it is determined in step S11 that the cellular telephone $101_2$ is in the off-hook state, the process proceeds to step S12 in which the reception controller 131 establishes a communication link with the cellular telephone $101_1$ at the calling side. The process then proceeds to step S13.

In step S13, the updating information is sent from the cellular telephone $101_1$ at the calling side, as discussed in step S3 of FIG. 6. The reception controller 131 then receives the reception data including this updating information and supplies it to the manager 135.

In step S14, the manager 135 checks the updating information received from the cellular telephone $101_1$ at the calling side to determine whether the quality-improving data concerning the user of the cellular telephone $101_1$ at the calling side is stored in the storage unit 136.

More specifically, in communication in the transmission system shown in FIG. 1, when the cellular telephone $101_2$ (or $101_1$) at the incoming side is called by the cellular telephone $101_1$ (or $101_2$) at the calling side, the telephone number of the cellular telephone $101_1$ is transmitted, and this telephone number is received by the reception controller 131 as the reception data, and is supplied to the manager 135. The manager 135 checks whether the quality-improving data associated with the telephone number of the cellular telephone $101_1$ at the calling side is already stored in the storage unit 136, if it is stored, the manager 135 also checks whether the stored quality-improving data is the latest data, thereby executing the determination processing in step S14.

If it is determined in step S14 that the latest quality-improving data concerning the user of the cellular telephone $101_1$ at the calling side is stored in the storage unit 136, i.e., that the quality-improving data associated with the telephone number of the cellular telephone $101_1$ at the calling side is stored in the storage unit 136 and the time and date represented by the updating information associated with the quality-improving data coincides with the time and date represented by the updating information received in step S13, it is not necessary to update the quality-improving data associated with the telephone number of the cellular telephone $101_1$ stored in the storage unit 136, and the process proceeds to step S19 by skipping steps S15 through S18.

As discussed in step S5 of FIG. 6, the cellular telephone $101_1$ at the calling side transmits the quality-improving data together with the updating information. When storing the quality-improving data from the cellular telephone $101_1$ in the storage unit 136, the manager 135 of the cellular telephone $101_2$ at the incoming side stores the quality-improving data in association with the updating information, which is sent together with the quality-improving data. In step S14, it is determined whether the quality-improving data stored in the storage unit 136 is the latest data by comparing the updating information associated with the quality-improving data stored in the storage unit 136 with the updating information received in step S13.

If it is determined in step S14 that the latest quality-improving data concerning the user of the cellular telephone $101_1$ at the calling side is not stored in the storage unit 136, i.e., that the quality-improving data associated with the telephone number of the cellular telephone $101_1$ is not stored in the storage unit 136, or even if it is stored, if it is determined that the time and date represented by the updating information associated with the quality-improving data is older than that represented by the updating information received in step S13, the process proceeds to step S15. In step S15, the manager 135 determines whether the updating of the quality-improving data by the latest quality-improving data is prohibited.

That is, the user can operate the operation unit 115 to set the manager 135 such that the quality-improving data should not be updated. The manager 135 performs the determination processing in step S15 based on the setting of whether the updating of the quality-improving data is performed.

If it is determined in step S15 that the updating of the quality-improving data by the latest quality-improving data is prohibited, i.e., that the manager 135 is set such that the updating of the quality-improving data should not be updated, the process proceeds to step S19 by skipping steps S16 through S18.

If it is determined in step S15 that the updating of the quality-improving data by the latest quality-improving data is not prohibited, i.e., that the manager 135 is not set such that the updating of the quality-improving data is prohibited, the process proceeds to step S16. In step S16, the manager 135 sends a transfer request to send the latest quality-improving data to the transmission controller 124 of the transmitter 113 (FIG. 3) of the cellular telephone $101_1$ at the calling side. In response to the transfer request, the transmission controller 124 of the transmitter 113 sends a transfer request as the transmission data.

As discussed with reference to steps S4 and S5 of FIG. 6, the cellular telephone $101_1$ that has received the transfer request sends the latest quality-improving data together with the updating information. Accordingly, in step S17, the reception controller 131 receives the reception data including the latest quality-improving data and the updating information, and supplies it to the manager 135.

In step S18, the manager 135 stores the latest quality-improving data obtained in step S17 in association with the telephone number of the cellular telephone $101_1$, which was received when being called, and the updating information, which was sent together with the quality-improving data, thereby updating the content of the storage unit 136.

That is, when the quality-improving data associated with the telephone number of the cellular telephone $101_1$ at the calling side is not stored in the storage unit 136, the manager 135 stores the latest quality-improving data obtained in step S17, the telephone number of the cellular telephone $101_1$ received when being called, and the updating information (updating information of the latest quality-improving data) in the storage unit 136.

When the quality-improving data (which is not the latest data) associated with the telephone number of the cellular telephone $101_1$ is stored in the storage unit 136, the manager 135 overwrites the stored quality-improving data and the telephone number and the updating information associated with the quality-improving data by the latest quality-improving data obtained in step S17, the telephone number of the cellular telephone $101_1$ received when being called, and the updating information.

The process proceeds to step S19 in which the manager 135 controls the transmission controller 124 of the transmitter 113 to send a ready message as the transmission data indicating that preparations for voice communication have been finished, and the process then proceeds to step S20.

In step S20, the reception controller 131 outputs the coded voice data contained in the reception data to the decoder 132 so that voice communication can be performed. The quality-improving data updating processing is then completed.

Figure 8:
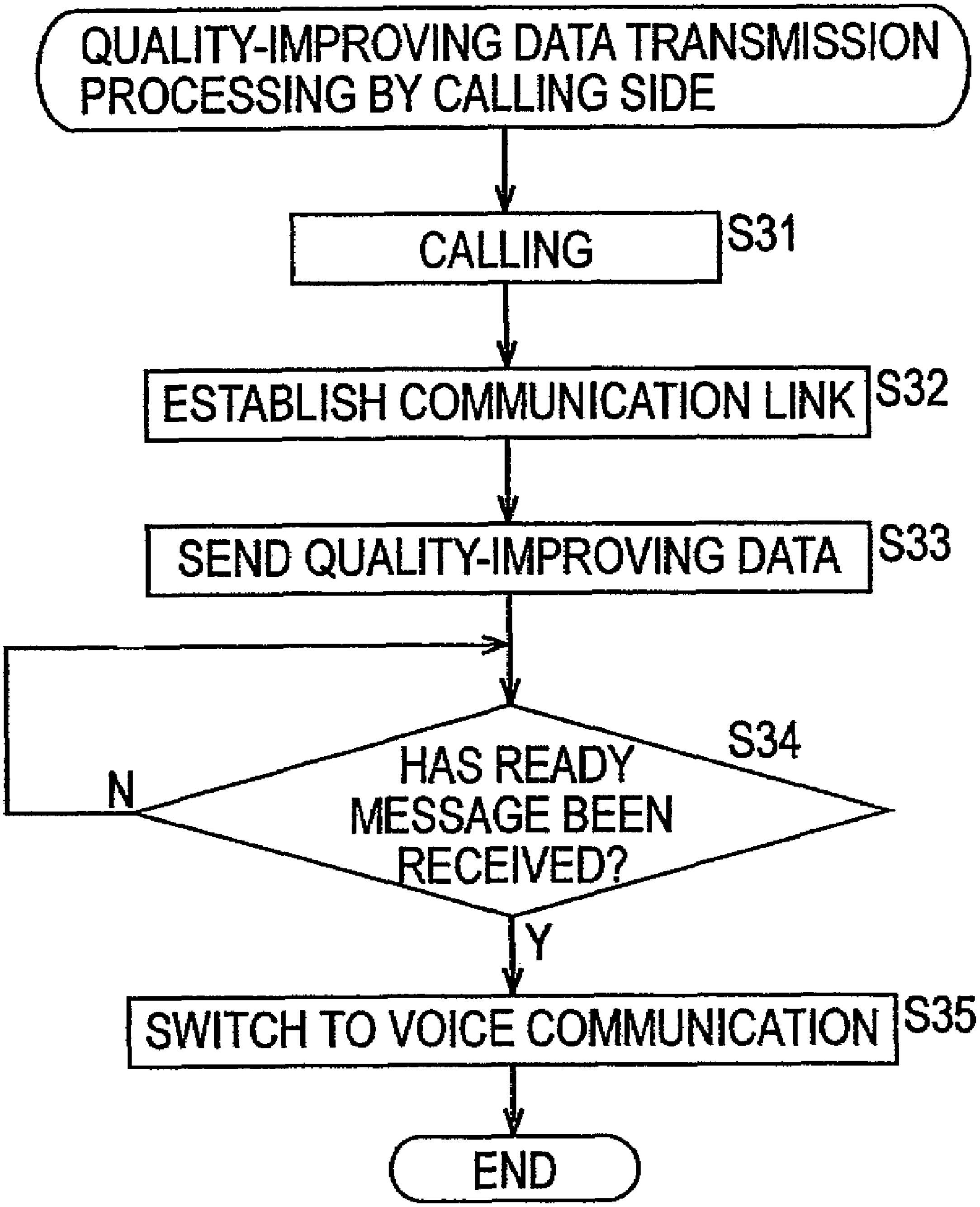
FIG. 8 is a flowchart illustrating a second embodiment of quality-improving data transmission processing by a calling side.

FIG. 8 is a flowchart illustrating a second embodiment of the quality-improving data transmission processing.

As in FIG. 6, in the cellular telephone $101_1$ at the calling side, when the user operates the operation unit 115 (FIG. 2) to input the telephone number of the cellular telephone $101_2$ at the incoming side, the transmitter 113 starts quality-improving data transmission processing.

More specifically, in the quality-improving data transmission processing, in step S31, the transmission controller 124 of the transmitter 113 (FIG. 3) outputs, as the transmission data, the telephone number of the cellular telephone $101_2$ input by the operation on the operation unit 115, thereby calling the cellular telephone $101_2$.

Then, the user of the cellular telephone $101_2$ operates the operation unit 115 in response to the call from the cellular telephone $101_1$ so as to set the cellular telephone $101_2$ in the off-hook state. Then, the process proceeds to step S32 in which the transmission controller 124 establishes a communication link with the cellular telephone $101_2$ at the incoming side, and the process proceeds to step S33.

In step S33, the manager 127 reads the latest quality-improving data from the storage unit 126 and supplies it to the transmission controller 124. Also in step S33, the transmission controller 124 selects the latest quality-improving data supplied from the manager 127 and transmits it as the transmission data. As stated above, the quality-improving data is sent together with the updating information indicating the time and date at which the quality-improving data was obtained through learning.

Then, the process proceeds from step S33 to step S34, and as in step S6 of FIG. 6, the manager 127 determines in step S34 whether a ready message has been received from the cellular telephone $101_2$ at the incoming side. If it is determined that a ready message has not been received, the process returns to step S34 to wait for a ready message.

If it is determined in step S34 that a ready message has been received, the process proceeds to step S35. As in step S7 of FIG. 6, voice communication can be performed, and the transmission controller 124 completes the quality-improving data transmission processing.

Figure 9:
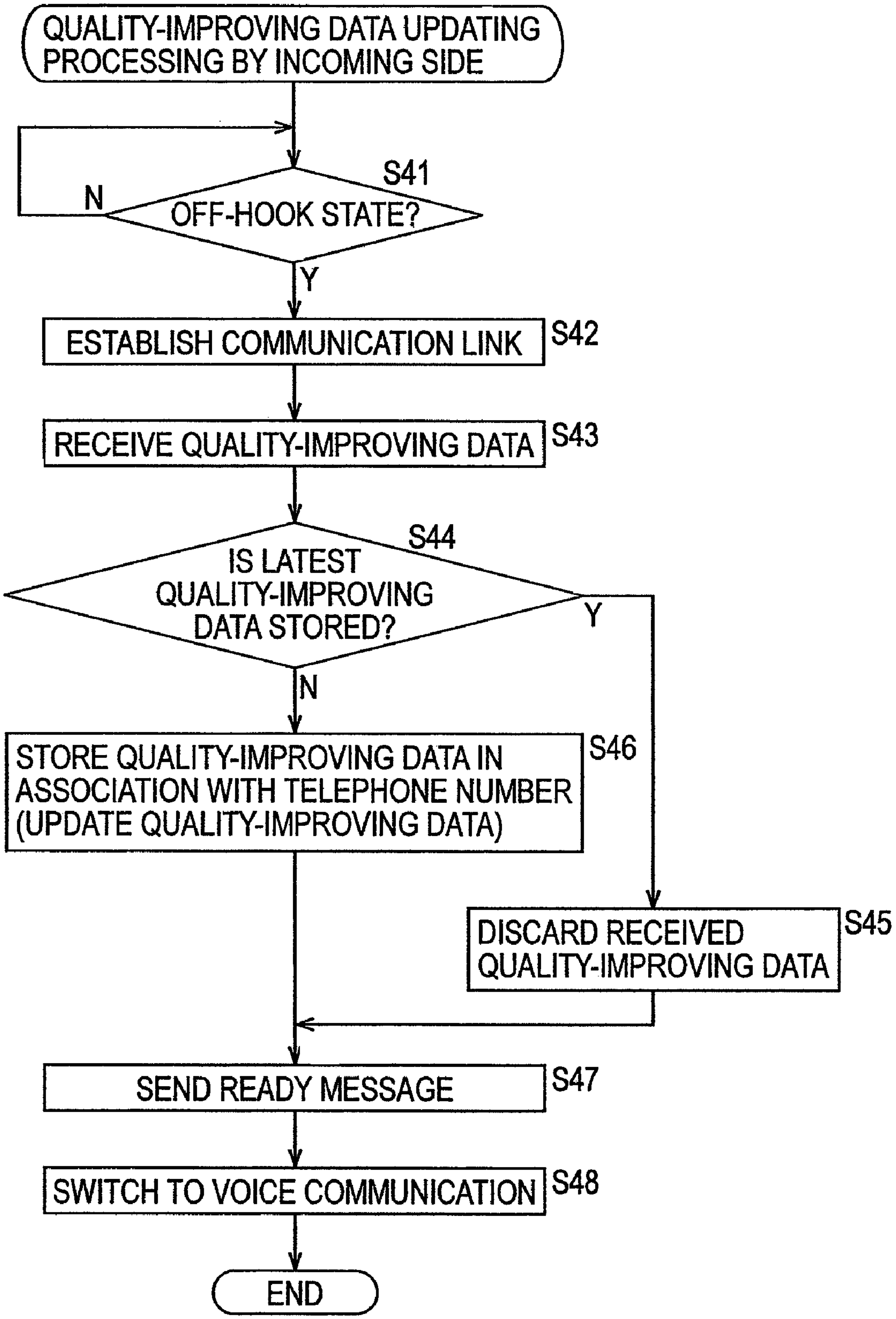
FIG. 9 is a flowchart illustrating a second embodiment of quality-improving data updating processing performed by an incoming side.

A description is now given, with reference to the flowchart of FIG. 9, of quality-improving data updating processing by the cellular telephone $101_2$ at the incoming side when the quality-improving data transmission processing shown in FIG. 8 is performed by the cellular telephone 101 at the calling side.

In the cellular telephone $101_2$ at the incoming side, as in FIG. 7, when a call is received, the receiver 114 (FIG. 4) starts quality-improving data updating processing. In step S41, the reception controller 131 determines whether the user has operated the operation unit 115 to set the cellular telephone $101_2$ in the off-hook state. If the cellular telephone $101_2$ is not in the off-hook state, the process returns to step S41.

If it is determined in step S41 that the cellular telephone $101_2$ is in the off-hook state, the process proceeds to step S42 in which a communication link is established, as in step S12 of FIG. 7. The process then proceeds to step S43 in which the reception controller 131 receives reception data containing the latest quality-improving data sent from the cellular telephone $101_1$ at the calling side, and supplies the reception data to the manager 135.

That is, as stated above, in the quality-improving data transmission processing show in FIG. 8, in step S33, the cellular telephone $101_1$ sends the latest quality-improving data together with the updating information. Accordingly, in step S43, the quality-improving data and the updating information are received.

Thereafter, the process proceeds to step S44. As in step S14 of FIG. 7, in step S44, the manager 135 checks the updating information received from the cellular telephone $101_1$ to determine whether the latest quality-improving data concerning the user of the cellular telephone $101_1$ at the calling side is stored in the storage unit 136.

If it is determined in step S44 that the latest quality-improving data concerning the user of the cellular telephone $101_1$ at the calling side is stored in the storage unit 136, the process proceeds to step S45 in which the manager 135 discards the quality-improving data and the updating information received in step S43. The process then proceeds to step S47.

If it is determined in step S44 that the latest quality-improving data concerning the user of the cellular telephone $101_1$ at the calling side is not stored in the storage unit 136, the process proceeds to step S46. In step S46, as in step S18 of FIG. 7, the manager 135 stores the latest quality-improving data obtained in step S43 in the storage unit 136 in association with the telephone number of the cellular telephone $101_1$, which was received when being called, and the updating information, which was sent together with the quality-improving data, thereby updating the content of the storage unit 136.

Then, in step S47, the manager 135 controls the transmission controller 124 of the transmitter 113 to send a ready message indicating that preparations for voice communication have been finished as the transmission data, and the process proceeds to step S48.

In step S48, the reception controller 131 outputs the coded voice data contained in the reception data to the decoder 132 so that voice communication can be performed. The quality-improving data updating processing is then completed.

In the quality-improving data updating processing shown in FIG. 9, in the cellular telephone $101_2$ at the incoming side, the content of the storage unit 136 is reliably updated if the latest quality-improving data concerning the user of the cellular telephone $101_1$ at the calling side is not stored.

Figure 10:
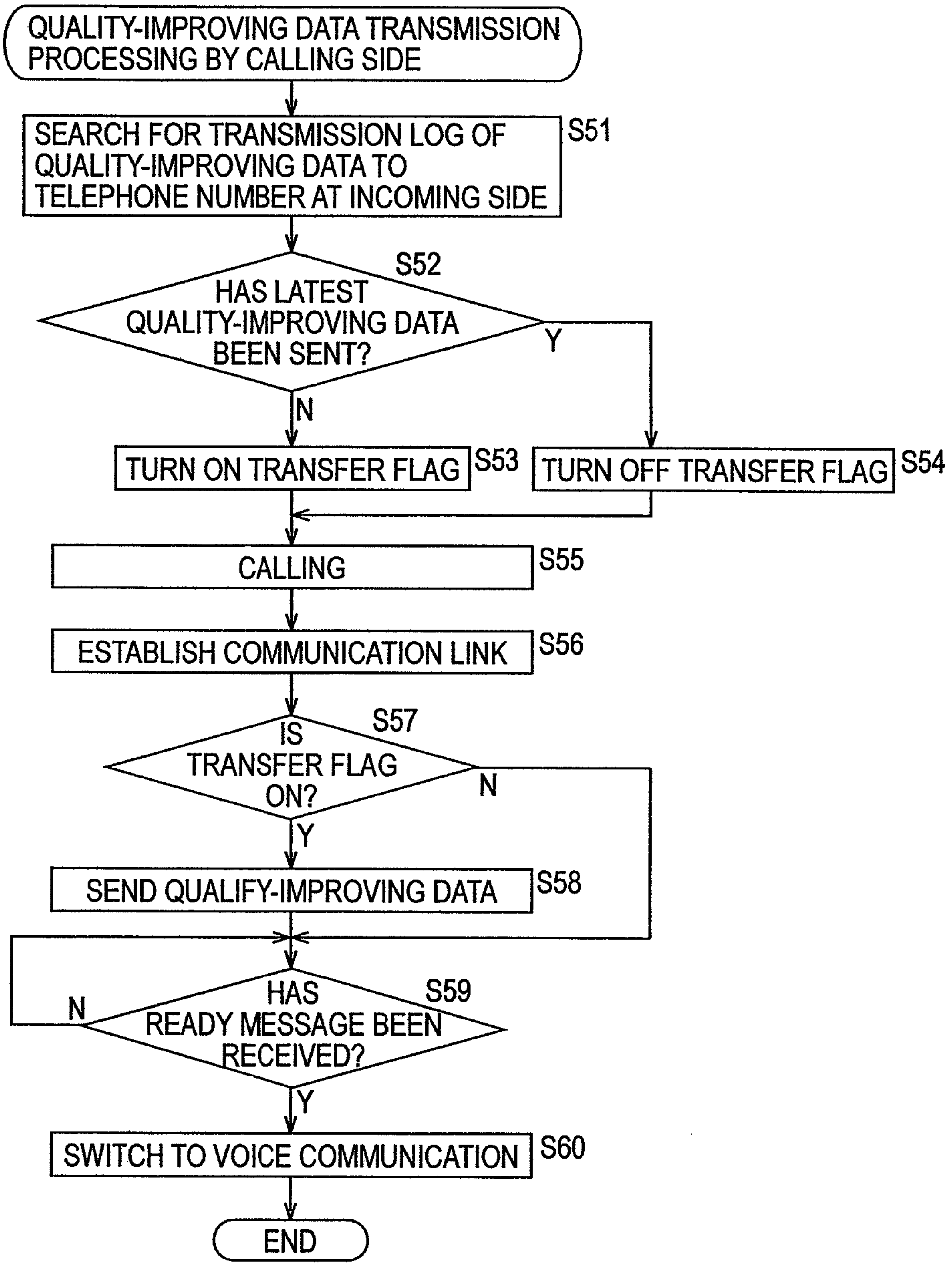
FIG. 10 is a flowchart illustrating a third embodiment of quality-improving data transmission processing by a calling side.

FIG. 10 is a flowchart illustrating a third embodiment of the quality-improving data transmission processing.

In the cellular telephone $101_1$ at the calling side, when the user operates the operation unit 115 (FIG. 2) to input the telephone number of the cellular telephone $101_2$ at the incoming side, the transmitter 113 (FIG. 3) starts quality-improving data transmission processing. In step S51, the manager 127 searches for a transmission log of the quality-improving data transmitted to the cellular telephone $101_2$ corresponding to the telephone number input by the operation on the operation unit 115.

More specifically, in the embodiment shown in FIG. 10, when sending quality-improving data to the incoming side in step S58, which is discussed below, the manager 127 stores the telephone number of the incoming side and the updating information of the quality-improving data in a built-in memory (not shown) as the transmission log of the quality-improving data. In step S51, from such stored transmission log, the transmission log in which the telephone number of the incoming side input by the operation on the operation unit 115 is indicated is searched for.

Then, the manager 127 determines in step S52 based on the search result in step S51 whether the latest quality-improving data has already been sent to the incoming side.

If it is determined in step S52 that the latest quality-improving data has not been sent to the incoming side, i.e., that the transmission log does not indicate the telephone number of the incoming side, or even if the telephone number is indicated in the transmission log, the updating information indicated in the transmission log does not coincide with the updating information of the latest quality-improving data, the process proceeds to step S53. In step S53, the manager 127 turns ON a transfer flag indicating whether to send the latest quality-improving data, and the process proceeds to step S55.

If it is determined in step S52 that the latest quality-improving data has been sent to the incoming side, i.e., that the telephone number of the incoming side is indicated in the transmission log, and that the updating information indicated in the transmission log coincides with the latest updating information, the process proceeds to step S54. In step S54, the manager 127 turns OFF the transfer flag and proceeds to step S55.

In step S55, the transmission controller 124 outputs the telephone number of the cellular telephone $\mathbf{101_2}$ at the incoming side input by the operation on the operation unit 115 as the transmission data, thereby calling the cellular telephone $\mathbf{101_2}$.

Then, when the user of the cellular telephone $\mathbf{101_2}$ operates the operation unit 115 in response to a call from the cellular telephone $\mathbf{101_1}$ so as to set the cellular telephone $\mathbf{101_2}$ in the off-hook state, the process proceeds to step S56 in which the transmission controller 14 establishes a communication link with the cellular telephone $\mathbf{101_2}$ at the incoming side. The process then proceeds to step S57.

In step S57, the manager 127 determines whether the transfer flag is ON, and if the manager 127 determines that the transfer flag is not ON, i.e., that the transfer flag is OFF, the process proceeds to step S59 by skipping step S58.

If it is determined in step S57 that the transfer flag is ON, the process proceeds to step S58 in which the manager 127 reads the quality-improving data and updating information from the storage unit 126, and supplies them to the transmission controller 124. Also in step S58, the transmission controller 124 selects the latest quality-improving data and updating information supplied from the manager 127 and sends them as the transmission data. In step S58, the manager 127 stores the telephone number (telephone number of the incoming side) of the cellular telephone $\mathbf{101_2}$ to which the latest quality-improving data and the updating information are sent as the transmission log, and the process proceeds to step S59.

In step S59, as in step S6 of FIG. 6, the manager 127 determines whether a ready message has been received from the cellular telephone $\mathbf{101_2}$ at the incoming side. If the manager 127 determines that a ready message has not been received, the process returns to step S59 to wait for a ready message.

If it is determined in step S59 that a ready message has been received, the process proceeds to step S60 in which voice communication can be performed, and the transmission controller 124 completes the quality-improving data transmission processing.

Figure 11:
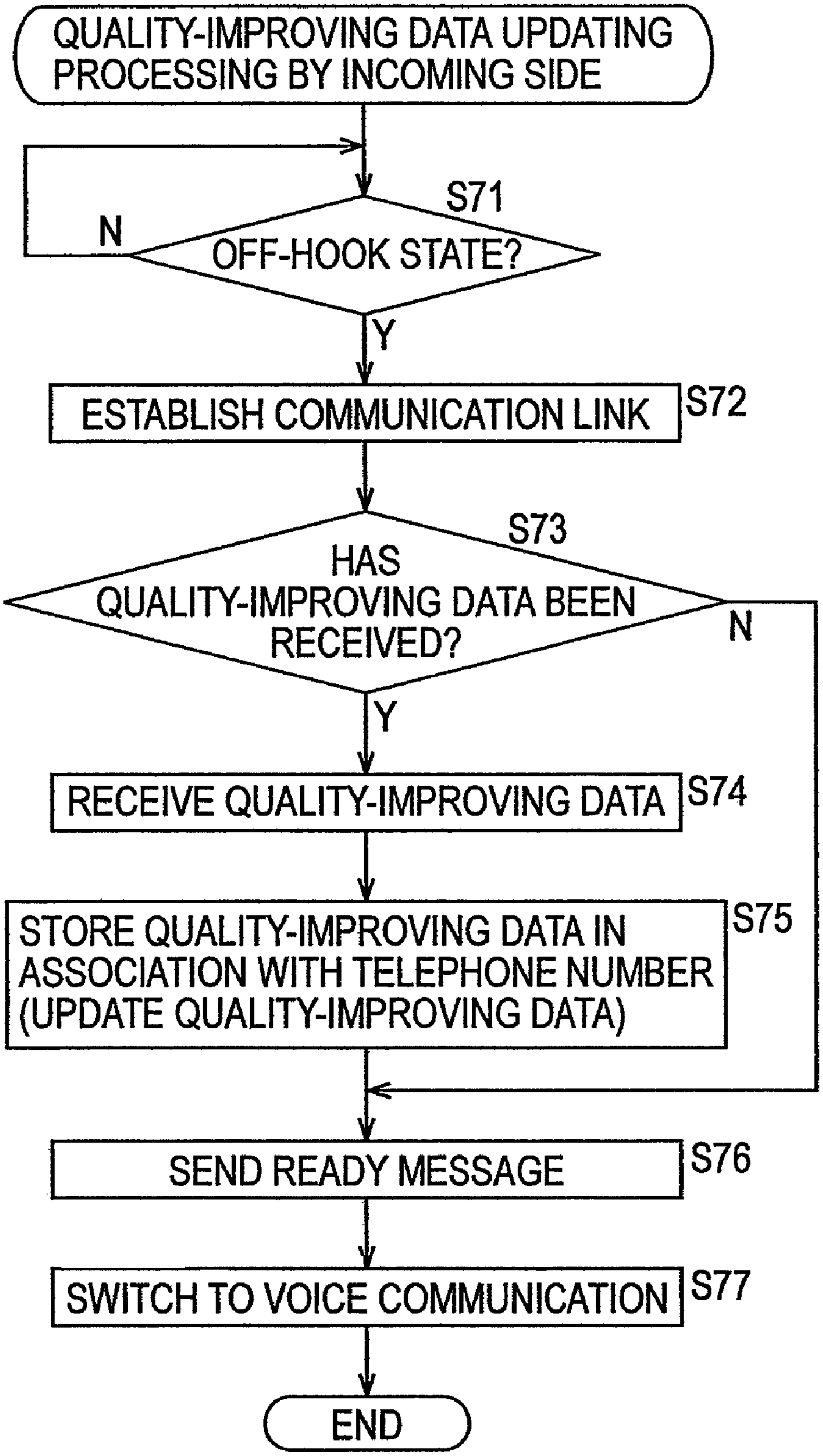
FIG. 11 is a flowchart illustrating a third embodiment of quality-improving data updating processing performed by an incoming side.

A description is now given, with reference to the flowchart of FIG. 11, of quality-improving data updating processing by the cellular telephone $\mathbf{101_2}$ at the incoming side when the quality-improving data transmission processing shown in FIG. 10 is performed by the cellular telephone $\mathbf{101_1}$ at the calling side.

In the cellular telephone $\mathbf{101_2}$ at the incoming side, when, for example, a call is received, the receiver 114 (FIG. 4) starts quality-improving data updating processing.

More specifically, in the quality-improving data updating processing, in step S71, the reception controller 131 determines whether the user operates the operation unit 115 to set the cellular telephone $\mathbf{101_2}$ in the off-hook state. If it is determined that the cellular telephone $\mathbf{101_2}$ is not in the off-hook state, the process returns to step S71.

If it is determined in step S71 that the cellular telephone $\mathbf{101_2}$ is in the off-hook state, the process proceeds to step S72 in which the reception controller 131 establishes a communication link with the cellular telephone $\mathbf{101_1}$ at the calling side, and the process proceeds to step S73.

The reception controller 131 determines in step S73 whether the quality-improving data has been received, and if it is found that the quality-improving data has not been received, the process proceeds to step S76 by skipping steps S74 and S75.

If it is determined in step S73 that the quality-improving data has been received, i.e., that the latest quality-improving data and the updating information have been sent from the cellular telephone $\mathbf{101_1}$ at the calling side in step S58 of FIG. 10, the process proceeds to step S74. In step S74, the reception controller 131 receives the reception data including the latest quality-improving data and the updating information, and supplies it to the manager 135.

In step S75, as in step S18 of FIG. 7, the manager 135 stores the latest quality-improving data obtained in step S74 in the storage unit 136 in association with the telephone number of the cellular telephone $\mathbf{101_1}$ at the calling side, which was received when being called, and the updating information, which was sent together with the quality-improving data, thereby updating the content of the storage unit 136.

Then, the process proceeds to step S76 in which the manager 135 controls the transmission controller 124 of the transmitter 113 to send a ready message as the transmission data indicating that preparations for voice communication have been finished. The process then proceeds to step S77.

In step S77, voice communication can be performed, and the reception controller 131 completes the quality-improving data updating processing.

The quality-improving data transmission processing or the quality-improving data updating processing described with reference to one of FIGS. 6 through 11 is performed when a telephone call is made or when a call is received, respectively. However, the quality-improving data transmission processing or the quality-improving data updating processing may be performed at another time.

Figure 12:
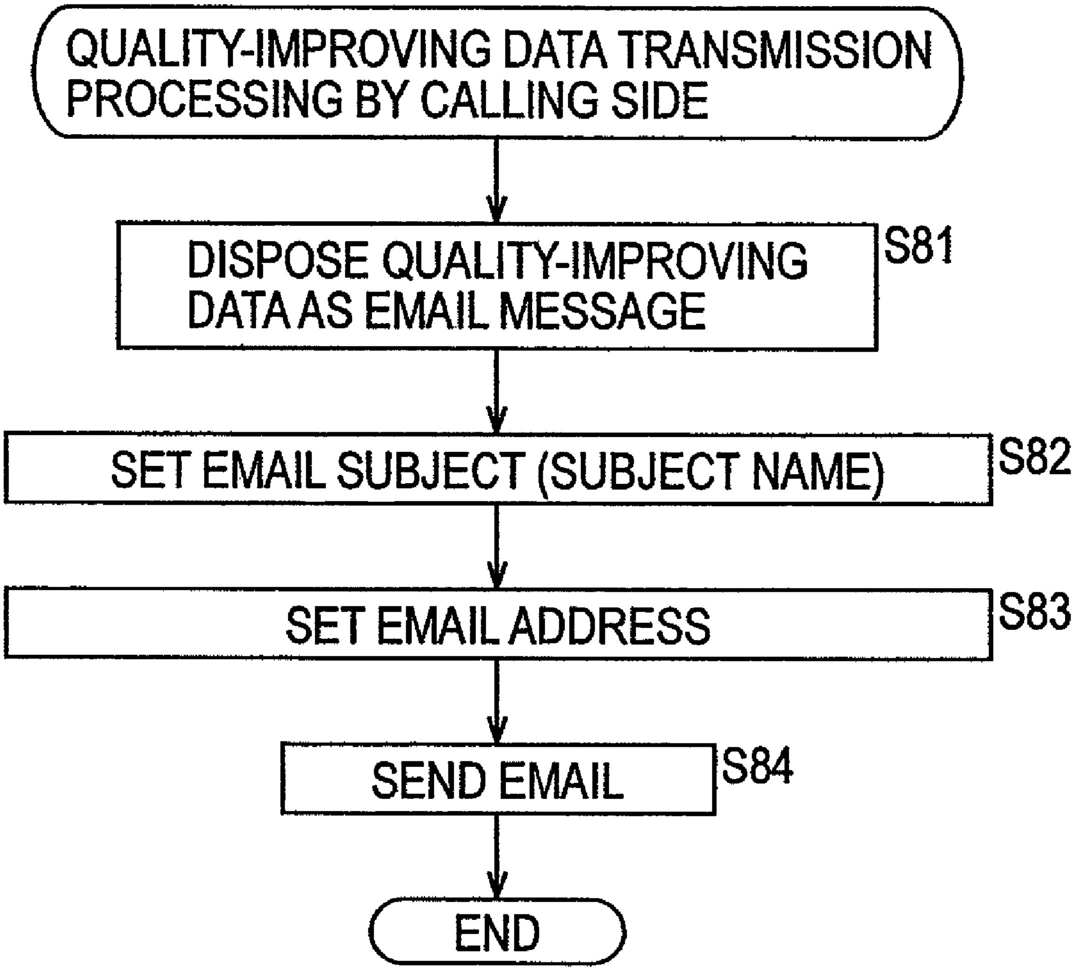
FIG. 12 is a flowchart illustrating a fourth embodiment of quality-improving data transmission processing by a calling side.

FIG. 12 is a flowchart illustrating quality-improving data transmission processing performed by the transmitter 113 (FIG. 3) in the cellular telephone $\mathbf{101_1}$ at the calling side after obtaining the latest quality-improving data through learning.

In step S81, the manager 127 disposes the latest quality-improving data, updating information thereof, and the telephone number of the cellular telephone $\mathbf{101_1}$ stored in the storage unit 126 as an email message, and the process proceeds to step S82.

In step S82, the manager 127 sets a subject (subject name) indicating that the email (hereinafter sometimes referred to as the "quality-improving-data transmission email") contains the latest quality-improving data as the subject of the email in which the latest quality-updating data, updating information thereof, and the telephone number of the cellular telephone $\mathbf{101_1}$ are disposed as a message. That is, the manager 127 sets, for example, an "updating notice", as the subject of the quality-improving-data transmission email.

Then, the process proceeds to step S83 in which the manager 127 sets an email address, which is a destination for the email, in the quality-improving-data transmission email. In this case, for example, the email addresses of communicating parties sent and received in the past have been stored, and as the email address, which is the destination of the quality-improving-data transmission email, all the email addresses stored or email addresses specified by the user can be set.

The process then proceeds to step S84 in which the manager 127 supplies the quality-improving-data transmission email to the transmission controller 124, and allows it to send the email as transmission data. The quality-improving data transmission processing is then completed.

The quality-improving-data transmission email sent as described above is received by the terminal of the email address set as the destination of the quality-improving-data transmission email via a predetermined server.

Figure 13:
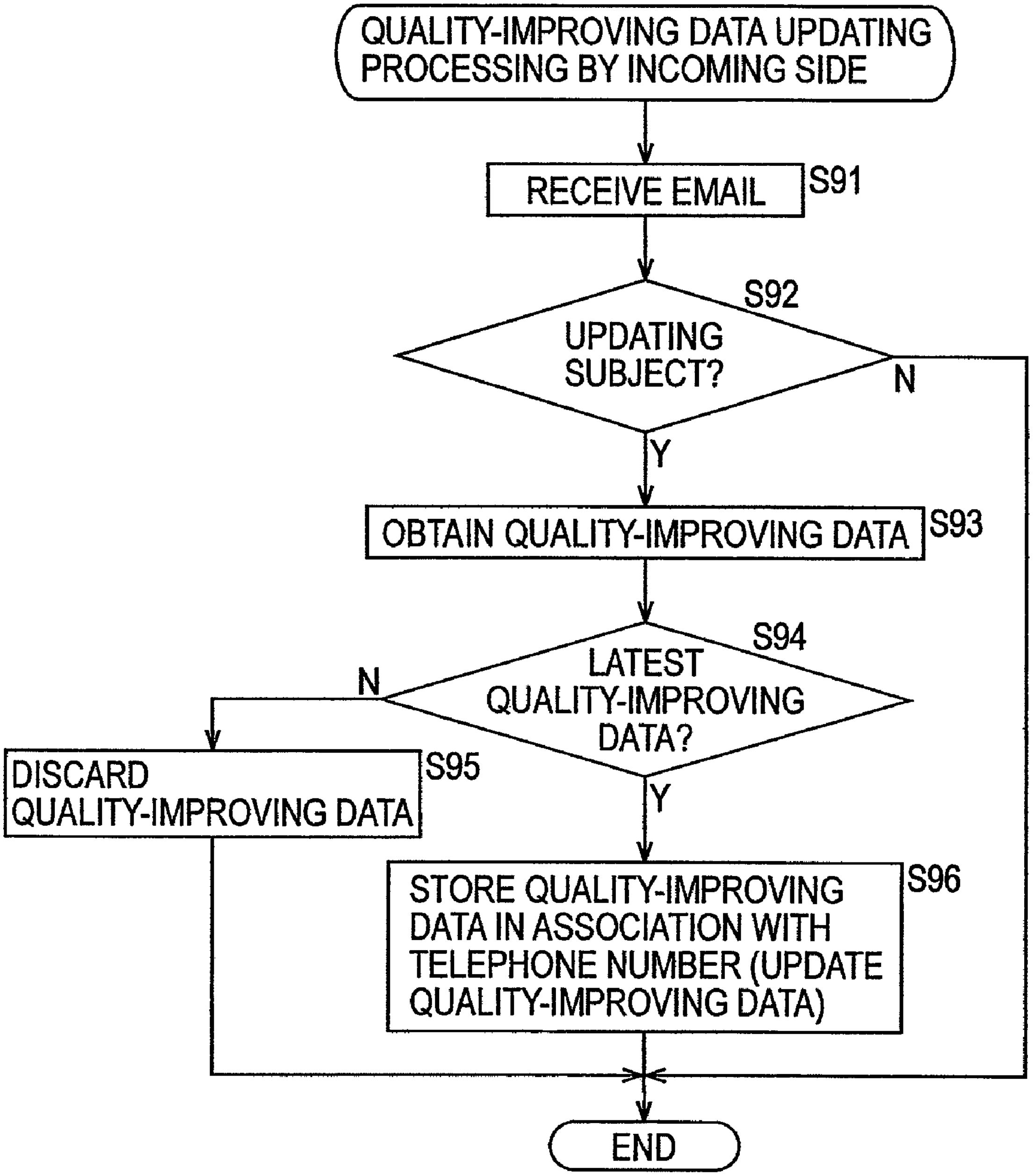
FIG. 13 is a flowchart illustrating a fourth embodiment of quality-improving data updating processing performed by an incoming side.

A description is now given, with reference to the flowchart of FIG. 13, of quality-improving data updating processing performed by the cellular telephone $\mathbf{101}_2$ at the incoming side when the quality-improving data transmission processing shown in FIG. 12 is performed by the cellular telephone $\mathbf{101}_1$ at the calling side.

In the cellular telephone $\mathbf{101}_2$ at the incoming side, the reception of email is requested to a predetermined mail server, for example, at a predetermined time or in response to a user's instruction. In response to this request, the quality-improving data updating processing is performed in the receiver 114 (FIG. 4).

More specifically, in step S91, email sent from the mail server in response to the above-described request is received by the reception controller 131 as reception data, and is supplied to the manager 135.

The manager 135 determines in step S92 whether the subject of the email supplied from the reception controller 131 is an "updating notice" indicating that the email contains the latest quality-improving data. If it is determined that the subject of the email is not an "updating notice", i.e., that the email is not quality-improving-data transmission email, the quality-improving data updating processing is terminated.

If it is determined in step S92 that the email subject is an "updating notice", i.e., that the email is quality-improving-data transmission email, the process proceeds to step S93. In step S93, the manager 135 obtains the latest quality-improving data, the updating information, and the telephone number of the calling side disposed as the quality-improving-data transmission email message, and the process proceeds to step S94.

In step S94, as in step S14 of FIG. 7, the manager 135 determines by checking the updating information and the telephone number at the calling side obtained from the quality-improving-data transmission email whether the latest quality-improving data concerning the user of the cellular telephone $\mathbf{101}_1$ at the calling side is stored in the storage unit 136.

If it is determined in step S94 that the latest quality-improving data concerning the user of the cellular telephone $\mathbf{101}_1$ at the calling is stored in the storage unit 136, the process proceeds to step S95. In step S95, the manager 135 discards the quality-improving data, the updating information, and the telephone number obtained in step S93, and completes the quality-improving data updating processing.

If it is determined in step S94 that the latest quality-improving data concerning the user of the cellular telephone $\mathbf{101}_1$ at the calling side is not stored in the storage unit 136, the process proceeds to step S96. In step S96, as in step S18 of FIG. 7, the manager 135 stores the quality-improving data, the updating information, and the telephone number of the cellular telephone $\mathbf{101}_1$ at the calling side obtained in step S93 in the storage unit 136, thereby updating the content of the storage unit 136. The quality-improving data updating processing is then completed.

Figure 14:
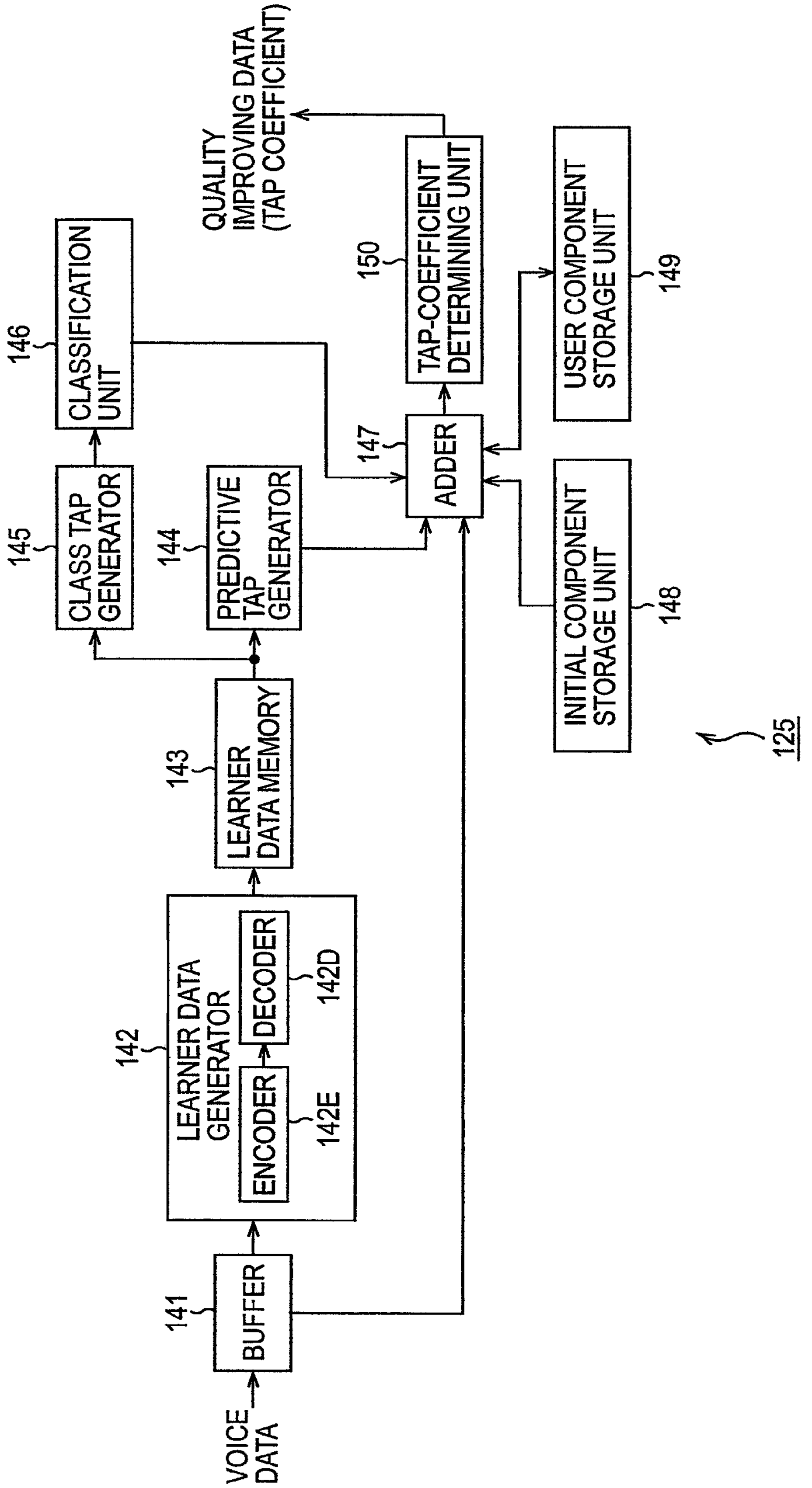
FIG. 14 is a block diagram illustrating an example of the configuration of a learning unit 125.

FIG. 14 illustrates an example of the configuration of the learning unit 125 of the transmitter 113 shown in FIG. 3.

In the embodiment shown in FIG. 14, the learning unit 125 learns, as quality-improving data, tap coefficients used for classification adaptive processing which was previously proposed by the same applicant of the present application.

Classification processing is formed of classification processing and adaptive processing. Data is classified based on the characteristic of the data by the classification processing, and adaptive processing is performed on each class.

The adaptive processing is described below by taking an example in which voice at a low quality (hereinafter sometimes referred to as a "low quality voice") is converted into voice at a high quality (hereinafter sometimes referred to as a "high quality voice").

In this case, in the adaptive processing, by a linear combination of voice samples forming the low quality voice (hereinafter sometimes referred to as "low quality voice samples") and predetermined tap coefficients, a predictive value of a voice sample of a high quality voice improved from the low quality voice is determined, thereby obtaining a high quality voice improved from the low quality voice.

More specifically, it is now considered that certain high quality voice data is set as supervisor data and low voice quality data obtained by decreasing the quality of the high quality voice is set as learner data, and a predictive value E[y] of a voice sample γ forming the high quality voice (hereinafter sometimes referred to as a "high quality voice sample") is determined by a linear combination model defined by a linear combination of a set of some low quality voice samples (voice samples forming the low quality voice) $x_1, x_2, \ldots$ and predetermined tap coefficients $w_1, w_2, \ldots$. In this case, the predictive value E[y] can be expressed by the following equation.

$$E[y]=w_1x_1+w_2x_2+\ldots \tag{1}$$

To generalize equation (1), a matrix W consisting of a set of tap coefficients $w_j$, a matrix X consisting of a set of learner data $x_{ij}$, and a matrix Y' formed of a set of predictive values $E[y_j]$ are defined as follows.

[Mathematical Equation 1]

$$X=\begin{pmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{pmatrix}$$

$$W=\begin{pmatrix} w_1 \\ w_2 \\ \cdots \\ w_J \end{pmatrix},$$

$$Y'=\begin{pmatrix} E[y_1] \\ E[y_2] \\ \cdots \\ E[y_J] \end{pmatrix}$$

Then, the following observation equation can hold true.

$$XW=Y' \tag{2}$$

The component $x_{ij}$ of the matrix X indicates the j-th learner data of the i-th set of learner data (set of learner data used for predicting the i-th supervisor data $y_i$), and the component $w_j$ of the matrix W indicates the tap coefficient to be multiplied with the j-th learner data in the set of learner data. Also, $y_i$ indicates the i-th supervisor data, and thus, $E[y_i]$ represents the predictive value of the i-th supervisor data. In γ at the left side in equation (1), the suffix i of the component $y_i$ of the matrix Y is omitted, and in $x_1, x_2, \ldots$ at the right side in equation (1), the suffix of the component $x_{ij}$ of the matrix X is also omitted.

It is now considered that the predictive value E[y] close to the high quality voice sample γ is determined by applying the method of least squares to the observation equation (2). In this case, when the matrix E consisting of the residuals (errors with respect to the true values y) e between the matrix Y consisting of a set of true values γ of the high quality voice samples serving as supervisor data and the predictive values E[y] of the high quality voice samples γ can be defined as follows.

[Mathematical Equation 2]

$$E = \begin{pmatrix} e_1 \\ e_2 \\ \cdots \\ e_I \end{pmatrix}, \quad Y = \begin{pmatrix} y_1 \\ y_2 \\ \cdots \\ y_I \end{pmatrix}$$

Then, the following residual equation can hold true from equation (2).

$$XW=Y+E \tag{3}$$

In this case, the tap coefficient $w_j$ for determining the predictive value E[y] close to the high quality voice sample y can be determined by minimizing the following square error.

[Mathematical Equation 3]

$$\sum_{i=1}^{I} e_i^2$$

Accordingly, the tap coefficient when the result of differentiating the above-described square error with respect to the tap coefficient $w_j$ becomes 0, i.e., the tap coefficient $w_j$ satisfying the following equation is the optimal value for determining the predictive value E[y] close to the high quality voice sample y.

[Mathematical Equation 4]

$$e_1\frac{\partial e_1}{\partial w_j} + e_2\frac{\partial e_2}{\partial w_j} + \ldots + e_I\frac{\partial e_I}{\partial w_j} = 0 \quad (j = 1, 2, \ldots, J) \tag{4}$$

Then, by differentiating equation (3) with respect to the tap coefficient $w_j$, the following equation can hold true.

[Mathematical Equation 5]

$$\frac{\partial e_i}{\partial w_1} = x_{i1}, \quad \frac{\partial e_i}{\partial w_2} = x_{i2}, \ldots, \quad \frac{\partial e_i}{\partial w_J} = x_{iJ}, \quad (i = 1, 2, \ldots, I) \tag{5}$$

Equation (6) can be obtained from equations (4) and (5).

[Mathematical Equation 6]

$$\sum_{i=1}^{I} e_i x_{i1} = 0, \quad \sum_{i=1}^{I} e_i x_{i2} = 0, \ldots \quad \sum_{i=1}^{I} e_i x_{iJ} = 0 \tag{6}$$

By considering the relationship among the learner data $x_{ij}$, the tap coefficient $w_j$, the supervisor data $y_i$, and the residual $e_i$ in the residual equation in equation (3), the following normal equations can be obtained from equation (6).

[Mathematical Equation 7]

$$\begin{cases} \left(\sum_{i=1}^{I} x_{i1}x_{i1}\right)w_1 + \left(\sum_{i=1}^{I} x_{i1}x_{i2}\right)w_2 + \ldots + \left(\sum_{i=1}^{I} x_{i1}x_{iJ}\right)w_J = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \ldots + \left(\sum_{i=1}^{I} x_{i2}x_{iJ}\right)w_J = \left(\sum_{i=1}^{I} x_{i2}y_i\right) \\ \cdots \\ \left(\sum_{i=1}^{I} x_{iJ}x_{i1}\right)w_1 + \left(\sum_{i=1}^{I} x_{iJ}x_{i2}\right)w_2 + \ldots + \left(\sum_{i=1}^{I} x_{iJ}x_{iJ}\right)w_J = \left(\sum_{i=1}^{I} x_{iJ}y_i\right) \end{cases} \tag{7}$$

It is now assumed that the matrix (covariance matrix) A and the vector v are defined as follows.

[Mathematical Equation 8]

$$A = \begin{pmatrix} \sum_{i=1}^{I} x_{i1}x_{i1} & \sum_{i=1}^{I} x_{i1}x_{i2} & \cdots & \sum_{i=1}^{I} x_{i1}x_{iJ} \\ \sum_{i=1}^{I} x_{i2}x_{i1} & \sum_{i=1}^{I} x_{i2}x_{i2} & \cdots & \sum_{i=1}^{I} x_{i2}x_{iJ} \\ & & \cdots & \\ \sum_{i=1}^{I} x_{iJ}x_{i1} & \sum_{i=1}^{I} x_{iJ}x_{i2} & \cdots & \sum_{i=1}^{I} x_{iJ}x_{iJ} \end{pmatrix}$$

$$v = \begin{pmatrix} \sum_{i=1}^{I} x_{i1}y_i \\ \sum_{i=1}^{I} x_{i2}y_i \\ \vdots \\ \sum_{i=1}^{I} x_{iJ}y_i \end{pmatrix}$$

In this case, when the vector W is defined as in equation 1, the normal equations in equation (7) can be expressed by equation (8).

$$AW=v \tag{8}$$

By preparing a certain number of sets of learner data $x_{ij}$ and sets of supervisor data $y_i$, the same number of normal equations (7) as the number j of tap coefficient $w_j$ to be determined can be established. Accordingly, by solving equation (8) with respect to the vector W (to solve equation (8), the matrix A in equation (8) should be a nonsingular matrix), the optimal tap coefficient $w_j$ can be determined. To solve equation (8), for example, a sweeping out method (Gauss-Jordan elimination) can be used.

As discussed above, learning for determining the optimal tap coefficient $w_j$ by using the learner data and the supervisor data has been conducted, and by using the tap coefficient $w_j$, the predictive value E[y] close to the supervisor data γ is determined by equation (1). This processing is adaptive processing.

The adaptive processing is different from mere interpolation in that components which are not contained in the low quality voice but are contained in the high quality voice can be reproduced. That is, by only observing equation (1), the adaptive processing appears to be the same as interpolation processing using an interpolation filter. However, since the tap coefficient w equivalent to the tap coefficient of the interpolation filter is determined by using the supervisor data y, through so-called learning, components contained in the high quality voice can be reproduced. From this point of view, the adaptive processing is processing for creating voice.

Although in the above-described example the predictive value of the high quality voice is determined by linear prediction, it may be predicted by two or higher-order equations.

The learning unit 125 shown in FIG. 14 conducts learning for tap coefficients used for the above-described classification adaptive processing as quality-improving data.

That is, voice data output from the A/D converter 122 (FIG. 3) is supplied to a buffer 141 as learning data. The buffer 141 temporarily stores the voice data as supervisor data, which serves as a supervisor for learning.

A learner data generator 142 generates learner data, which serves as a learner for learning, from the voice data serving as the supervisor data stored in the buffer 141.

More specifically, the learner data generator 142 is formed of an encoder 142E and a decoder 142D. The encoder 142E, which is similarly configured to the coder 123 of the transmitter 113 (FIG. 3), codes the supervisor data stored in the buffer 141 in a manner similar to the coder 123, and outputs the coded voice data. The decoder 142D, which is similarly configured to a decoder 161 shown in FIG. 16, which is discussed below, decodes the coded voice data according to a decoding method corresponding to the coding method used in the coder 123, and outputs the resulting decoded voice data as learner data.

In this example, the learner data is generated by coding the supervisor data into the coded voice data, as in the coder 123, and by decoding the coded voice data. Alternatively, the learner data may be generated by decreasing the quality of the supervisor voice data by filtering it with a low-pass filter.

As the encoder 142E forming the learner data generator 142, the coder 123 may be used, and as the decoder 142D, the decoder 161 shown in FIG. 16, which is described below, may be used.

A learner data memory 143 temporarily stores the learner data output from the decoder 142D of the learner data generator 142.

A predictive tap generator 144 sequentially selects voice samples of the supervisor data stored in the buffer 141, and reads some voice samples of the learner data used for predicting the selected data from the learner data memory 143, thereby generating predictive taps (taps for determining the predictive value of the selected data). The predictive taps are supplied to an adder 147 from the predictive tap generator 144.

A class tap generator 145 reads some voice samples of the learner data used for classifying the selected data from the learner data memory 143 so as to generate class taps (taps used for classification). The class taps are supplied to a classification unit 146 from the class tap generator 145.

As the voice samples forming the predictive taps and the class taps, for example, voice samples which are positioned temporally close to the voice samples of the learner data corresponding to the voice samples of the supervisor data as the selected data can be used.

As the voice samples forming the predictive taps and the class taps, the same voice samples may be used, or different voice samples may be used.

The classification unit 146 classifies the selected data based on the class taps supplied from the class tap generator 145, and outputs a class code representing the resulting class to the adder 147.

As the classification method, for example, ADRC (Adaptive Dynamic Range Coding), may be used.

In the ADRC method, voice samples forming the class taps are subjected to ADRC processing, and the classes of the selected data are determined based on the resulting ADRC code.

In K-bit ADRC, for example, the maximum MAX and the minimum MIN of the voice samples forming the class taps are detected, and DR=MAX−MIN is set as a local dynamic range of the set, and based on this dynamic range DR, the voice samples forming the class taps are re-quantized into K bits. More specifically, the minimum MIN is subtracted from each voice sample forming the class taps, and the resulting value is divided (quantized) with DR/2K. Then, the K-bit voice samples forming the class taps are arranged as a bit string in a predetermined order, and the bit string is then output as ADRC code. Accordingly, when the class taps are subjected to one-bit ADRC processing, the minimum MIN is subtracted from each voice sample forming the class taps, and then, the resulting value is divided with the average of the maximum MAX and the minimum MIN so that each voice sample is formed into one bit (binarized). Then, the one-bit voice samples are arranged in predetermined bit string, and the bit string is output as ADRC code.

The classification unit 146 may output the level distribution pattern of the voice samples forming the class taps as a class code. In this case, however, if the class taps are formed of N voice samples and K bits are assigned to each voice sample, the number of class codes output from the classification unit 146 becomes $(2^N)K$, which is an enormous number exponentially proportional to the number K of bits of the voice samples.

Accordingly, it is preferable that, in the classification unit 146, the amount of class tap information be compressed by the above-described ADRC processing or vector quantization before being classified.

Based on each of the classes supplied from the classification unit 146, the adder 147 reads the voice samples of the supervisor data serving as the selected data from the buffer 141, and performs summation for the learner data forming the predictive taps supplied from the predictive tap generator 144 and for the supervisor data as the selected data by using the content of an initial component storage unit 148 and a user component storage unit 149 if necessary.

That is, basically, the adder 147 performs computation corresponding to the multiplication of the learner data items $(x_{in}x_{im})$ and the summation (Σ), which are components of the matrix A in equation (8), for each class corresponding to a class code supplied from the classification unit 146 by using the predictive taps (learner data).

The adder 147 also performs computation corresponding to the multiplication of the learner data and the supervisor data ($x_{in}y_i$) and the summation (Σ), which are components of the vector v in equation (8), for each class corresponding to a class code supplied from the classification unit 146 by using the predictive taps (learner data) and the selected data (supervisor data).

The initial component storage unit 148, which is formed of, for example, a ROM, stores the components of the matrix A and the components of the vector v in equation (8), which are obtained by conducting learning by using prepared voice data of many unspecified speakers as learning data, for each class.

The user component storage unit 149, which is formed of, for example, an EEPROM, stores the components of the matrix A and the components of the vector v in equation (8), which were obtained by the pervious learning in the adder 147, for each class.

When conducting learning by using new voice data, the adder 147 reads the components of the matrix A and the components of the vector v in equation (8), which were obtained by the previous learning, from the user component storage unit 149, and adds the corresponding components $x_{in}x_{im}$ and $x_{in}y_i$ calculated by using the supervisor data $y_i$ and the learner data $x_{in}(x_{im})$ obtained from the new voice data to the components of the matrix A and the vector v (performs addition represented by the summation in the matrix A and the vector v), thereby establishing normal equations in equation (8).

Accordingly, in the adder 147, the normal equations in equation (8) can be established, not only based on new voice data, but also based on the voice data used for the previous learning.

When learning is conducted in the learning unit 125 for the first time, or when learning is conducted immediately after clearing the user component storage unit 149, components of the matrix A and components of the vector v obtained by the previous learning are not stored in the user component storage unit 149. Accordingly, normal equations in equation (8) are established based on only voice data input by the user.

In this case, due to an insufficient sample number of input voice data, a required number of normal equations for determining tap coefficients may not be obtained for some classes.

Accordingly, the initial component storage unit 148 stores the components of the matrix A and the components of the vector v in equation (8) for each class, which are obtained by conducting learning for prepared voice data of an unspecified, sufficient number of speakers as learning data. The learning unit 125 then establishes normal equations in equation (8) by using the components of the matrix A and the vector v stored in the initial component storage unit 148 and the components of the matrix A and the vector v obtained from the input voice data. Then, a required number of normal equations for determining tap coefficients can always be obtained for all classes.

When determining new components of the matrix A and new components of the vector v for each class by using the components of the matrix A and the vector v obtained from the new voice data and the component of the matrix A and the vector v stored in the user component storage unit 149 (or the initial component storage unit 148), the adder 147 supplies these components to the user component storage unit 149 and stores them by overwriting the previous components by the new components.

The adder 147 then supplies the normal equations in equation (8) formed of the new components of the matrix A and the vector v for each class to a tap-coefficient determining unit 150.

Then, the tap-coefficient determining unit 150 solves the normal equations for each class supplied from the adder 147 so as to determine a tap coefficient for each class, and supplies the tap coefficients to the storage unit 126 as quality-improving data together with updating information thereof, and stores them by overwriting the old data by the new data.

Figure 15:
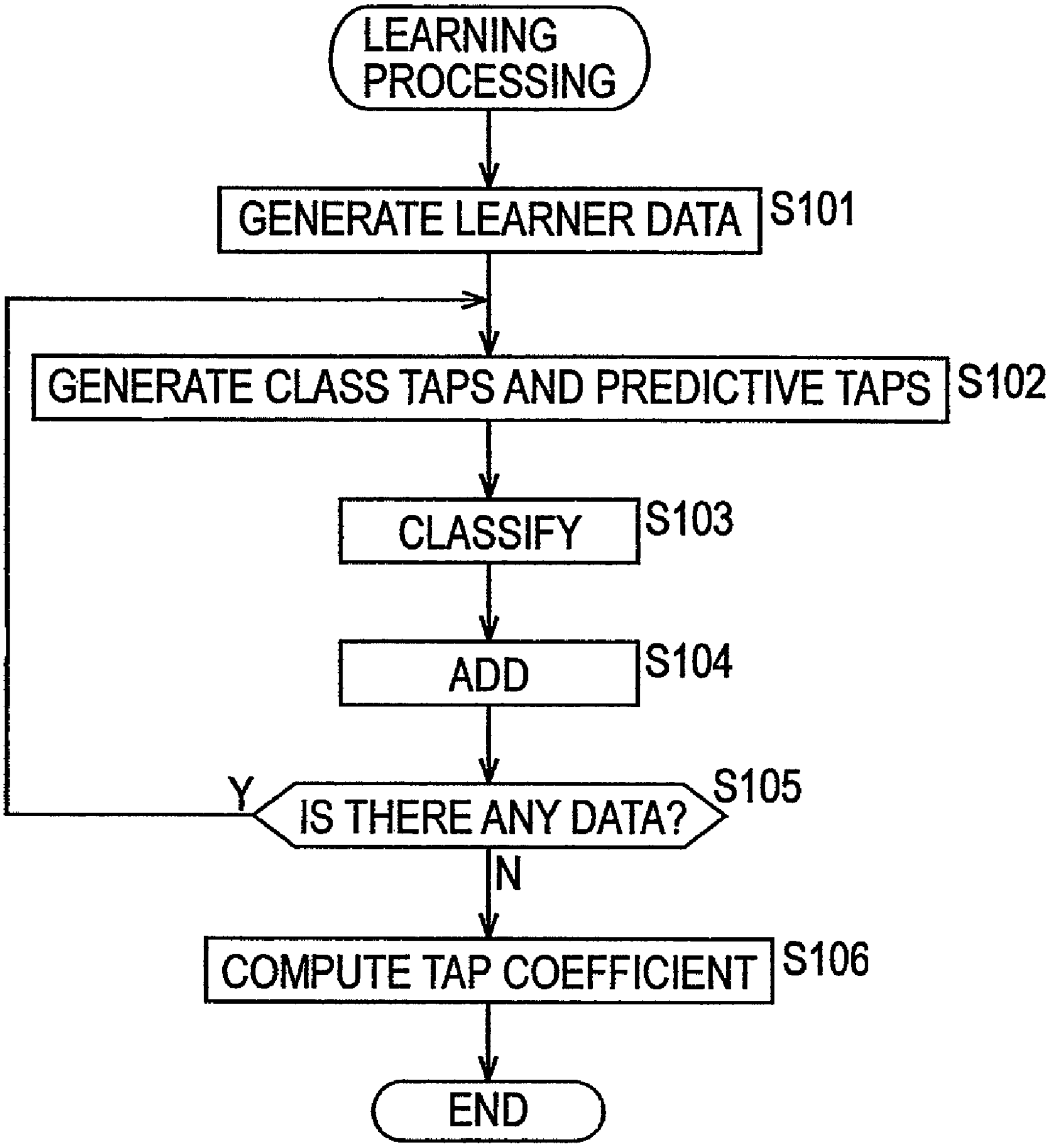
FIG. 15 is a flowchart illustrating learning processing performed by the learning unit 125.

A description is now given, with reference to the flowchart of FIG. 15, of learning processing for tap coefficients as quality-improving data performed by the learning unit 125 shown in FIG. 14.

Voice data obtained from, for example, the user's voice when making a telephone call or voice issued at a certain time is supplied to the buffer 141 from the A/D converter 122 (FIG. 3), and the buffer 141 stores the voice data therein.

Then, when finishing a call, or after the lapse of a predetermined period from starting talking, the learning unit 125 starts learning processing by using, as new voice data, the voice data stored in the buffer 141 during a telephone call or the voice data stored in the buffer 141 from the start to the end of the conversation.

More specifically, in step S101, the learner data generator 142 generates learner data from the voice data serving as supervisor data stored in the buffer 141, and supplies the learner data to the learner data memory 143 and stores it therein. The process then proceeds to step S102.

In step S102, the predictive tap generator 144 specifies one of the voice samples as supervisor data stored in the buffer 141, and reads some voice samples serving as learner data stored in the learner data memory 143 for the selected data so as to generate predictive taps and supplies them to the adder 147.

Also in step S102, as in the predictive tap generator 144, the class tap generator 145 generates class taps for the selected data, and supplies them to the classification unit 146.

After step S102, the process proceeds to step S103 in which the classification unit 146 performs classification based on the class taps supplied from the class tap generator 145, and supplies the resulting class code to the adder 147.

The process then proceeds to step S104 in which the adder 147 reads the selected data from the buffer 141 and calculates the components of the matrix A and the vector v by using the selected data and the predictive taps supplied from the predictive tap generator 144. The adder 147 also adds the components of the matrix A and the vector v determined from the selected data and the predictive taps to the components of the matrix A and the vector v stored in the user component storage unit 149 corresponding to the class code supplied from the classification unit 146. The process then proceeds to step S105.

In step S105, the predictive tap generator 144 determines whether there is any supervisor data which is not yet selected in the buffer 141. If there is such data, the process returns to step S102, and the unselected supervisor data is processed in a manner similar to the above-described processing.

If it is determined in step S105 that there is no supervisor data which is not yet selected in the buffer 141, the adder 147 supplies the normal equations in equation (8) consisting of the components of the matrix A and the vector v for each class stored in the user component storage unit 149 to the tap-coefficient determining unit 150. The process then proceeds to step S106.

In step S106, the tap-coefficient determining unit 150 solves the normal equations for each class supplied from the adder 147 so as to determine a tap coefficient for each class. Also in step S106, the tap-coefficient determining unit 150 supplies the tap coefficient for each class, together with the updating information thereof, to the storage unit 126, and stores them by overwriting the old data by this new data. The learning processing is then completed.

Although in this example, the learning processing is not performed in real time, it may be performed in real time if hardware has a sufficient capacity.

As described above, in the learning unit 125, learning processing based on new voice data and voice data used for the previous learning is conducted during a telephone call or at a certain time. Accordingly, as the user makes more telephone calls, tap coefficients for decoding the coded voice data into voice as faithful as possible to the user's voice can be determined. Thus, at the communicating party, the coded voice data is decoded by using such tap coefficients so that processing suitable for the characteristic of the user's voice can be performed, thereby obtaining the improved decoded voice data. As the user more uses the cellular telephone 101, the better quality of the voice can be output from the communicating party.

When the learning unit 125 of the transmitter 113 (FIG. 3) is configured as shown in FIG. 14, tap coefficients serve as the quality-improving data, and thus, the tap coefficients are stored in the storage unit 136 of the receiver 114 (FIG. 4). In this case, in the default data memory 137 of the receiver 114, tap coefficients for the individual classes obtained by solving the normal equations consisting of the components stored in the initial component storage unit 148 are stored as default data.

Figure 16:
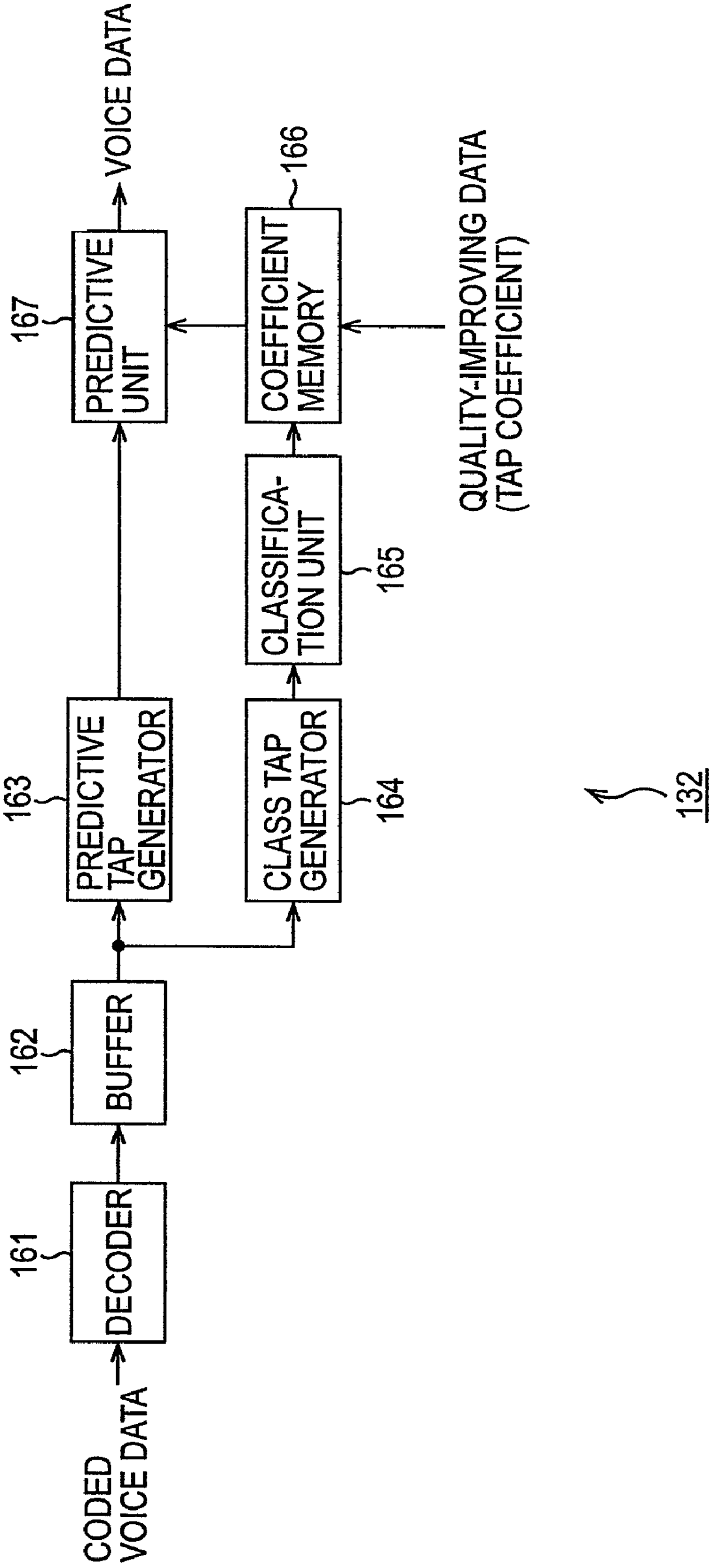
FIG. 16 is a block diagram illustrating an example of the configuration of a decoder 132.

FIG. 16 illustrates an example of the configuration of the decoder 132 of the receiver 114 (FIG. 4) when the learning unit 125 of the transmitter 113 (FIG. 3) is configured as shown in FIG. 14.

The coded voice data output from the reception controller 131 (FIG. 4) is supplied to the decoder 161. The decoder 161 decodes the coded voice data according to a decoding method corresponding to the coding method used in the coder 123 of the transmitter 113 (FIG. 3), and outputs the resulting decoded voice data to a buffer 162.

The buffer 162 temporarily stores the decoded voice data output from the decoder 161.

A predictive tap generator 163 sequentially selects quality-improved data improved from the decoded voice data, and forms (generates) predictive taps used for determining the predictive value of the selected data according to the linear predictive computation in equation (1) by using some voice samples of the decoded voice data stored in the buffer 162, and supplies the predictive taps to a predicting unit 167. The predictive tap generator 163 generates the same predictive taps as those generated by the predictive tap generator 144 in the learning unit 125 shown in FIG. 14.

A class tap generator 164 forms (generates) class taps for the selected data by using some voice samples of the decoded voice data stored in the buffer 162, and supplies the class taps to a classification unit 165. The class tap generator 164 generates the same class taps as those generated by the class tap generator 145 in the learning unit 125 shown in FIG. 14.

The classification unit 165 performs classification similar to that performed by the classification unit 146 of the learning unit 125 shown in FIG. 14 by using the class taps supplied from the class tap generator 164, and supplies the resulting class codes to a coefficient memory 166.

The coefficient memory 166 stores a tap coefficient for each class supplied from the manager 135 as quality-improving data at the address corresponding to that class. The coefficient memory 166 also supplies the tap coefficient stored at the address corresponding to the class code supplied from the classification unit 165 to the predicting unit 167.

The predicting unit 167 obtains the predictive taps output from the predictive tap generator 163 and the tap coefficients output from the coefficient memory 166, and performs linear predictive computation represented by equation (1) by using the predictive taps and the tap coefficients. Accordingly, the predicting unit 167 determines the predictive value of the quality-improved data as the selected data, and supplies it to the D/A converter 133 (FIG. 4).

Figure 17:
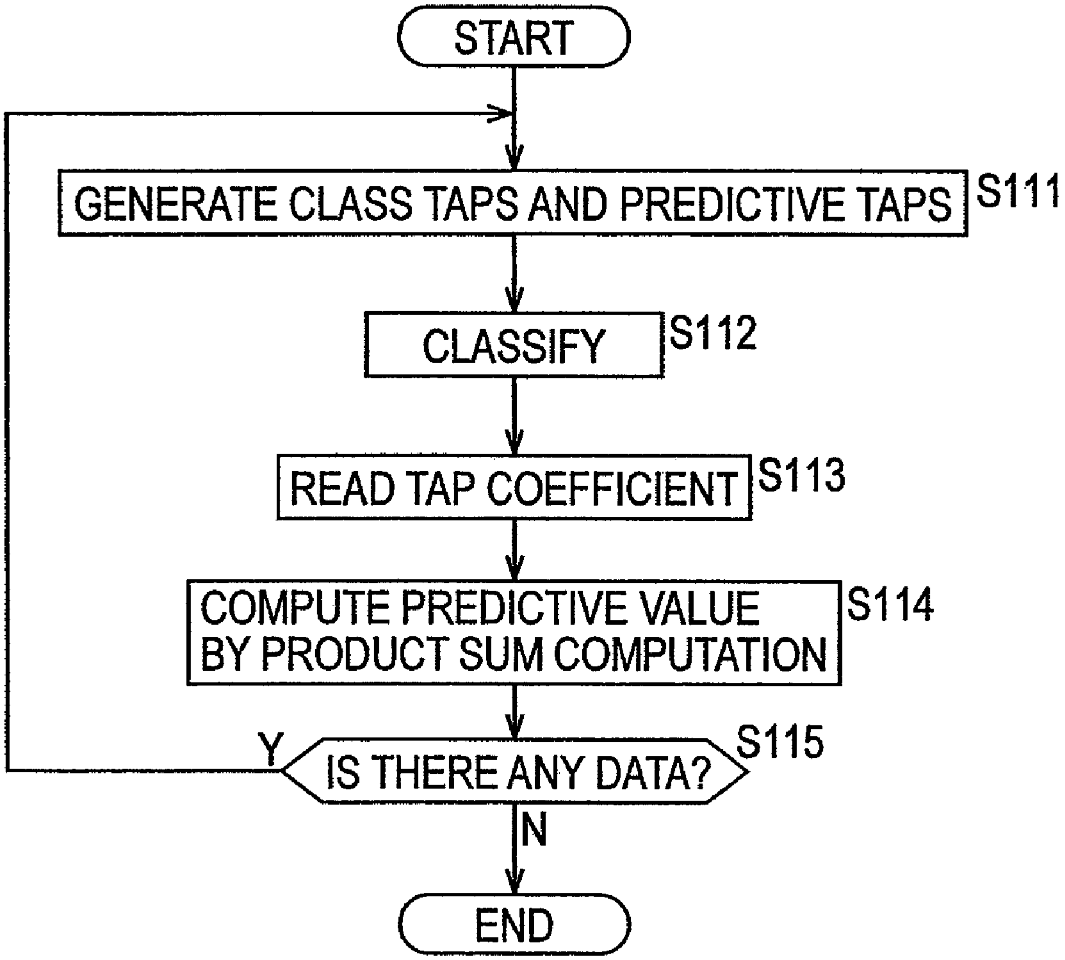
FIG. 17 is a flowchart illustrating processing performed by the decoder 132.

The processing performed by the decoder 132 shown in FIG. 16 is described below with reference to the flowchart of FIG. 17.

The decoder 161 has decoded the coded voice data output from the reception controller 131 (FIG. 4) and has output the resulting decoded voice data to the buffer 162 and stored it therein.

In step S111, the predictive tap generator 163 selects a voice sample of the quality-improved data improved from the quality of the decoded voice data, for example, in chronological order, and reads some voice samples of the decoded voice data from the buffer 162 for the selected data so as to form predictive taps. The predictive tap generator 163 then supplies the predictive taps to the predicting unit 167.

Also in step S111, the class tap generator 164 reads some voice samples of the decoded voice data stored in the buffer 162 so as to form class taps for the selected data, and supplies the class taps to the classification unit 165.

Upon receiving the class taps from the class tap generator 164, the process proceeds to step S112 in which the classification unit 165 performs classification by using the class taps, and supplies the resulting class code to the coefficient memory 166. The process then proceeds to step S113.

In step S113, the coefficient memory 166 reads the tap coefficient stored at the address corresponding to the class code supplied from the classification unit 165, and supplies the tap coefficient to the predicting unit 167. The process then proceeds to step S114.

In step S114, the predicting unit 167 obtains the tap coefficients output from the coefficient memory 166, and performs product sum computation expressed by equation (1) by using the tap coefficients and the predictive taps from the predictive tap generator 163, thereby obtaining the predictive value of the quality-improved data.

The quality-improved data obtained as described above is supplied to the speaker 134 from the predicting unit 167 via the D/A converter 133 (FIG. 4), and high-quality voice is output from the speaker 134.

That is, the tap coefficients are obtained by conducting learning by using the user's voice as a supervisor and by using data obtained by coding and decoding the user's voice as a learner. Accordingly, the user's original voice can be predicted with high precision from the decoded voice data output from the decoder 161, and thus, voice as faithful as possible to the user's real voice, i.e., the voice improved from the decoded voice data output from the decoder 161 (FIG. 16), can be output from the speaker 134.

After step S114, the process proceeds to step S115 in which it is determined whether there is any quality-improved data to be processed as selected data. If there is such data, the process returns to step S111, and processing similar to the above-described processing is repeated. If it is determined in step S115 that there is no quality-improved data to be processed as selected data, the process is completed.

When communication is made between the cellular telephones $\mathbf{101}_1$ and $\mathbf{101}_2$, in the cellular telephone $\mathbf{101}_2$, as described with reference to FIG. 5, data associated with the telephone number of the cellular telephone $\mathbf{101}_1$, which is the communicating party, i.e., learning data obtained by conducting learning for the voice data of the user owning the cellular telephone $101_1$, is used as the tap coefficients of the quality-improving data. Accordingly, if the voice sent from the cellular telephone $101_1$ to the cellular telephone $101_2$ is the voice of the user owning the cellular telephone $101_1$, decoding is performed in the cellular telephone $101_2$ by using the tap coefficients for the user of the cellular telephone $101_1$, thereby outputting the high-quality voice.

However, even when the voice sent from the cellular telephone $101_1$ to the cellular telephone $101_2$ is not the voice of the user owning the cellular telephone $101_1$, i.e., even when a user other than the user owning the cellular telephone $101_1$ uses the cellular telephone $101_1$, decoding is performed in the cellular telephone $101_2$ by using the tap coefficients for the user of the cellular telephone $101_1$. Accordingly, the quality of the voice obtained by decoding such tap coefficients is not as high as the voice of the real user (owner) of the cellular telephone $101_1$. That is, simply, when the user owning the cellular telephone $101_1$ uses the cellular telephone $101_1$, the high quality voice can be output from the cellular telephone $101_2$. However, when a user other than the user owning the cellular telephone $101_1$ uses the cellular telephone $101_1$, the high quality voice is not output from the cellular telephone $101_2$. From this point of view, simple personal authentication can be conducted in the cellular telephone 101.

Figure 18:
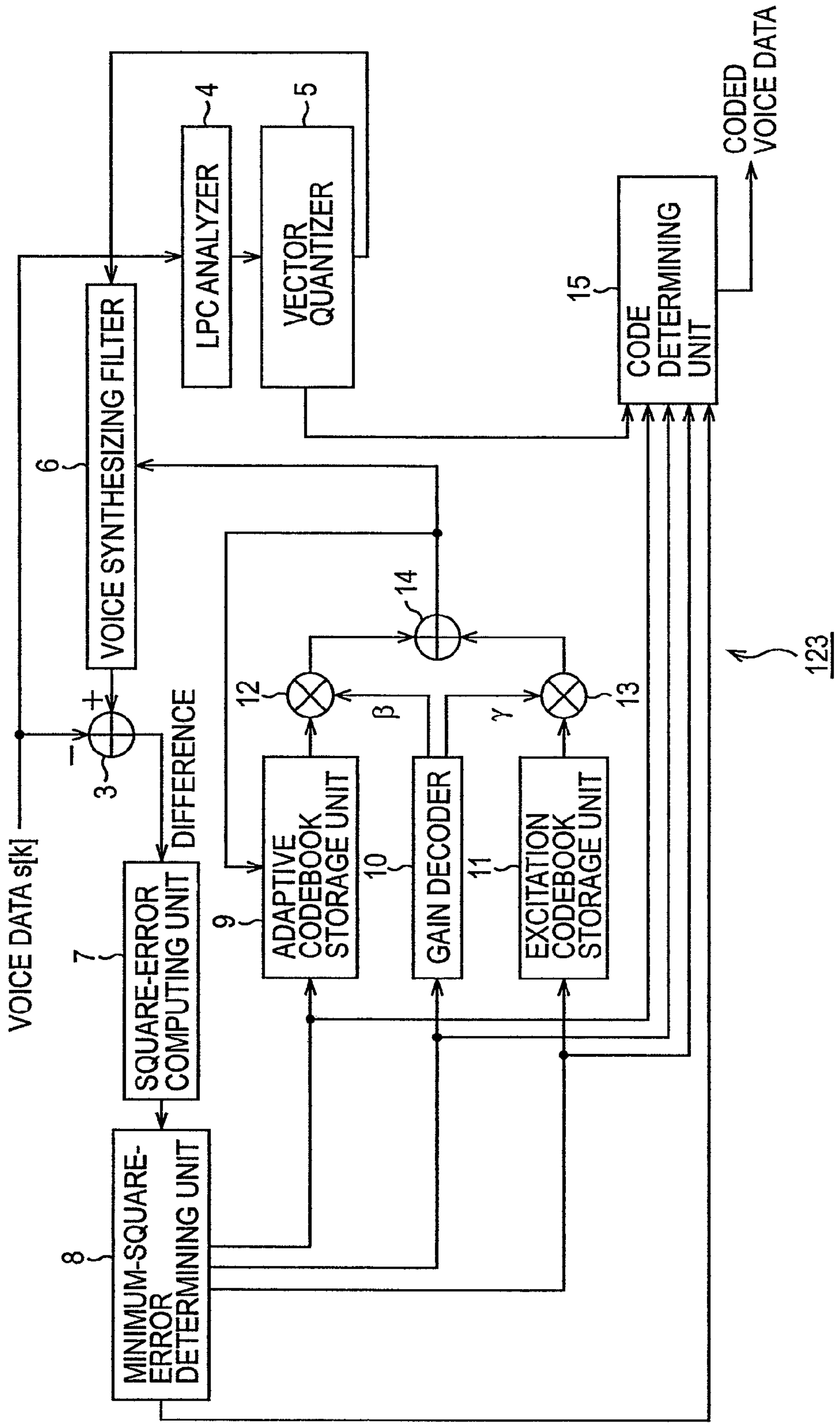
FIG. 18 is a block diagram illustrating an example of the configuration of a CELP coder 123.

FIG. 18 illustrates an example of the configuration of the coder 123 forming the transmitter 113 (FIG. 3) when the cellular telephone 101 is a CELP (Code Excited Linear Prediction coding) type.

Voice data output from the A/D converter 122 (FIG. 3) is supplied to a computation unit 3 and a LPC (Linear Prediction Coefficient) analyzer 4.

The LPC analyzer 4 sets a predetermined voice sample of the voice data output from the A/D converter 122 (FIG. 3) as one frame, and conducts LPC analysis on each frame so as to determine P-order linear predictive coefficients $\alpha_1, \alpha_2, \ldots, \alpha_p$. Then, the LPC analyzer 4 supplies vectors consisting of the P-order linear predictive coefficients $\alpha_p$ ($p=1, 2, \ldots, P$) as elements to a vector quantizer 5 as feature vectors of the voice data.

The vector quantizer 5 stores a codebook in which the code vectors consisting of the linear predictive coefficients as elements are associated with codes. Based on this codebook, the vector quantizer 5 vector-quantizes the feature vectors $\alpha$ output from the LPC analyzer 4, and supplies the resulting codes (hereinafter sometimes referred to as "A code (A_code)" to a code determining unit 15.

The vector quantizer 5 also supplies linear predictive coefficients $\alpha_1', \alpha_2', \ldots, \alpha_p'$ forming the code vector $\alpha'$ corresponding to A code to a voice synthesizing filter 6.

The voice synthesizing filter 6, which is, for example, an IIR (Infinite Impulse Response) digital filter, performs voice synthesizing by setting the linear predictive coefficients $\alpha_p'$ ($p=1, 2, \ldots, P$) output from the vector quantizer 5 to be the tap coefficients of the IIR filter, and also by setting a residual signal e supplied from a computation unit 14 to be an input signal.

The LPC analysis performed by the LPC analyzer 4 is as follows. For a sample value $S_n$ of voice data at a current time n and the past P samples values $S_{n-1}, S_{n-2}, \ldots, S_{n-P}$ adjacent to the sample value $S_n$, it is assumed that the linear combination expressed by the following equation holds true.

$$S_n+\alpha_1 S_{n-1}+\alpha_2 S_{n-2}+\ldots+\alpha_P S_{n-P}=e_n \quad (9)$$

Then, the predictive value (linear predictive value) $S_n'$ of the sample value $S_n$ at the current time n is linearly predicted by using the past P sample values $S_{n-1}, S_{n-2}, S_{n-P}$ according to the following equation.

$$S_n'=-(\alpha_1 S_{n-1}+\alpha_2 S_{n-2}+\ldots+\alpha_P S_{n-P}) \quad (10)$$

In this case, the linear predictive coefficient $\alpha_P$ for minimizing the square error between the actual sample value $S_n$ and the linear predictive value $S_n'$ is determined.

In equation (9), $\{e_n\}(\ldots, e_{n-1}, e_n, e_{n+1}, \ldots)$ are uncorrelated random variables whose average is 0 and variance is a predetermined value $\sigma_2$.

From equation (9), the sample value $S_n$ can be expressed by the following equation.

$$S_n=e_n-(\alpha_1 S_{n-1}+\alpha_2 S_{n-2}+\ldots+\alpha_P S_{n-P}) \quad (11)$$

Equation (11) is Z-transformed into the following equation.

$$S=E/(1+\alpha_1 z^{-1}+\alpha_2 z^{-2}+\ldots+\alpha_P z^{-P}) \quad (12)$$

In equation (12), S and E indicate Z transform of $S_n$ and $e_n$, respectively, in equation (11).

From equations (9) and (10), $e_n$ can be expressed by the following equation:

$$e_n=S_n-S_n' \quad (13)$$

which can be referred to as a residual signal between the actual sample value $S_n$ and the linear predictive value $S_n'$.

Accordingly, by setting the linear predictive coefficient $\alpha_P$ to be the tap coefficient of the IIR filter in equation (12) and by setting the residual signal $e_n$ to be the input signal of the IIR filter, the voice data $S_n$ can be determined.

Then, as stated above, by setting the linear predictive coefficient $\alpha_P'$ output from the vector quantizer 5 to be the tap coefficient and by setting the residual signal e supplied from the computation unit 14 to be the input signal, the voice synthesizing filter 6 computes equation (12) so as to determine the voice data (synthesized voice data) ss.

In the voice synthesizing filter 6, instead of the linear predictive coefficient $\alpha_P$ obtained as a result of the LPC analysis by the LPC analyzer 4, the linear predictive coefficient $\alpha_P'$ as the code vector corresponding to the code obtained as a result of performing vector quantization on the LPC result is used. Thus, basically, the synthesized voice signal output from the voice synthesizing filter 6 is not the same as the vice data output from the A/D converter 122 (FIG. 3).

The synthesized voice data ss output from the voice synthesizing filter 6 is supplied to the computation unit 3. The computation unit 3 subtracts the voice data s output from the A/D converter 122 (FIG. 3) from the synthesized voice data ss supplied from the voice synthesizing filter 6, and supplies the resulting value to a square-error computing unit 7. The square-error computing unit 7 computes the sum of squares (sum of squares for the sample value of the k-th frame) of the resulting value from the computation unit 3, and supplies the resulting square error to a minimum-square-error determining unit 8.

The minimum-square-error determining unit 8 stores L code (L_code) indicating the long predictive lag, G code (G_code) representing the gain, and I code (I_code) indicating the code word (excitation codebook) in association with the square errors output from the square-error computing unit 7, and outputs the L code, G code, and I code corresponding to the square error output from the square-error computing unit 7. L code, G code, and I code are supplied to an adaptive codebook storage unit 9, a gain decoder 10, and an excitation codebook storage unit 11, respectively. L code, G code, and I code are also supplied to a code determining unit 15.

The adaptive codebook storage unit 9 stores an adaptive codebook for associating, for example, 7-bit L code, with predetermined delay times (lags). The adaptive codebook storage unit 9 delays the residual signal e supplied from the computation unit 14 by a delay time (long predictive lag) corresponding to the L code supplied from the minimum-square-error determining unit 8, and outputs the resulting residual signal e to a computation unit 12.

Since the adaptive codebook storage unit 9 outputs the residual signal e by delaying it by a time corresponding to the L code, the resulting output signal is a signal similar to a periodic signal having a cycle of the delay time. This signal serves as a drive signal mainly for generating synthesized vocal sound in voice synthesizing performed by using linear predictive coefficients. Conceptually, therefore, the L code represents the voice pitch cycle. According to the CELP standards, L code is an integer ranging from 20 to 146.

The gain decoder 10 stores a table for associating G code with predetermined gains β and γ, and outputs the gains β and γ associated with the G code supplied from the minimum-square-error determining unit 8. The gains β and γ are output to the computation unit 12 and a computation unit 13, respectively. The gain β is referred to as a "long filter status output gain", while the gain γ is referred to as an "excitation codebook gain".

The excitation codebook storage unit 11 stores an excitation codebook for associating, for example, 9-bit I code, with predetermined excitation signals, and outputs the excitation signal corresponding to the I code supplied from the minimizing-square-error determining unit 8 to the computation unit 13.

The excitation signals stored in the excitation codebook are signals similar to, for example, white noise, and serve as a drive signal mainly for generating synthesized voiceless sound in voice synthesizing performed by using linear predictive coefficients.

The computation unit 12 multiplies the output signal from the adaptive codebook storage unit 9 by the gain β output from the gain decoder 10, and supplies the resulting multiplied value I to the computation unit 14. The computation unit 13 multiplies the output signal from excitation codebook storage unit 11 by the gain γ output from the gain decoder 10, and supplies the resulting multiplied value n to the computation unit 14. The computation unit 14 then adds the multiplied value I from the computation unit 12 to the multiplied value n from the computation unit 13, and supplies the resulting value to the voice synthesizing filter 6 and the adaptive codebook storage unit 9 as the residual signal e.

In the voice synthesizing filter 6, the residual signal e supplied from the computation unit 14 as the input signal is filtered in the IIR filter by using the linear predictive coefficient $\alpha_p'$ supplied from the vector quantizer 5, and the resulting synthesized voice data is supplied to the computation unit 3. In the computation unit 3 and the square-error computing unit 7, processing similar to the above-described processing is performed, and the resulting square error is supplied to the minimum-square-error determining unit 8.

The minimum-square-error determining unit 8 determines whether the square error from the square-error computing unit 7 is minimized (minimal). If the minimum-square-error determining unit 8 determines that the square error is not minimized, it outputs L code, G code, and I code corresponding to the square error, as stated above, and then, processing similar to the above-described processing is repeated.

If the minimum-square-error determining unit 8 determines that the square error is minimized, it outputs a confirmation signal to the code determining unit 15. The code determining unit 15 latches A code supplied from the vector quantizer 5, and also sequentially latches L code, G code, and I code supplied from the minimum-square-error determining unit 8. Upon receiving a confirmation signal from the minimum-square-error determining unit 8, the code determining unit 15 multiplexes the A code, L code, G code, and I code that are currently latched, and outputs a multiplexed signal as the coded voice data.

As is seen from the foregoing description, the coded voice data includes A code, L code, G code, and I code, which indicate information used for decoding, in units of frames.

In FIG. 18 (also in FIGS. 19 and 20, which are described below), each variable is set to be an array variable with [k]. In the array variable, k indicates the number of frames, though a description thereof is omitted in the specification.

Figure 19:
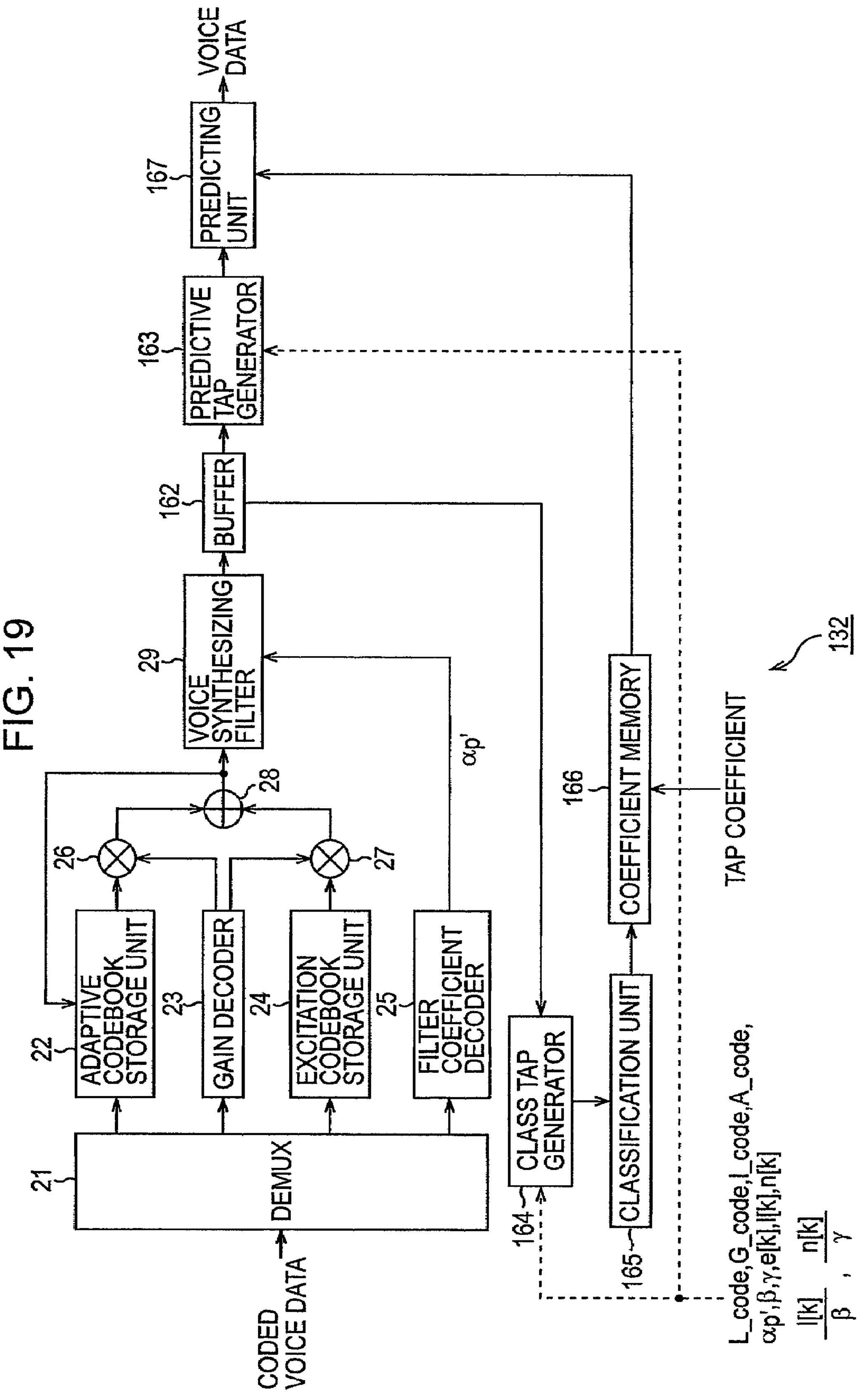
FIG. 19 is a block diagram illustrating an example of the configuration of the decoder 132 in a case the CELP coder 123 is employed.

FIG. 19 illustrates an example of the configuration of the decoder 132 of the receiver 114 (FIG. 4) when the cellular telephone 101 is the CELP type. In FIG. 19, elements corresponding to those in FIG. 16 are designated with like reference numerals.

The coded voice data output from the reception controller 131 (FIG. 4) is supplied to a DEMUX (demultiplexer) 21. The DEMUX 21 separates L code, G code, I code, and A code from the coded voice data, and supplies the L code, G code, I code, and A code to an adaptive codebook storage unit 22, a gain decoder 23, an excitation codebook storage unit 24, and a filter coefficient decoder 25, respectively.

The adaptive codebook storage unit 22, the gain decoder 23, the excitation codebook storage unit 24, and computation units 26 through 28 are configured similarly to the adaptive codebook storage unit 9, the gain decoder 10, the excitation codebook storage unit 11, and the computation units 12 through 14, respectively, shown in FIG. 18. The L code, G code, and I code are subjected to processing similar to the above-described processing discussed with reference to FIG. 18 so that the L code, G code, and I code are decoded into the residual signal e. This residual signal e is supplied to a voice synthesizing filter 29 as an input signal.

The filter coefficient decoder 25 stores the same codebook as that stored in the vector quantizer 5 shown in FIG. 18, and decodes A code into the linear predictive coefficient $\alpha_p'$ and supplies it to the voice synthesizing filter 29.

The voice synthesizing filter 29 is configured similarly to the voice synthesizing filter 6 shown in FIG. 18. The voice synthesizing filter 29 computes equation (12) by using the linear predictive coefficient $\alpha_p'$ supplied from the filter coefficient decoder 25 as the tap coefficient and the residual signal e supplied from the computation unit 28 as the input signal so as to generate synthesized voice data when the square error is found to be minimum by the minimum-square-error determining unit 8 shown in FIG. 18, and outputs the synthesized voice data as the decoded voice data.

As discussed with reference to FIG. 18, the residual signal supplied to the voice synthesizing filter 29 of the decoder 132 as the input signal and the linear predictive coefficient are transmitted as code from the coder 123 at the calling side to the decoder 132 at the incoming side. Accordingly, the decoder 132 decodes the code into the residual signal and the linear predictive coefficient. However, since the decoded residual signal and linear predictive coefficient (hereinafter sometimes referred to as the "decoded residual signal" and "decoded linear predictive coefficient") contain errors, such as quantizing errors, they do not coincide with the residual signal and the linear predictive coefficient obtained by conducting the LPC analysis on the user's voice at the calling side.

Accordingly, the decoded voice data, which is the synthesized voice data, output from the voice synthesizing filter 29 of the decoder 132 exhibit a poor quality, for example, distortions, over the user's voice data at the calling side.

Thus, the decoder 132 performs the above-described classification adaptive processing to convert the decoded voice data into quality-improved data without distortions (with reduced distortions) as faithful as possible to the user's voice data at the calling side.

More specifically, the decoded voice data, which is the synthesized voice data, output from the voice synthesizing filter 29, is supplied to the buffer 162, and the buffer 162 temporarily stores the decoded voice data therein.

The predictive tap generator 163 then sequentially selects quality-improved data improved from the decoded voice data, and reads some voice samples of the decoded voice data from the buffer 162 for the selected data so as to generate predictive taps, and supplies them to the predicting unit 167. Meanwhile, the class tap generator 164 reads some voice samples of the decoded voice data stored in the buffer 162 so as to from class taps for the selected data, and supplies them to the classification unit 165.

The classification unit 165 performs classification by using the class taps supplied from the class tap generator 164, and supplies the resulting class codes to the coefficient memory 166. The coefficient memory 166 reads the tap coefficient stored at the address corresponding to the class code from the classification unit 165, and supplies the tap coefficient to the predicting unit 167.

Then, the predicting unit 167 performs product sum computation expressed by equation (1) by using the tap coefficients output from the coefficient memory 166 and the predictive taps from the predictive tap generator 163, thereby obtaining the predictive value of the quality-improved data.

The quality-improved data obtained as described above is supplied to the speaker 134 from the predicting unit 167 via the D/A converter 133 (FIG. 4), and high quality voice can be output from the speaker 134.

Figure 20:
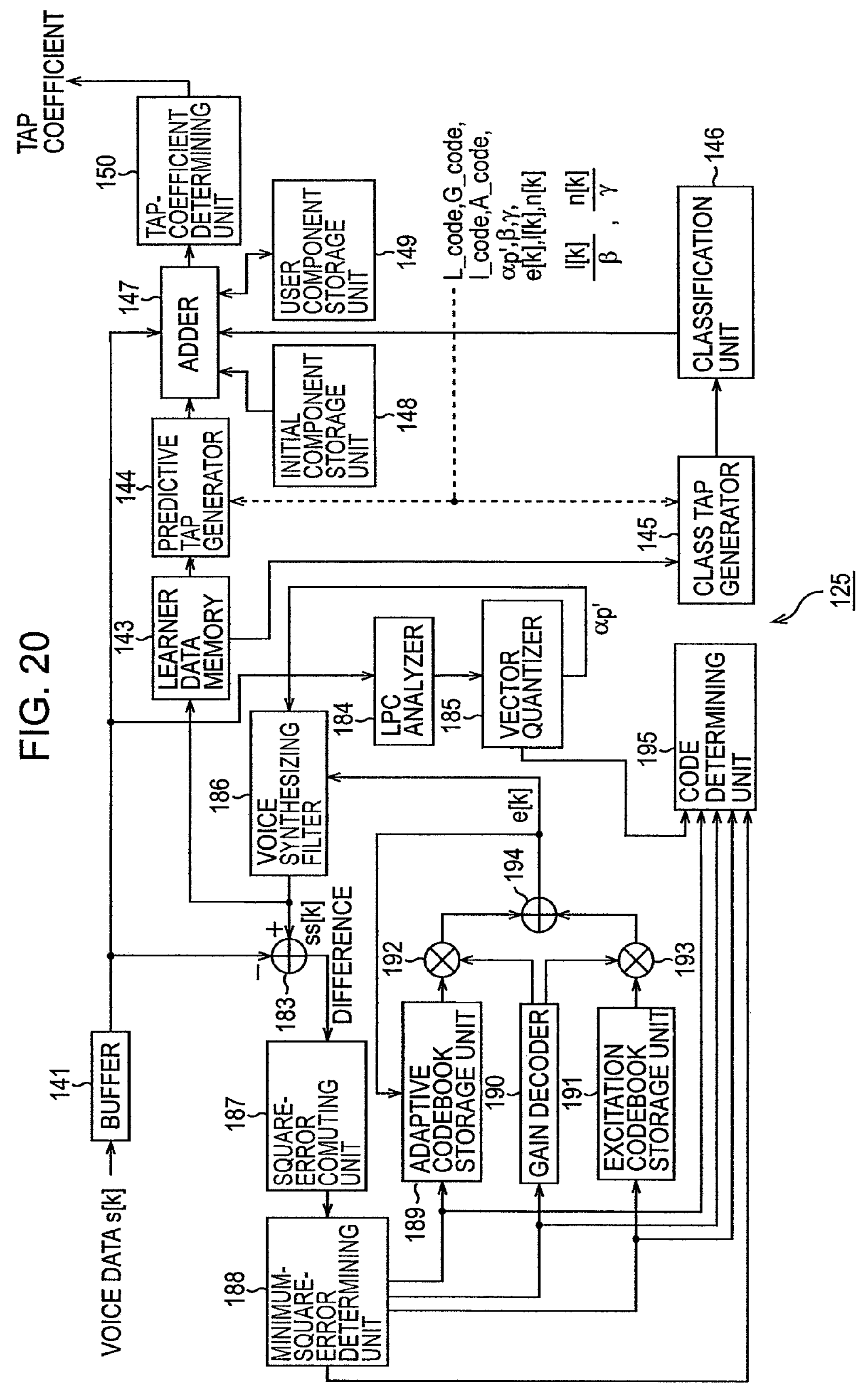
FIG. 20 is a block diagram illustrating an example of the configuration of the learning unit 125 in a case the CELP coder 123 is employed.

FIG. 20 illustrates an example of the configuration of the learning unit 125 forming the transmitter 113 (FIG. 3) when the cellular telephone 101 is the CELP type. In FIG. 20, elements corresponding to those of FIG. 14 are designated with like reference numerals, and an explanation thereof is thus omitted.

Elements, such as computation unit 183 through a code determining unit 195, are configured similarly to the elements, such as the computation unit 3 through the code determining unit 15, respectively, shown in FIG. 18. Voice data output from the A/D converter 122 (FIG. 3) is input into the computation unit 183 as learning data. Accordingly, in the computation unit 183 through the code determining unit 195, processing similar to that performed in the coder 123 shown in FIG. 18 is performed on the learning voice data.

The synthesized voice data output from the voice synthesizing filter 186 when the square error is determined to be minimum by the minimum-square-error determining unit 188 is supplied to the learner data memory 143 as learner data.

Thereafter, in the elements, such as the learner data memory 143 through the tap-coefficient determining unit 150, processing similar to that performed discussed with reference to FIGS. 14 and 15 is performed, thereby generating tap coefficients for the individual classes as quality-improving data.

In the embodiment shown in FIG. 19 or 20, the predictive taps and the class taps are generated from the synthesized voice data output from the voice synthesizing filter 29 or 186. Alternatively, predictive taps and class taps may be generated by including at least one of I code, L code, G code, and A code, the linear predictive coefficient $\alpha_p$ obtained from A code, the gains β and γ obtained from G code, other information obtained form L code, G code, I code, or A code (for example, the residual signal e, l and n for obtaining the residual signal e, and l/β, n/γ), as indicated by the broken lines in FIG. 19 or 20.

Figure 21:
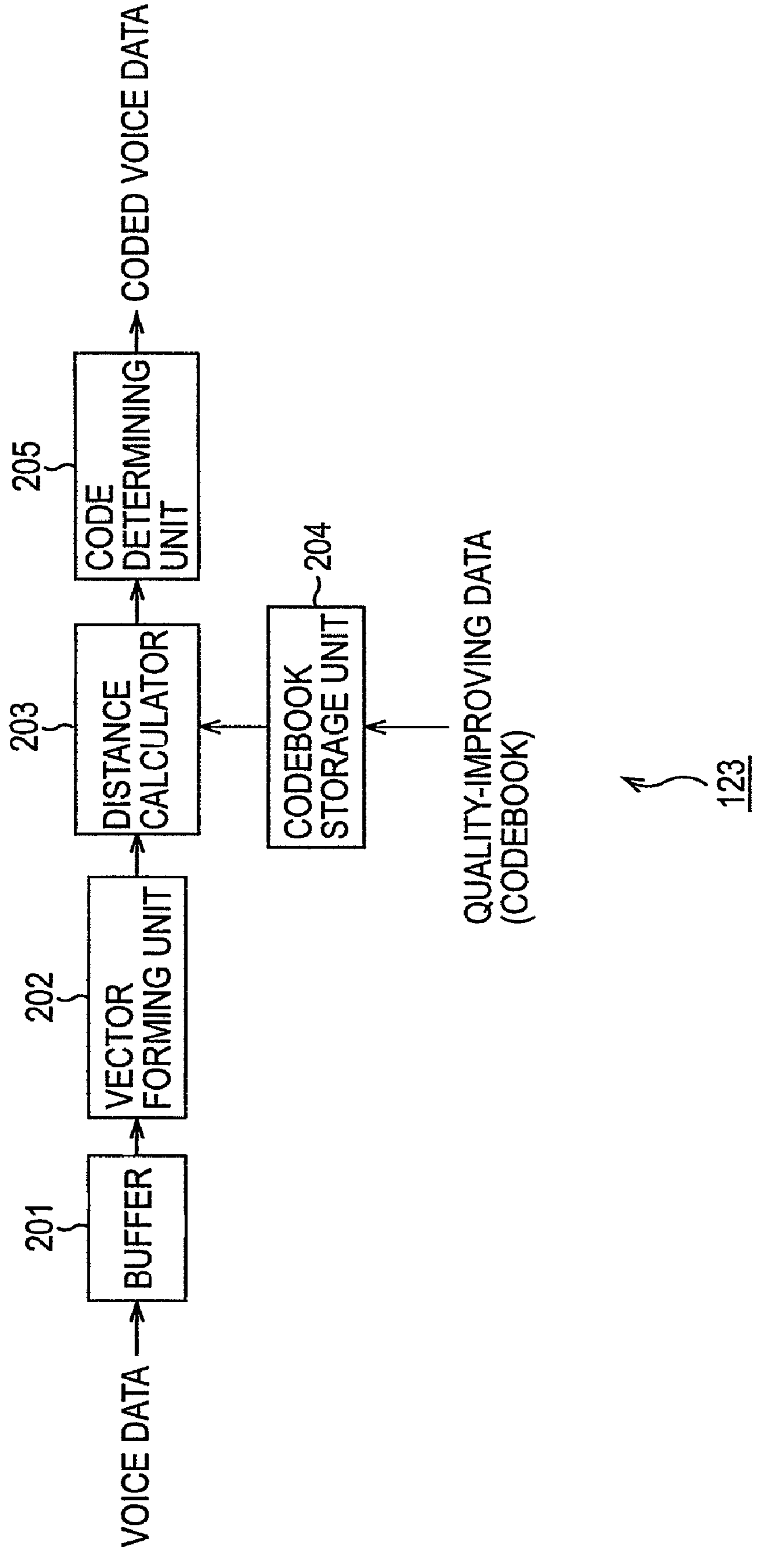
FIG. 21 is a block diagram illustrating an example of the configuration of the coder 123 that performs vector quantization.

FIG. 21 illustrates another example of the configuration of the coder 123 forming the transmitter 113 (FIG. 3).

In the embodiment shown in FIG. 21, the coder 123 codes voice data output from the A/D converter 122 (FIG. 3) by conducting vector quantization.

More specifically, voice data output from the A/D converter 122 (FIG. 3) is supplied to a buffer 201, and the buffer 201 temporarily stores the voice data therein.

A vector forming unit 202 reads the voice data stored in the buffer 201 in chronological order, and sets a predetermined number of voice samples to be one frame so as to form the voice data of each frame into a vector.

In this case, in the vector forming unit 202, the voice data may be formed into vectors by, for example, directly forming each voice sample of one frame into a vector component. Alternatively, voice samples forming one frame may be subjected to acoustic analysis, such as LPC analysis, and the resulting voice features are formed into vector components. For the convenience of simplicity, it is assumed that each voice sample of one frame is directly formed into a vector component, thereby forming the voice data into vectors.

The vector forming unit 202 outputs vector components (hereinafter sometimes referred to as "voice vectors") formed from the individual voice samples of one frame to a distance calculator 203.

The distance calculator 203 calculates the distance (for example, Euclidean distance) between each code vector registered in a codebook stored in a codebook storage unit 204 and the voice vector output from the vector forming unit 202, and supplies the distance obtained for each code vector, together with the code corresponding to the code vector, to a code determining unit 205.

That is, the codebook storage unit 204 stores the codebook as quality-improving data obtained as a result of learning in the learning unit 125 shown in FIG. 22, which is described below. The distance calculator 203 calculates the distance between each code vector registered in the codebook and the voice vector output from the vector forming unit 202, and supplies the calculated distance, together with the code corresponding to the code vector, to the code determining unit 205.

The code determining unit 205 detects the shortest distance among the distances for the code vectors supplied from the distance calculator 203, and determines the code corresponding to the code vector having the shortest distance, i.e., the code vector that minimizes the quantizing error (vector quantizing error) of the voice vector, as the vector quantizing result for the voice vector output from the vector forming unit 202. The code determining unit 205 then outputs the code as the vector quantizing result to the transmission controller 124 (FIG. 3) as the coded voice data.

Figure 22:
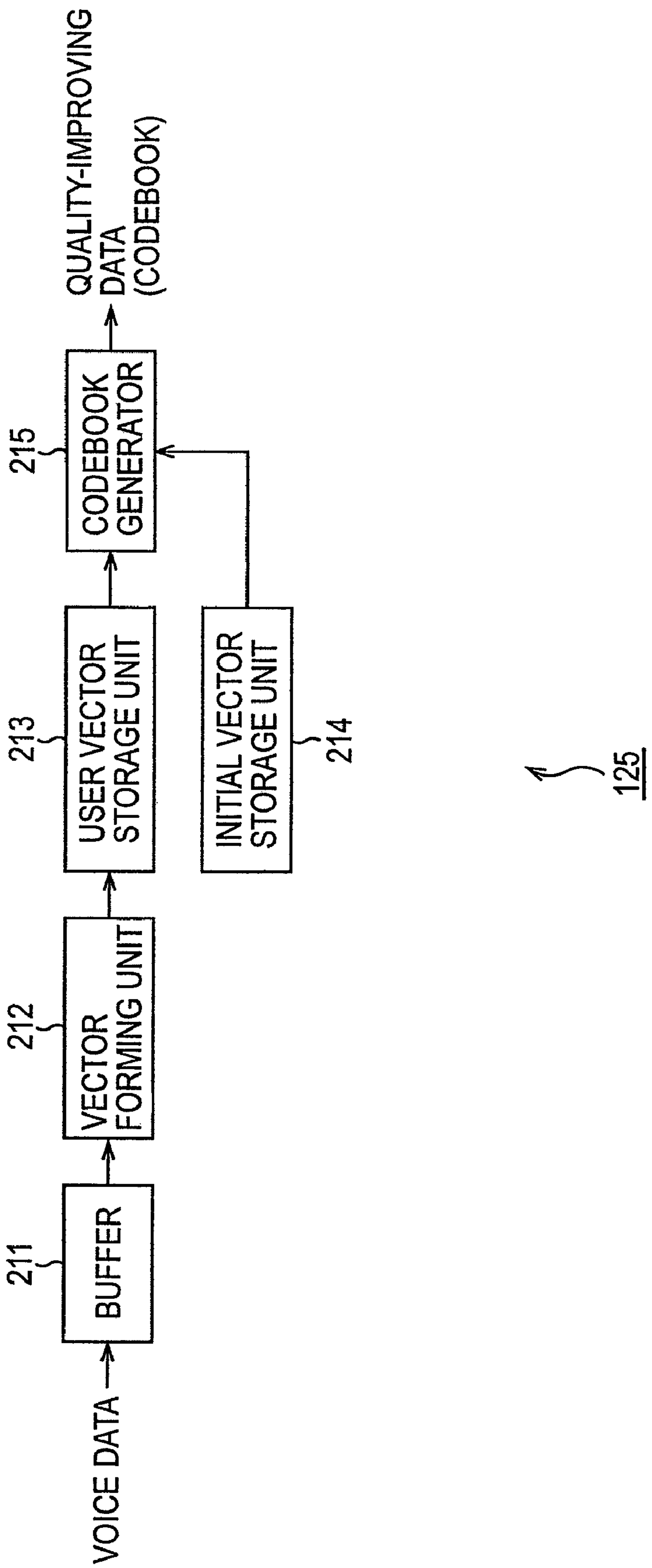
FIG. 22 is a block diagram illustrating an example of the configuration of the learning unit 125 in a case the coder 123 performs vector quantization.

FIG. 22 illustrates an example of the configuration of the learning unit 125 forming the transmitter 113 shown in FIG. 3 when the coder 123 is configured as shown in FIG. 21.

Voice data output from the A/D converter 122 is supplied to a buffer 211, and the buffer 211 stores the voice data therein.

The vector forming unit 212 forms voice vectors by using the voice data stored in the buffer 211, as in the vector forming unit 202 shown in FIG. 21, and supplies the voice vectors to a user vector storage unit 213.

The user vector storage unit 213, which is formed of, for example, an EEPROM, sequentially stores the voice vectors supplied from the vector forming unit 212. An initial vector storage unit 214, which is formed of, for example, a ROM, stores many voice vectors formed by using many unspecified users in advance.

A codebook generator 215 conducts learning for generating a codebook by using all the voice vectors stored in the initial vector storage unit 214 and the user vector storage unit 213 according to, for example, the LBG (Linde, Buzo, Gray) algorithm, and outputs the resulting codebook as quality-improving data.

The codebook output from the codebook generator 215 as the quality-improving data is supplied to the storage unit 126 (FIG. 3), and is stored therein together with updating information (time and date at which the codebook is obtained). The codebook is also supplied to the coder 123 (FIG. 21) and is written into the codebook storage unit 204.

When learning is conducted in the learning unit 125 shown in FIG. 22 for the first time, or when learning is conducted immediately after clearing the user vector storage unit 213, voice vectors are not stored in the user vector storage unit 213. Accordingly, the codebook generator 215 cannot generate a codebook merely by referring to the user vector storage unit 213. When the cellular telephone 101 has not been used for a long time, not many voice vectors are stored in the user vector storage unit 213. In this case, although a codebook can be generated in the codebook generator 215 by referring to the user vector storage unit 213, the precision of vector quantization conducted by using such a codebook is considerably low (large quantizing errors).

Accordingly, as discussed above, many voice vectors are stored in the initial vector storage unit 214, and by referring to not only the user vector storage unit 213, but also the initial vector storage unit 214, the codebook generator 215 can generate a codebook that allows vector quantization with a sufficiently high precision.

After a certain number of voice vectors is stored in the user vector storage unit 213, the codebook generator 215 may generate a codebook by referring to only the user vector storage unit 213 without referring to the initial vector storage unit 214.

A description is given below, with reference to the flowchart of FIG. 23, of learning processing for a codebook data, serving as quality-improving data, conducted in the learning unit 125 shown in FIG. 22.

Voice data issued, for example, during a telephone call or at a certain time, is supplied to the buffer 211 from the A/D converter 122 (FIG. 3), and the buffer 211 stores the voice data therein.

Then, when finishing a call, or after the lapse of a predetermined period from starting talking, the learning unit 125 starts learning processing by using, as new voice data, the voice data stored in the buffer 211 during a telephone call or the voice data stored in the buffer 211 from the start to the end of the conversation.

More specifically, the vector forming unit 212 reads the voice data stored in the buffer 211 in chronological order, and set a predetermined number of voice samples to be one frame so as to form the voice data of each frame into vectors. The vector forming unit 212 then supplies the resulting voice vectors to the user vector storage unit 213 and stores them therein.

Upon completion of forming all the voice data items stored in the buffer 211 into vectors, in step S121, the codebook generator 215 determines the vector $y_1$ for minimizing the sum of the distances with all the voice vectors stored in the user vector storage unit 213 and the initial vector storage unit 214. The codebook generator 215 then sets the vector $y_1$ to be the code vector $y_1$, and the process proceeds to step S122.

In step S122, the codebook generator 215 sets the number of currently obtained code vectors to be the variable n, and divides the code vectors $y_1, y_2, \ldots, y_n$ into two portions. More specifically, for example, when Δ is a very small vector, the codebook generator 215 generates the vector $y_i+\Delta$ and $y_i-\Delta$ from the code vector $y_i$ (i=1, 2, . . . n), and sets $y_i+\Delta$ to be a new code vector $y_i$ and sets $y_i-\Delta$ to be a new code vector $y_{n+i}$.

The process then proceeds to step S123 in which the codebook generator 215 classifies each voice vector $x_j$ (j=1, 2, . . . , J (the number of voice vectors stored in the user vector storage unit 213 and the initial vector storage unit 214)) stored in the user vector storage unit 213 and the initial vector storage unit 214 as the code vector $y_i$ (i=1, 2, . . . , 2n) having the shortest distance with the voice vector $x_j$. The process then proceeds to step S124.

In step S124, the codebook generator 215 updates the code vector $y_i$ so that the sum of the distances with the voice vectors classified as the code vector $y_i$ can be minimized. The updating of the code vector $y_i$ can be conducted by, for example, determining the centroid of the points indicated by at least 0 voice vector classified as the code vector $y_i$. That is, the vector indicating the centroid minimizes the sum of the distances with the voice vectors classified as the code vector $y_i$. However, if the number of voice vectors classified as the $y_i$ is 0, the code vector $y_i$ is maintained without being updated.

Then, the process proceeds to step S125 in which the codebook generator 215 determines the sum of the distances with the voice vectors (hereinafter sometimes referred to as the "distance sum for the code vector $y_i$) classified as the updated code vector $y_i$, and also determines the total of the distance sums (hereinafter sometimes referred to as the "total sum") for all the code vectors $y_i$. Then, the codebook generator 215 determines a change in the total sum, i.e., whether the absolute value of the difference between the total sum determined in current step S125 (hereinafter sometimes referred to as the "current total sum") and the total sum determined in previous step S125 (hereinafter sometimes referred to as the "previous total sum") is lower than or equal to a predetermined threshold.

If it is determined in step S125 that the absolute value of the difference between the current total sum and the previous total sum is higher than the predetermined threshold, i.e., that the total sum has changed significantly after updating the code vector $y_i$, the process returns to step S123, and processing similar to the above-described processing is repeated.

If it is determined in step S125 that the absolute value of the difference between the current total sum and the previous total sum is lower than or equal to the predetermined threshold, i.e., that the total sum has not changed significantly even after updating the code vector $y_i$, the process proceeds to step S126. In step S126, the codebook generator 215 determines whether the variable n indicating the number of currently obtained code vectors is equal to the number N of code vectors preset in the codebook (hereinafter sometimes referred to as the "the number of set code vectors").

If it is determined in step S126 that the variable n is not equal to the number N of set code vectors, i.e., that the same number of code vectors $y_i$ as the number N of set code vectors have not been obtained, the process returns to step S122, and processing similar to the above-described processing is repeated.

If it is determined in step S126 that the variable n is equal to the number N of set code vectors, i.e., that the same number of code vectors $y_i$ as the number N of set code vectors have been obtained, the codebook generator 215 outputs the codebook consisting of the N code vectors $y_i$ as the quality-improving data, and completes the learning processing.

Figure 23:
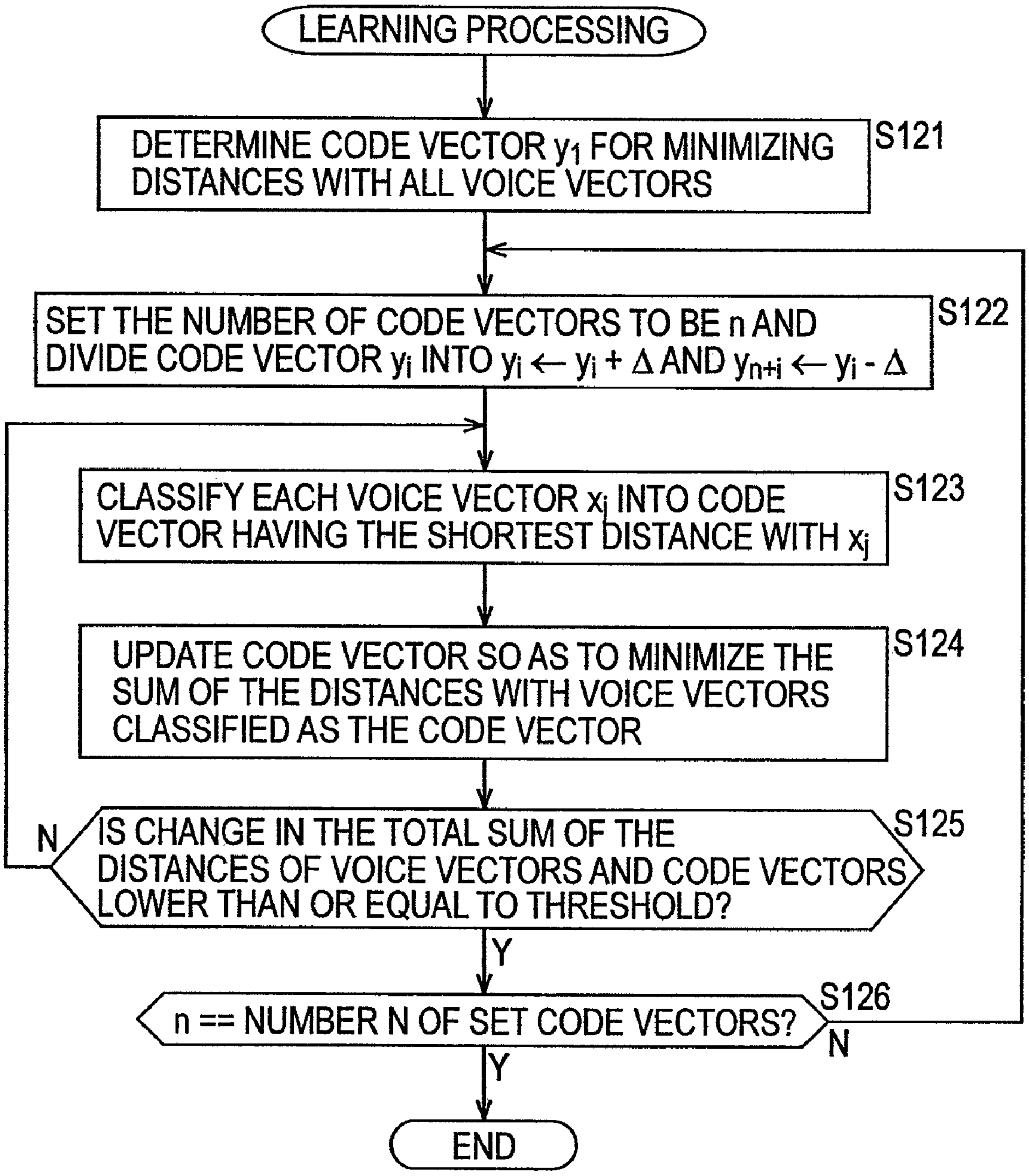
FIG. 23 is a flowchart illustrating learning processing performed by the learning unit 125 in a case the coder 123 performs vector quantization.

In the learning processing shown in FIG. 23, the previous voice vectors are stored in the user vector storage unit 213, and the codebook is updated (generated) by using the voice vectors. However, the updating of the codebook may be performed in a simplified manner in steps S123 and S124 without storing the previous voice vectors only by using the current voice vectors and the obtained codebook.

In this case, in step S123, the codebook generator 215 classifies the current voice vector $x_j$ (j=1, 2, . . . , J (the number of current voice vectors) as the code vector $y_i$ (i=1, 2, . . . , N (the number of code vectors in the codebook) having the shortest distance with the voice vector $x_j$, and the process proceeds to step S124.

In step S124, the codebook generator 215 updates each code vector $y_i$ so that the sum of the distances with the voice vectors classified as the code vector $y_i$ can be minimized. As discussed above, the updating of the code vector $y_i$ can be performed by determining the centroid of the points indicated by at least 0 voice vector classified as the code vector $y_i$. Accordingly, when the updated code vector is indicated by $y_i'$, when the previous voice vectors classified as the code vector $y_i$ before being updated are represented by $x_1, x_2, \ldots, x_{M-L}$, and when the current voice vectors classified as the code vector $y_i$ are indicated by $x_{M-L+1}, x_{M-L+2}, \ldots x_M$, the code vector $y_i$ before being updated and the code vector $y_i'$ after being updated can be determined by equations (14) and (15), respectively.

$$y_i=(x_1+x_2+\ldots+x_{M-L})/(M-L) \tag{14}$$

$$y_i'=(x_1+x_2+\ldots+x_{M-L}+x_{M-L+1}+x_{M-L+2}+\ldots+x_M)/M \tag{15}$$

In this case, the previous voice vectors $x_1, x_2, \ldots, x_{M-L}$ are not yet stored. Accordingly, equation (15) is modified into the following equation.

$$\begin{aligned} y_i' &= \left(\begin{matrix} x_1+x_2+\ldots+x_{M-L}+ \\ x_{M-L+1} \end{matrix}\right) \Big/ M + (x_{M-L+2}+\ldots+x_M)/M \\ &= \left(\begin{matrix} x_1+x_2+\ldots+x_{M-L}+ \\ x_{M-L+1} \end{matrix}\right) \Big/ (M-L)\times(M-L)/M + \\ &\quad (x_{M-L+2}+\ldots+x_M)/M \end{aligned} \tag{16}$$

The following equation is obtained by substituting equation (14) into equation (16).

$$y_i'=y_i\times(M-L)/M+(x_{M-L+2}+\ldots+x_M)/M \tag{17}$$

According to equation (17), by using the current voice vectors $x_{M-L+1}, x_{M-L+2}, \ldots, x_M$ and the code vector $y_i$ in the obtained codebook, the code vector $y_i$ can be updated, resulting in the updated code vector $y_i$.

In this case, since it is not necessary to store the previous voice vectors, the storage capacity of the user vector storage unit 213 can be smaller. In this case, however, not only the current voice vectors, but also the number of voice vectors classified as the code vector $y_i$ so far has to be stored in the user vector storage unit 213, and also, in accordance with the updating of the code vector $y_i$, the number of voice vectors classified as the updated code vectors $y_i'$ has to be updated. In the initial vector storage unit 214, instead of many voice vectors formed by using the voice data of many unspecified users, the codebooks generated by using such many voice vectors and the number of voice vectors classified as each code vector have to be stored. When conducting learning in the learning unit 125 shown in FIG. 22 for the first time, or when learning is conducted immediately after clearing the user vector storage unit 213, the codebook is updated by using the codebook stored in the initial vector storage unit 214.

As described above, in the learning unit 125 shown in FIG. 22, the learning processing shown in FIG. 23 based on new voice data and the previously learned voice data is performed during a telephone call or at another time. Accordingly, as the user makes more telephone calls, the codebook suitable for the user, i.e., the codebook that can reduce the quantizing error for the user voice can be determined. Thus, by decoding (vector dequantizing) the coded voice data by using such a codebook at the communicating party, the processing (vector dequantization processing) suitable for the characteristic of the user's voice can be performed, and decoded voice data having a higher quality over that in the related art (when using the codebook determined from many unspecified users) can be obtained.

Figure 24:
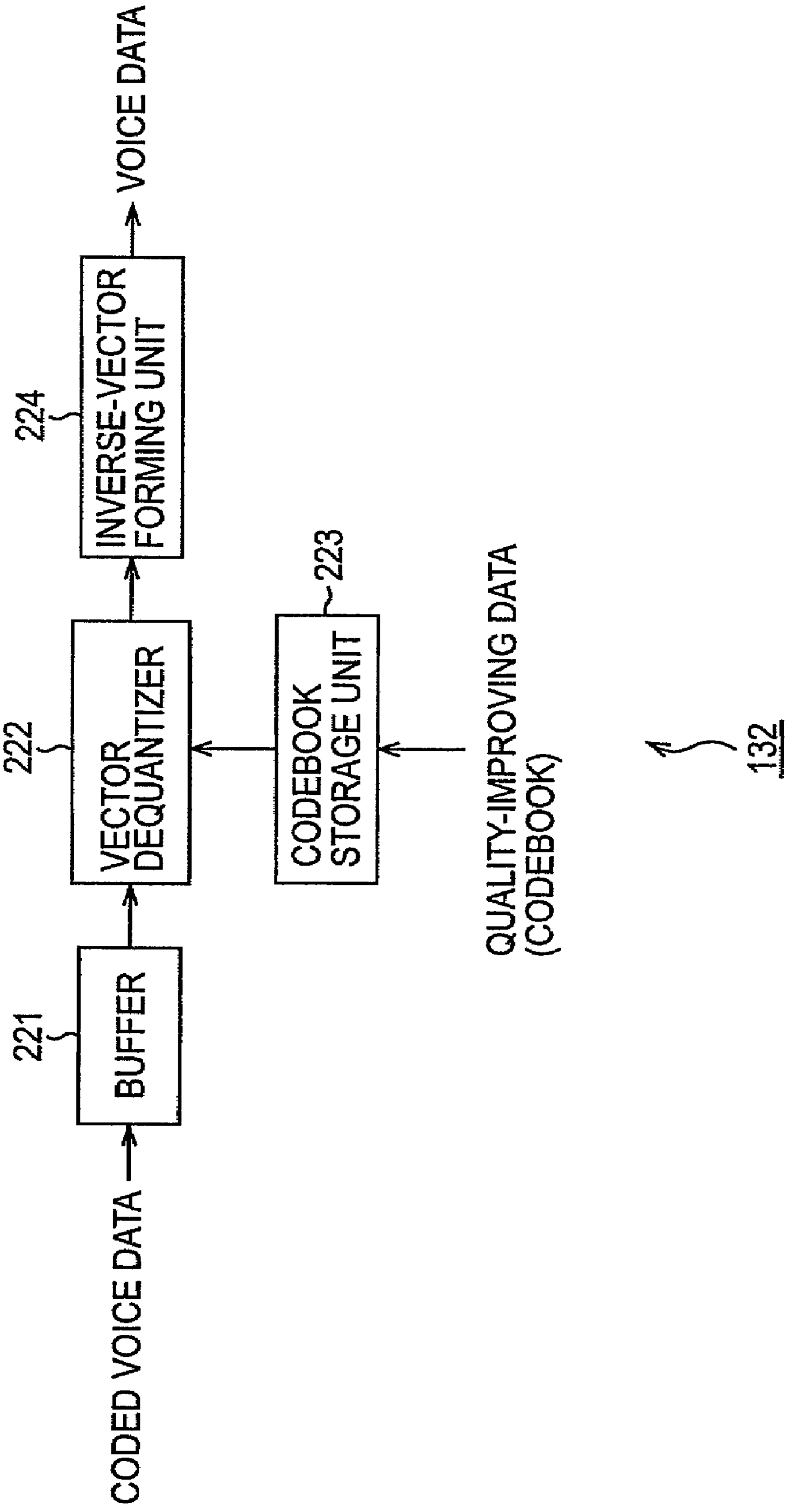
FIG. 24 is a block diagram illustrating an example of the configuration of the decoder 132 in a case the coder 123 performs vector quantization.

FIG. 24 illustrates an example of the configuration of the decoder 132 of the receiver 114 (FIG. 4) when the learning unit 125 of the transmitter 113 (FIG. 3) is configured as shown in FIG. 22.

A buffer 221 temporarily stores coded voice data (code as a vector quantization result) output from the reception controller 131 (FIG. 4). A vector dequantizer 222 reads the code stored in the buffer 221 and performs vector dequantization on the code by referring to the codebook stored in a codebook storage unit 223, thereby decoding the code into voice vectors. Then, the vector dequantizer 222 supplies the voice vectors to an inverse-vector forming unit 224.

The codebook storage unit 223 stores the codebook supplied from the manager 135 as quality-improving data.

When the learning unit 125 of the transmitter 113 (FIG. 3) is configured as shown in FIG. 22, the codebook is stored in the storage unit 136 of the receiver 114 (FIG. 4) since the codebook serves as the quality-improving data. In this case, in the default data memory 137 of the receiver 114, the codebook generated by using, for example, voice vectors stored in the initial vector storage unit 214 shown in FIG. 22, is stored as default data.

The inverse-vector forming unit 224 forms the voice vectors output from the vector dequantizer 222 into inverse vectors and outputs them time-series voice data.

Figure 25:
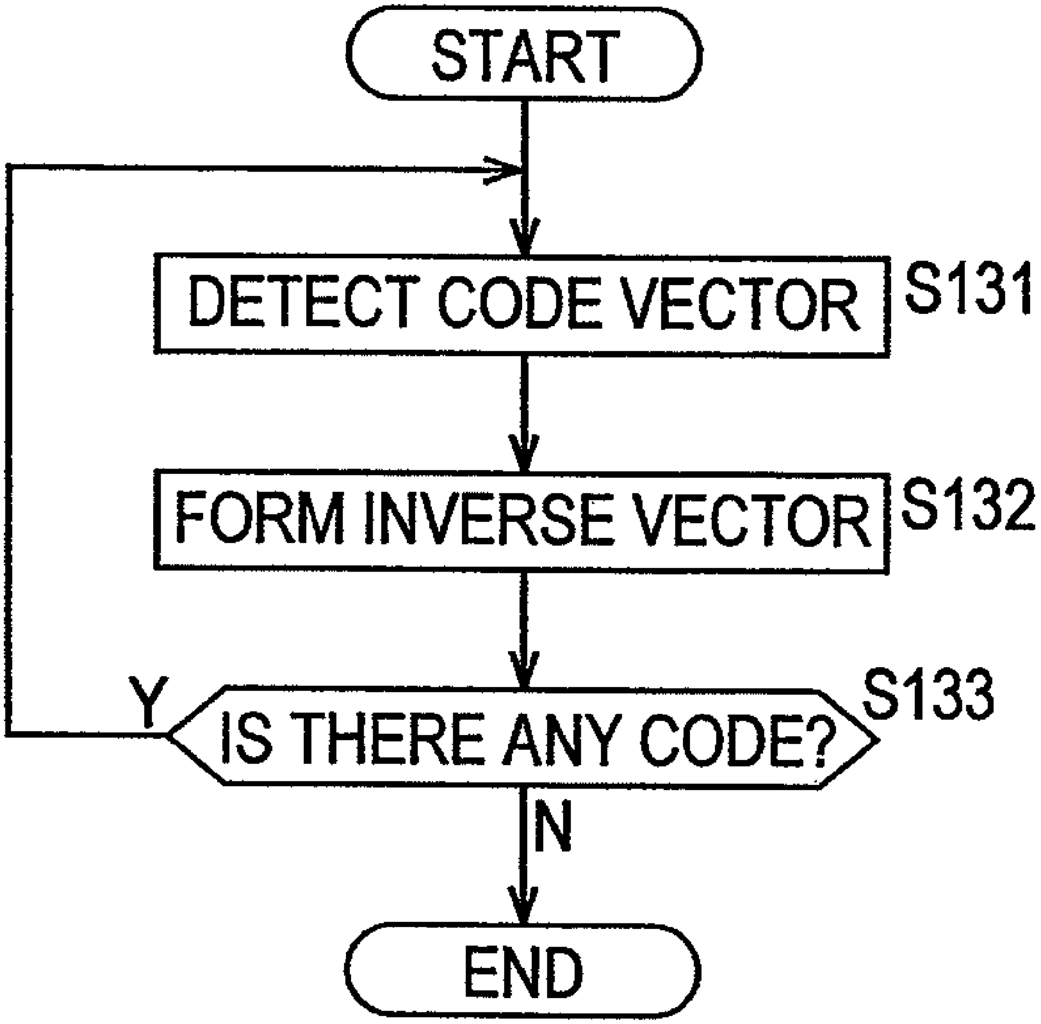
FIG. 25 is a flowchart illustrating the processing performed by the decoder 132 in a case the coder 123 performs vector quantization.

The processing (decoding processing) of the decoder 132 of FIG. 24 is described below with reference to the flowchart of FIG. 25.

The buffer 221 sequentially stores the codes as coded voice data.

In step S131, the vector dequantizer 222 reads the temporally oldest code, which has not yet been read, stored in the buffer 221 as a selected code, and dequantizes the selected code. That is, the vector dequantizer 222 detects the code vector with a selected code among the code vectors of the codebook stored in the codebook storage unit 223, and outputs the code vector to the inverse-vector forming unit 224 as a voice vector.

In step S132, the inverse-vector forming unit 224 forms the voice vector output from the vector dequantizer 22 into an inverse vector so as to decode the voice vector into voice data, and outputs the voice data. The process then proceeds to step S133.

In step S133, the vector dequantizer 222 determines whether there is any unselected code in the buffer 221. If it is determined in step S133 that there is an unselected code in the buffer 221, the process returns to step S131 in which the temporally oldest code, which has not yet been read, is read from the buffer 221. Thereafter, processing similar to the above-described processing is repeated.

If it is determined in step S133 that there is no unselected code stored in the buffer 221, the processing is completed.

In the foregoing examples, tap coefficients in the classification adaptive processing or codebooks are used as quality-improving data. However, elements other than those elements, for example, parameters concerning the transmission mode, such as the modulation method or the bit rate, parameters concerning the coding structure, such as the coding method, or parameters concerning creations, such as the class structure or the predictive structure, may be used.

The quality-improving data generated and used as described above is stored in the storage unit 136 or 126 in the form of a database (as a user information database) in association with the communicating party (telephone number). As stated above, before generating quality-improving data by the learning of the learning unit 125, a default database supplied as the initial value is stored in the default data memory 137 or the storage unit 136 or 137 for use. For example, if the manager 135 fails to search for the telephone number at the calling side in a user information database, which is described below, it sets quality-improving data by using a default database, such as that shown in FIG. 26A, 26B, or 26C.

Various parameters used as quality-improving data are stored in the default database of the default database memory 137 in association with features to be measured. For example, in FIG. 26A, the quality-improving data is associated with the amount of noise, and the levels of the modulation method, bit rate, coding method, codebook, class structure, predictive structure, and predictive coefficients can be selected in accordance with the amount of noise contained in the reception signal.

For example, if the amount of noise contained in the reception signal is greater than two predetermined reference values and is thus determined as "high", the manager 135 accesses the default data memory 137, and sets the modulation method to be "A", the bit rate to be "B", the coding method to be "C", the codebook to be "A", the class structure to be "B", the predictive structure to be "C", and the predictive coefficient to be "A" based on the default database shown in FIG. 26A.

Alternatively, the quality-improving data may be associated with the signal intensity of the reception signal, as in FIG. 26B, or the carrier frequency of the reception signal, as in FIG. 26C. The quality-improving data may be associated with other features or a combination of such features.

FIGS. 27A and 27B illustrate examples of the user information databases stored in the storage unit 136.

The user information database is a database in which the levels of the quality-improving data are associated with the current communicating party (telephone number). In the user information database stored in the storage unit 136, as shown in FIG. 27A, the levels set for the quality-improving data, such as the modulation method, bit rate, coding method, codebook, class structure, predictive structure, and predictive coefficients, are associated with each user.

More specifically, for example, when performing voice communication with the first user, the manager 135 sets the modulation method to be "A", the bit rate to be "C", the coding method to be "A", the codebook to be "D", the class structure to be "B", the predictive structure to be "C", and the predictive coefficient to be "B" based on the user information database shown in FIG. 27A.

As the above-described levels, the levels that were most recently set may be stored in association with the communicating party. However, it is preferable that the levels that are most related to the communicating party and were most frequently used in the past be stored in association with the communicating party.

Alternatively, a plurality of set levels may be associated with one communicating party. In FIG. 27B, a plurality of set levels are associated with one user, and the priority is set in each database.

Accordingly, for example, when the communicating party is the first user, the manager 125 first sets the quality-improving data with the priority "1" based on the user information database shown in FIG. 27B, and then, if high quality voice cannot be obtained due to, for example, a communication environment, the manager 125 selects the quality-improving data with the priority "2" or lower in response to a user's instruction.

As stated above, the quality-improving data is information, such as the above-described tap coefficients or codebook, generated by the cellular telephone of the communicating party and is received by the receiver 114. Alternatively, the quality-improving data may be information, such as the class codes or predictive taps, generated by the decoder 132 of the receiver 114.

Figure 28:
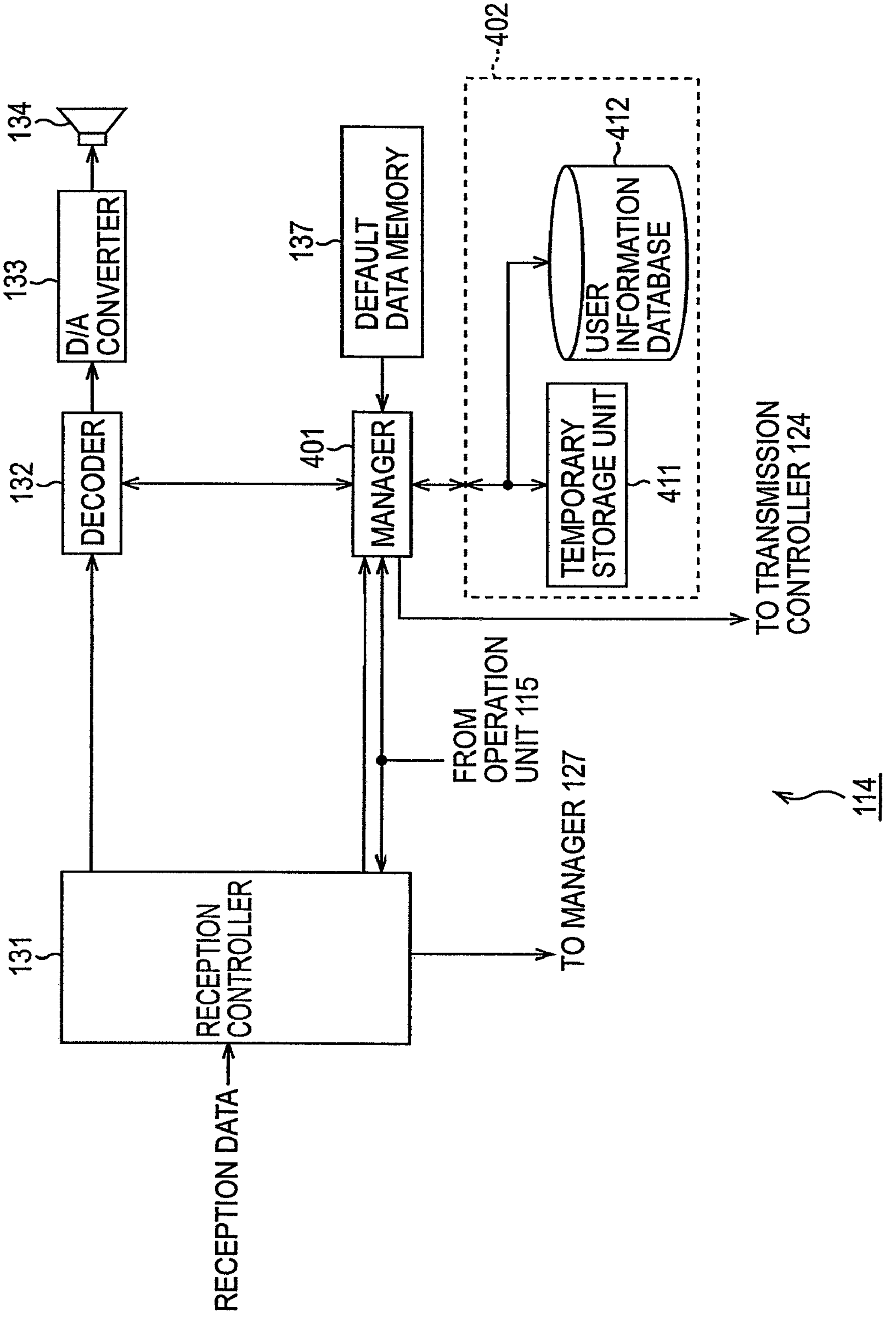
FIG. 28 is a block diagram illustrating another example of the configuration of the receiver 114.

FIG. 28 illustrates another example of the internal configuration of the receiver 114.

In FIG. 28, a manager 401 supplies quality-improving data supplied from the reception controller 131 to the decoder 132 and sets it therein, and also obtains quality-improving data generated in the decoder 132 from the decoder 132.

The quality-improving data is supplied to a storage unit 402 from the manager 401, and is temporarily stored in a temporal storage unit 411 built in the storage unit 402. When the updating of a user information database 412 is determined in response to a user's instruction, as discussed below, the quality-improving data stored in the temporal storage unit 411 is reflected on the user information database 412. In the user information database 412, quality-improving data optimal for each user (each communicating party) is registered, and when quality-improving data is supplied from the temporal storage unit 411, the user information database 412 calculates the optimal quality-improving data by including the supplied quality-improving data, and stores it.

The manager 401 obtains the optimal quality-improving data corresponding to the communicating party stored as described above, and sets the quality-improving data in the decoder 132. The manager 401 also supplies related information to the transmission controller 124 and controls it to supply the related information to the cellular telephone of the communicating party.

Figure 29:
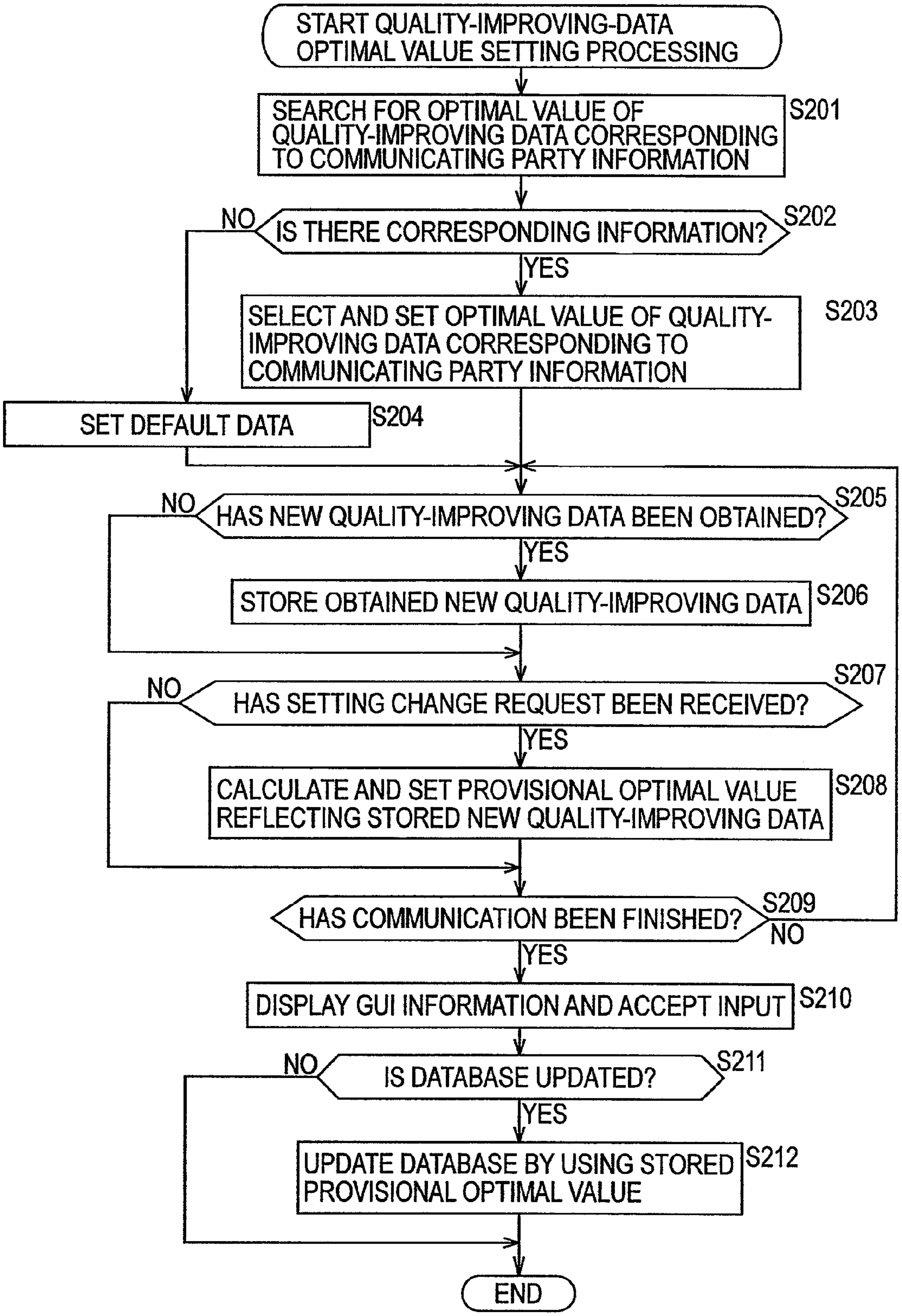
FIG. 29 is a flowchart illustrating quality-improving-data optimal value setting processing.

Quality-improving-data optimal value setting processing performed by the manager 401 is described below with reference to the flowchart of FIG. 29.

In step S201, when obtaining information concerning the communicating party, such as the telephone number of the communicating party, from the reception controller 131, based on this information, the manager 401 searches the user information database 412 of the storage unit 402 for the optimal values of the quality-improving data corresponding to the communicating party information.

Then, in step S202, the manager 401 determines whether the corresponding information has been found based on a search result supplied from the user information database 412. If it is determined that the optimal values of the quality-improving data corresponding to the communicating party information exist in the user information database 412, the process proceeds to step S203. In step S203, the manager 401 selects the optimal values of the quality-improving data associated with the communicating party information and supplies them to the decoder 132 and sets them therein. After setting the optimal values of the quality-improving data, the manager 401 proceeds to step S205.

If it is determined in step S202 that the optimal values of the quality-improving data associated with the communicating party information does not exist in the user information database 412, the manager 401 proceeds to step S204. In step S204, the manager 401 obtains the corresponding default data from a default database, such as that shown in FIG. 26A, 26B, or 26C, stored in the default data memory 137, and supplies the default data to the decoder 132 and sets it therein. After setting the default data, the manager 401 proceeds to step S205.

After the optimal values of the quality-improving data or the default data are set, voice communication is started, and the quality-improving data is generated in the decoder 132 and is supplied to the manager 401, and also, the quality-improving data supplied from the communicating party is supplied to the manager 401 from the reception controller 131.

In step S205, the manager 401 determines whether new quality-improving data has been obtained. If it is determined that new quality-improving data has been obtained, the manager 401 proceeds to step S206. In step S206, the manager 401 supplies the obtained new quality-improving data to the temporary storage unit 411 of the storage unit 402 and stores it therein. The process then proceeds to step S207.

If it is determined in step S205 that new quality-improving data has not been obtained, the manager 401 proceeds to step S207 by skipping step S206.

If the user finds during voice communication that the quality is not good, he/she operates the operation unit 115 to request the manager 401 to change the data set in step S203 or S204. That is, the user operates the operation unit 115 to supply a setting change request to the manager 401 so as to reflect the quality-improving data generated for the current voice communication in the set values.

In step S207, the manager 401 determines whether the setting change request has been received. If it is determined that the request has been received, the process proceeds to step S208. In step S208, the manager 401 calculates the provisional optimal values reflecting the stored new quality-improving data, and supplies the provisional optimal values to the decoder 132 and sets them therein. The process then proceeds to step S209.

If it is determined in step S207 that a setting change request has not been received, the manager 401 proceeds to step S209 by skipping step S208.

In step S209, the manager 401 determines whether voice communication has finished, and if it is not finished, the process returns to step S205, and step S205 and the subsequent steps are repeated. If it is determined that voice communication has finished, the manager 401 proceeds to step S210.

After finishing voice communication, in step S210, the manager 401 displays on a display (not shown) predetermined GUI (Graphical User Interface) information for allowing the user to select whether the user information database 412 is to be updated, and accepts the input via the operation unit 115.

In step S211, the manager 401 determines whether the user information database 412 is to be updated in response to the input user's instruction, and if it is determined that the user information database 412 is to be updated, the process proceeds to step S212. In step S212, the manager 412 updates the user information database 412 by using the stored provisional optimal values, and completes the quality-improving-data optimal value setting processing.

If it is determined in step S211 that the user information database 412 is not updated, the manager 401 completes the quality-improving-data optimal value setting processing by skipping step S212.

As described above, quality-improving data is calculated and stored in the cellular telephone. However, as shown in FIG. 30, quality-improving data may be calculated and stored in a switching center, and be supplied to a cellular telephone during voice communication.

Figure 30:
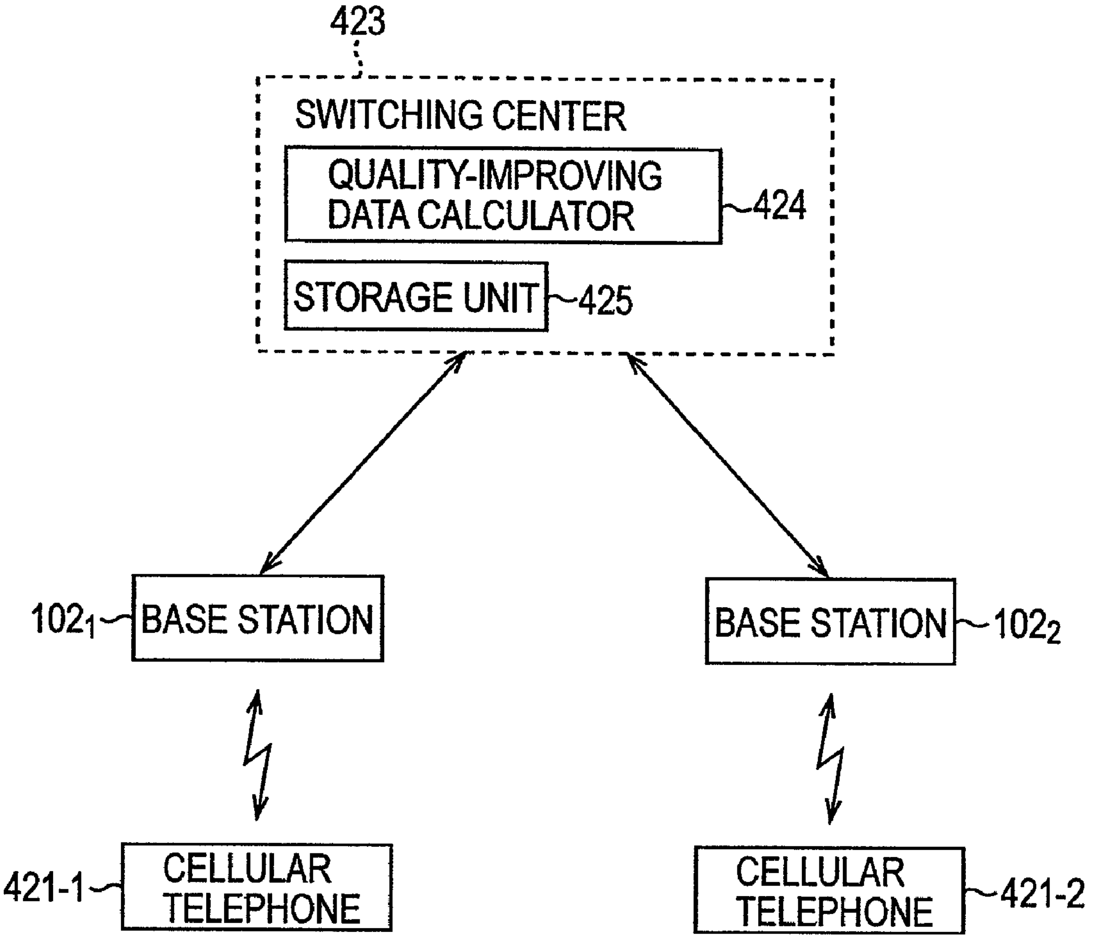
FIG. 30 is a block diagram illustrating another example of the configuration of the transmission system to which the present invention is applied.

In FIG. 30, a switching center 423 includes a quality-improving data calculator 424 and a storage unit 425, and generates quality-improving data to be used in cellular telephones 421-1 and 421-2 and stores it. When, for example, performing voice communication between the cellular telephones 421-1 and 421-2, the switching center 423 supplies the corresponding quality-improving data to both the cellular telephones 421-1 and 421-2 and sets it therein.

The cellular telephones 421-1 and 421-2 are referred to as the "cellular telephone 421" unless they have to be distinguished.

A description is given below, assuming that tap coefficients used in the classification adaptive processing are used as quality-improving data.

When the tap coefficients used in the classification adaptive processing are used as the quality-improving data, the example of the internal configuration of the cellular telephone 101 shown in FIG. 2 can also be used as an example of the internal configuration of the cellular telephone 421 since the cellular telephone 421 is configured similarly to the cellular telephone 101 shown in FIG. 2. However, the transmitter 113 of the cellular telephone 421 is configured, as shown in FIG. 31, which is different from the example of the configuration of the transmitter 113 shown in FIG. 3.

Figure 31:
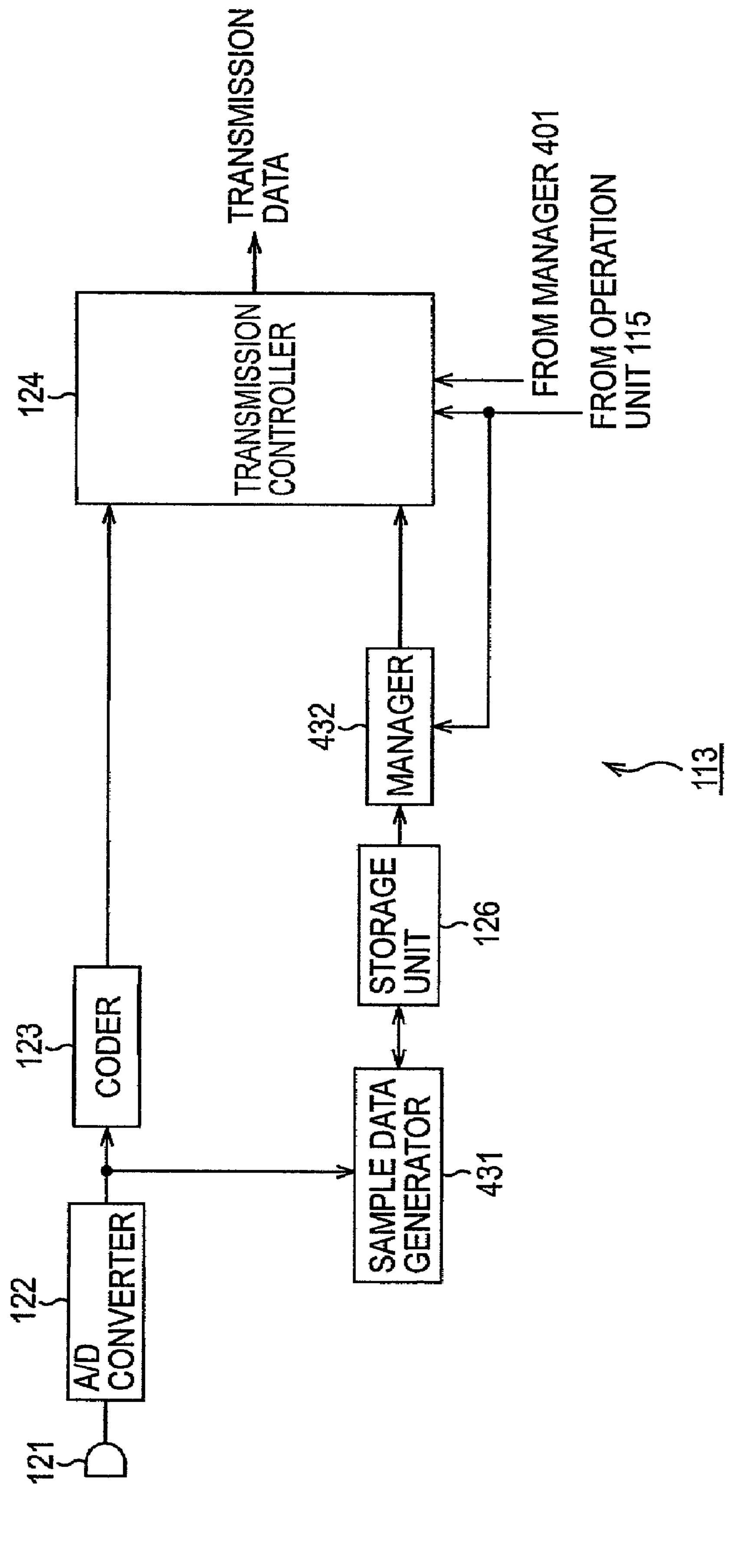
FIG. 31 is a block diagram illustrating another example of the configuration of the transmitter 113.

In the transmitter 113 shown in FIG. 31, a sample data generator 431 is formed instead of the learning unit 125 of the transmitter 113 shown in FIG. 3. The sample data generator 431 extracts a predetermined number of data items from the voice data digitized in the A/D converter 122, and stores them in the storage unit 126 as sample data.

Unlike the manager 127 shown in FIG. 3, a manager 432 shown in FIG. 31 obtains the sample data, which is non-compressed voice data stored in the storage unit 126, and supplies it to the switching center 423 via the transmission controller 124.

Figure 32:
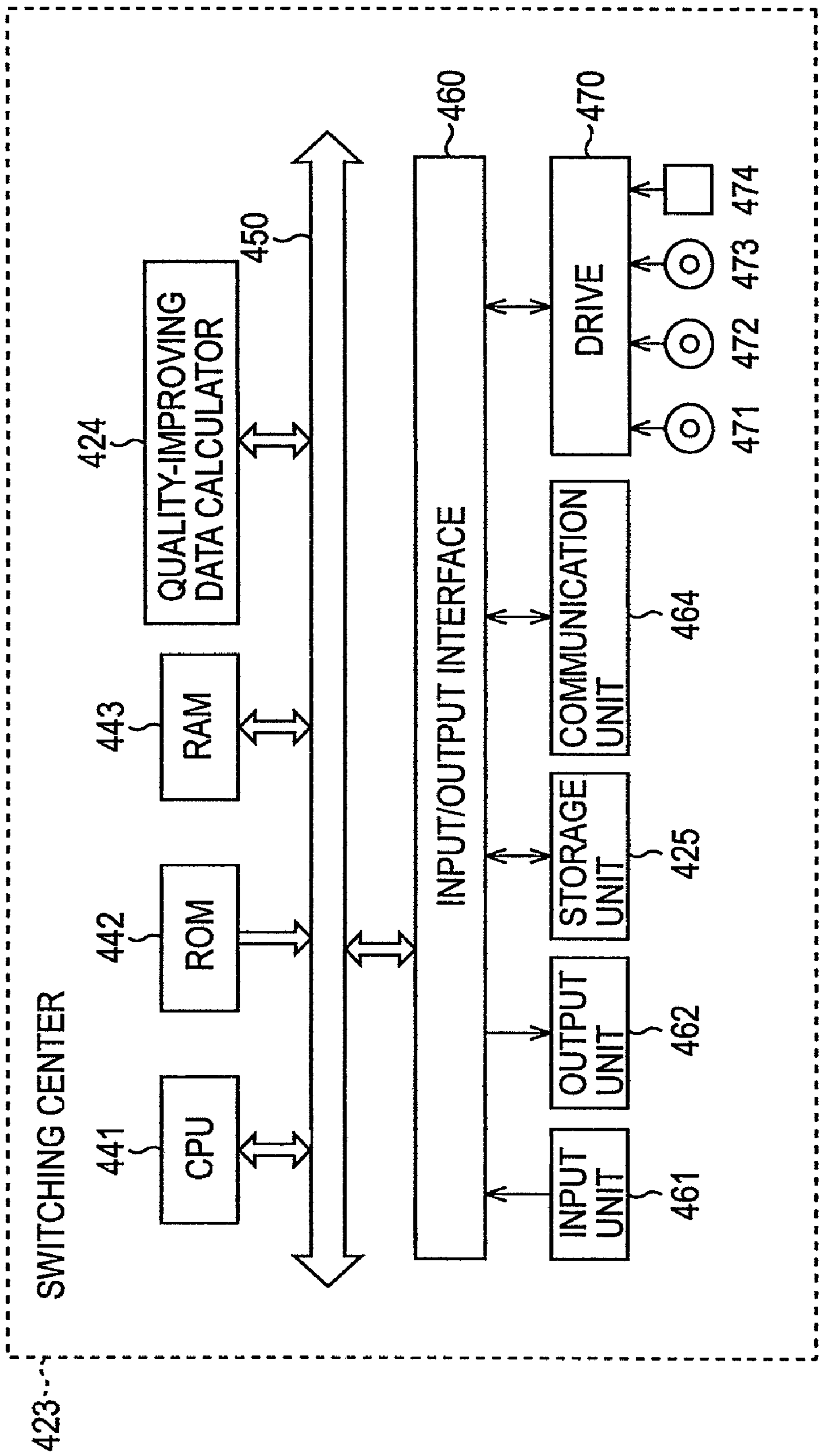
FIG. 32 is a block diagram illustrating an example of the configuration of a switching center 423.

FIG. 32 illustrates an example of the internal configuration of the switching center 423.

In FIG. 32, a CPU (Central Processing Unit) 441 of the switching center 423 executes various types of processing according to a program stored in a ROM 442 or a program loaded into a RAM (Random Access Memory) 443 from a storage unit 425. In the RAM 423, data required for executing various types of processing by the CPU 441 is also stored.

The CPU 441, the ROM 442, and the RAM 443 are connected to each other via a bus 450. The quality-improving data calculator 424 is connected to the bus 450 so that it can generate tap coefficients used for the classification adaptive processing from sample data obtained via a communication unit 464.

An input/output interface 460 is also connected to the bus 450. The input/output interface 460 is connected to an input unit 461 including a keyboard and a mouse, an output unit 462 including a display, for example, a CRT (Cathode Ray Tube) or an LCD (Liquid Crystal Display), and a speaker, the storage unit 425 including a hard disk, and the communication unit 464 for communicating with the base station 102.

The storage unit 425 stores programs and data executed in the switching center 423, and also stores a user information database in which the optimal values of quality-improving data calculated in the quality-improving data calculator 424 are associated with users.

A drive 470 is also connected to the input/output interface 460, and a magnetic disk 471, an optical disc 472, a magneto-optical disk 473, or a semiconductor memory 474 is loaded into the drive 470, and computer programs read from such a recording medium are installed into the storage unit 425.

Figure 33:
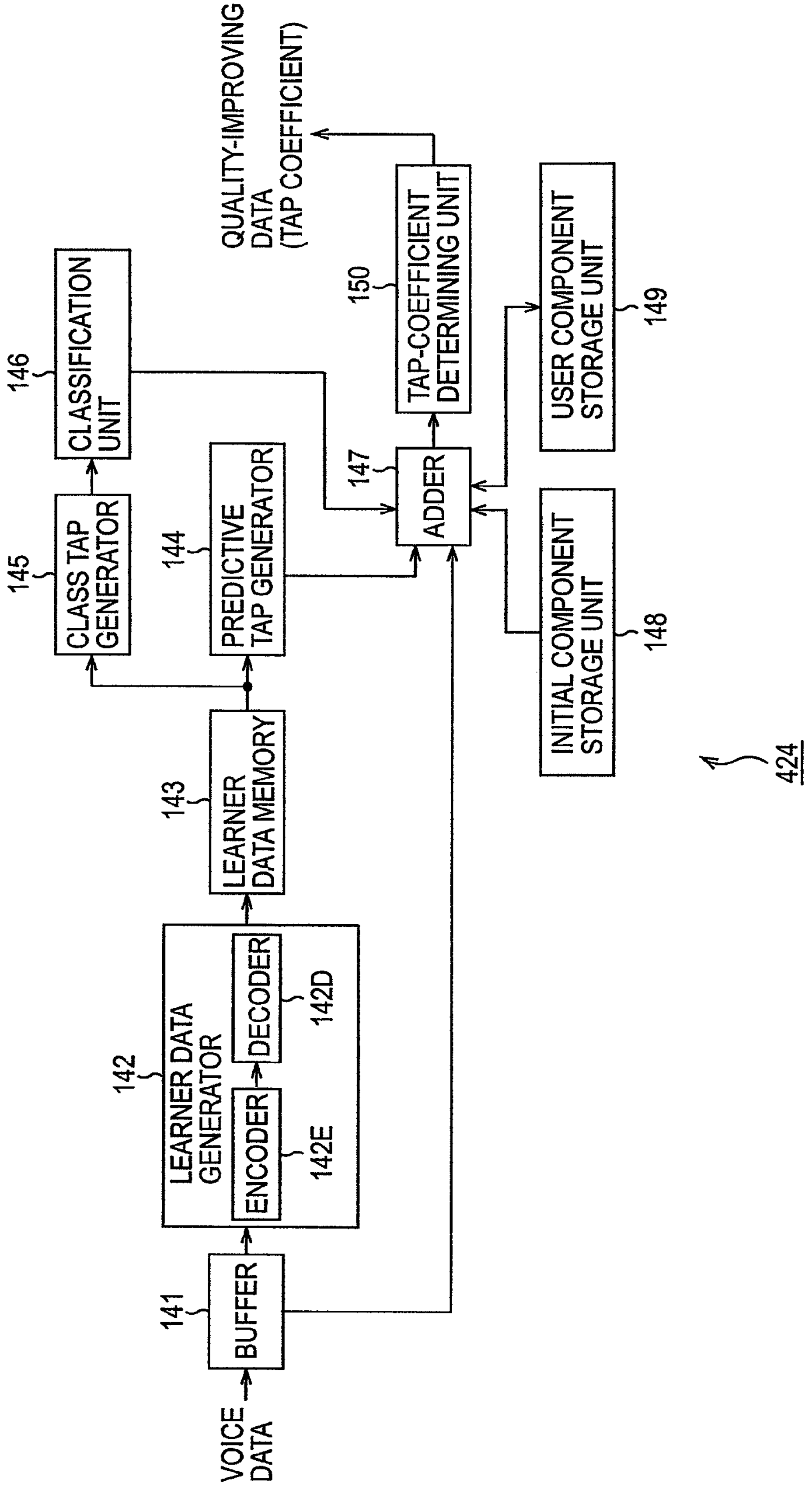
FIG. 33 is a block diagram illustrating an example of the configuration of a quality-improving data calculator 424.

FIG. 33 is a block diagram illustrating an example of the internal configuration of the quality-improving data calculator 424 shown in FIG. 32.

The configuration and the operation of the individual elements shown in FIG. 33 are similar to those of the learning unit 125 shown in FIG. 14, and an explanation thereof is thus omitted. In the quality-improving data calculator 424, voice data input into the buffer 141 is sample data, which is non-compressed voice data, input via the communication unit 464, and the quality-improving data calculator 424 calculates tap coefficients based on this sample data and outputs them as quality-improving data.

Figure 34:
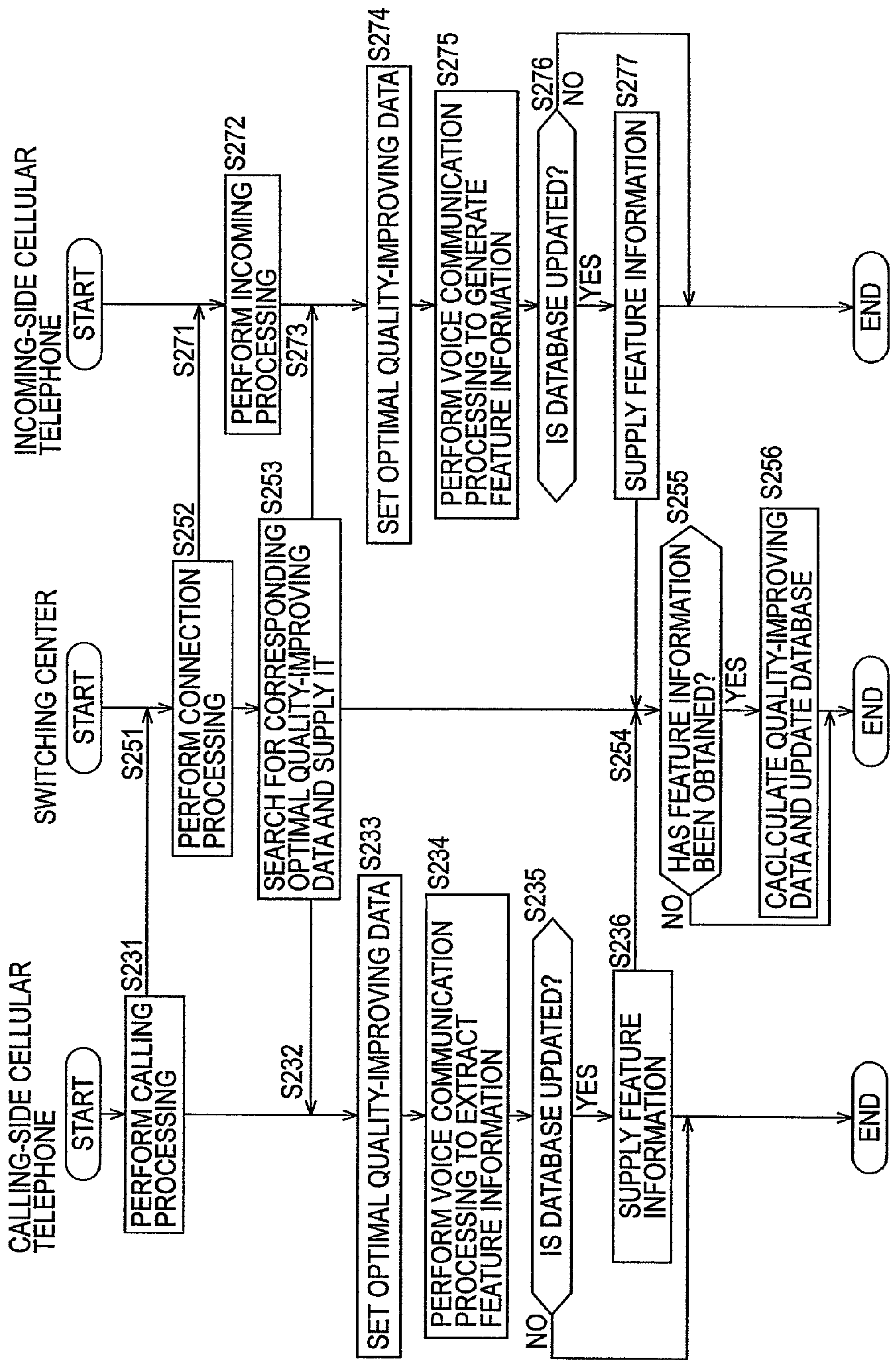
FIG. 34 is a flowchart illustrating processing performed by the transmission system shown in FIG. 30.

A description is now given, with reference to the flowchart of FIG. 34, of quality-improving-data usage processing performed by the cellular telephones 421-1 and 421-2 and the switching center 423 in the transmission system shown in FIG. 30. It is now assumed that the cellular telephone 421-1 is a telephone at the calling side and the cellular telephone 421-2 is a telephone at the incoming side.

In step S231, based on a user's instruction, the transmitter 113 and the receiver 114 of the cellular telephone 421-1 at the calling side perform calling processing for the cellular telephone 421-2 owned by the user, which is the communicating party, and access the switching center 423 to make a connection request.

In step S251, the CPU 441 of the switching center 423 receives the connection request, and then, in step S252, the CPU 441 controls the communication unit 464 to perform connection processing and to access the cellular telephone 421-2 at the incoming side, thereby making a connection request.

In step S271, the transmitter 113 and the receiver 114 of the cellular telephone 421-2 receive the connection request, and then, in step S272, the transmitter 113 and the receiver 114 perform incoming processing to establish a connection with the cellular telephone 421-1.

After establishing a connection, in step S253, the CPU 441 of the switching center 423 searches the user information database stored in the storage unit 425 for the optimal quality-improving data for the cellular telephones 421-1 and 421-2. If optimal quality-improving data has been found, the CPU 441 controls the communication unit 464 to supply the data to the corresponding cellular telephones. If there is no corresponding quality-improving data, the CPU 441 of the switching center 423 searches the default database stored in the storage unit 425 for default data, and controls the communication unit 464 to supply the default data, instead of the optimal quality-improving data, to the cellular telephones.

In step S232, the receiver 114 of the cellular telephone 421-1 receives the optimal quality-improving data (or default data) supplied from the switching center 423, and then, in step S233, the receiver 114 sets the received data.

After setting the quality-improving data (default data), in step S234, the transmitter 113 and the receiver 114 of the cellular telephone 421-1 perform voice communication processing with the cellular telephone 421-2, and extract feature information, which is information concerning the features generated in the voice communication processing.

When voice communication processing is completed to disconnect the line with the cellular telephone 421-2, in step S235, the transmitter 113 of the cellular telephone 421-1 determines based on a user's instruction input via the operation unit 115 whether the user information database is to be updated. If it is determined that the user information database is to be updated, in step S236, the transmitter 113 supplies the extracted feature information to the switching center 423, and completes the processing. If it is determined in step S235 that the user information database is not updated, the transmitter 113 completes the processing by skipping step S236.

As in the cellular telephone 421-1, in step S273, the receiver 114 of the cellular telephone 421-2 receives the optimal quality-improving data (or default data) supplied in step S253. Then, in step S274, the receiver 114 sets the obtained optimal quality-improving data (or default data).

After setting the data, in step S275, the transmitter 113 and the receiver 114 of the cellular telephone 421-2 perform voice communication processing with the cellular telephone 421-1, and extract the feature information, which is information concerning the features to be generated in the voice communication processing.

After finishing the voice communication processing to disconnect the line with the cellular telephone 421-1, in step S276, the transmitter of the cellular telephone 421-2 determines based on a user's instruction input via the operation unit 115 whether the user information database is to be updated. If it is determined that the user information database is to be updated, in step S277, the transmitter 113 supplies the extracted feature information to the switching center 423, and completes the processing. If it is determined in step S276 that the user information database is not updated, the transmitter 113 completes the processing by skipping step S277.

After supplying the optimal quality-improving data (or default data) in step S253, in step S254, the CPU 441 of the switching center 423 may receive the feature information from the cellular telephone 421-1 in step S236 or from the cellular telephone 421-2 in step S277.

The CPU 441 of the switching center 423 then determines in step S255 whether the feature information has been obtained. If the feature information has been obtained, in step S256, the CPU 441 controls the quality-improving data calculator 424 to calculate quality-improving data based on the obtained feature information and to calculate the optimal quality-improving data based on the calculated quality-improving data, and updates the user information database. The processing is then completed.

If it is determined in step S255 that the feature information has not been obtained from the cellular telephone 421-1 or 421-2, the CPU 441 of the switching center 423 completes the processing by skipping step S256.

As described above, the feature information is supplied to the switching center 423 from the cellular telephones 421-1 and 421-2, the optimal quality-improving data is calculated in the quality-improving data calculator 424, and the updated user information database is stored in the storage unit 425. This makes it possible to reduce the load on the cellular telephone 101 concerning the processing of quality-improving data.

Figure 35:
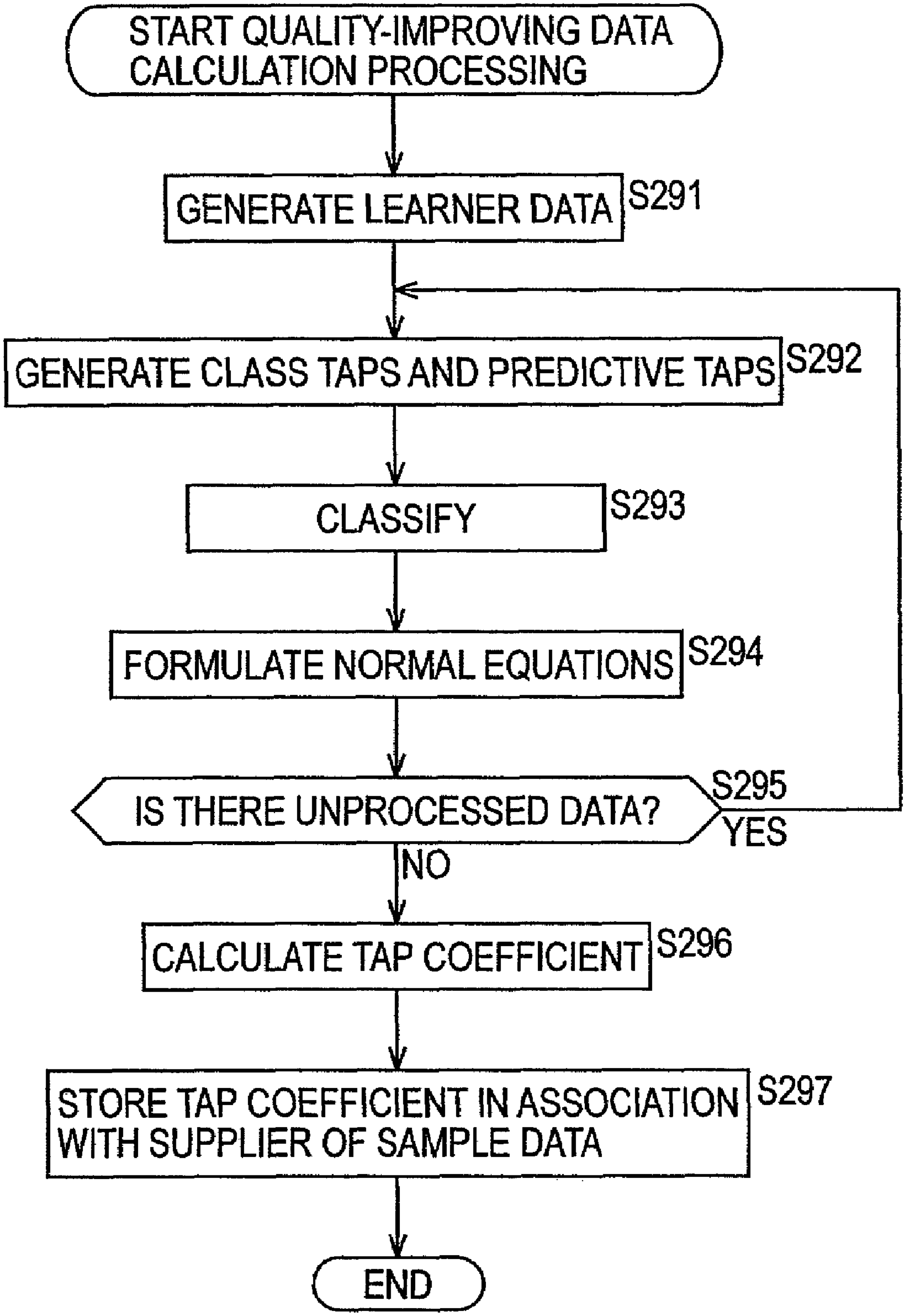
FIG. 35 is a flowchart illustrating quality-improving data calculation processing.

Quality-improving data calculation processing performed by the quality-improving data calculator 424 shown in FIG. 33 is described below with reference to the flowchart of FIG. 35.

In the quality-improving data calculator 424 shown in FIG. 33 for calculating tap coefficients from non-compressed voice data as quality-improving data, sample data, which is non-compressed voice data, supplied from the communication unit 464 is supplied to the buffer 141. Then, after obtaining a predetermined amount of sample data, the quality-improving data calculation processing is started.

In step S291, the learner data generator 142 sets the voice data stored in the buffer 141 to be supervisor data, and generates learner data from the supervisor data. The learner data generator 142 then supplies the learner data to the learner data memory 143, and the process proceeds to step S292.

In step S292, the predictive tap generator 144 selects one voice sample data as the supervisor data stored in the buffer 141, and reads some voice samples as the learner data stored in the learner data memory 143 for the selected supervisor data so as to generate predictive taps, and supplies them to the adder 147.

Also in step S292, as in the predictive tap generator 144, the class tap generator 145 generates class taps for the selected data and supplies them to the classification unit 146.

After step S292, the process proceeds to step S293 in which the classification unit 146 performs classification based on the class taps supplied from the class tap generator 145 and supplies the resulting class codes to the adder 147.

The process proceeds to step S294 in which the adder 147 reads the selected data from the buffer 141 and calculates components in the matrix A and the vector v from the selected data and the predictive taps from the predictive tap generator 144. The adder 147 then adds the components in the matrix A and the vector v determined from the selected data and the predictive taps to the components in the matrix A and the vector v corresponding to the class codes output from the classification unit 146 among the components stored in the user component storage unit 149. The process then proceeds to step S295.

In step S295, the predictive tap generator 144 determines whether there is unselected supervisor data in the buffer 141. If there is unselected data, the process returns to step S292 in which processing similar to the above-described processing is repeated on the unselected supervisor data.

If it is determined in step S295 that there is no unselected supervisor data in the buffer 141, the adder 147 supplies the normal equations in equation (8) consisting of the components in the matrix A and the vector v for each class stored in the user component storage unit 149 to the tap-coefficient determining unit 150. The process then proceeds to step S296.

In step S296, the tap-coefficient determining unit 150 solves the normal equations for each class supplied from the adder 147 so as to determine tap coefficients for each class. Then, the process proceeds to step S297. In step S297, the tap-coefficient determining unit 150 supplies the tap coefficients for each class to the storage unit 425 together with the updating information, and stores them in association with the supplier of the sample data by overwriting the old tap coefficients by the new tap coefficients. The quality-improving-data calculation processing is then completed.

As is seen from the foregoing description, in the quality-improving data calculator 424, quality-improving data calculation processing (learning processing) is conducted based on new voice data and voice data used for the previous learning. Then, as the user makes more telephone calls, tap coefficients for decoding coded voice data into voice as faithful as possible to the user's real voice can be obtained. Accordingly, at the communicating party of the cellular telephone, which is the supplier of the feature information, by decoding the coded voice data by using such tap coefficients, processing suitable for the characteristic of the user's voice can be performed, thereby obtaining the sufficiently improved decoded voice data. As the user uses more the cellular telephone 421, the higher quality voice can be output from the communicating party.

In the above-described example, the quality-improving data is calculated and stored in the switching center 423. However, as shown in FIG. 36, the quality-improving data may be calculated in the cellular telephone, which extracts features, and the calculated quality-improving data (user information database) may be stored in the switching center 423.

Figure 36:
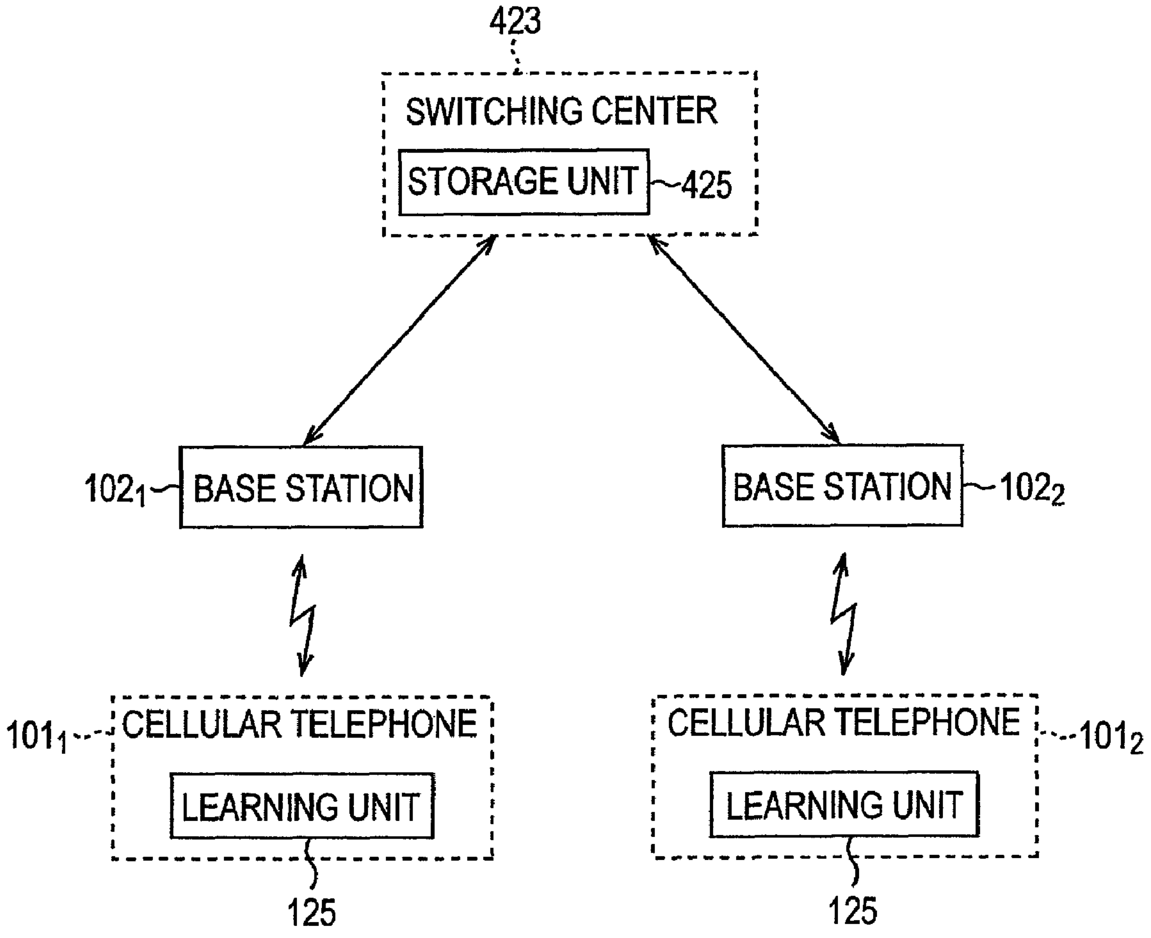
FIG. 36 is a block diagram illustrating another example of the configuration of the transmission system to which the present invention is applied.

In FIG. 36, the cellular telephone 101$_1$ and 101$_2$ each has the learning unit 125 in the transmitter 113, as in the learning unit 125 shown in FIG. 3, so as to generate tap coefficients (quality-improving data) used in the classification adaptive processing.

The switching center 423 is provided with the storage unit 425, as in FIG. 32, in which a user information database for associating optimal quality-improving data with user information, such as telephone numbers, is stored.

Figure 37:
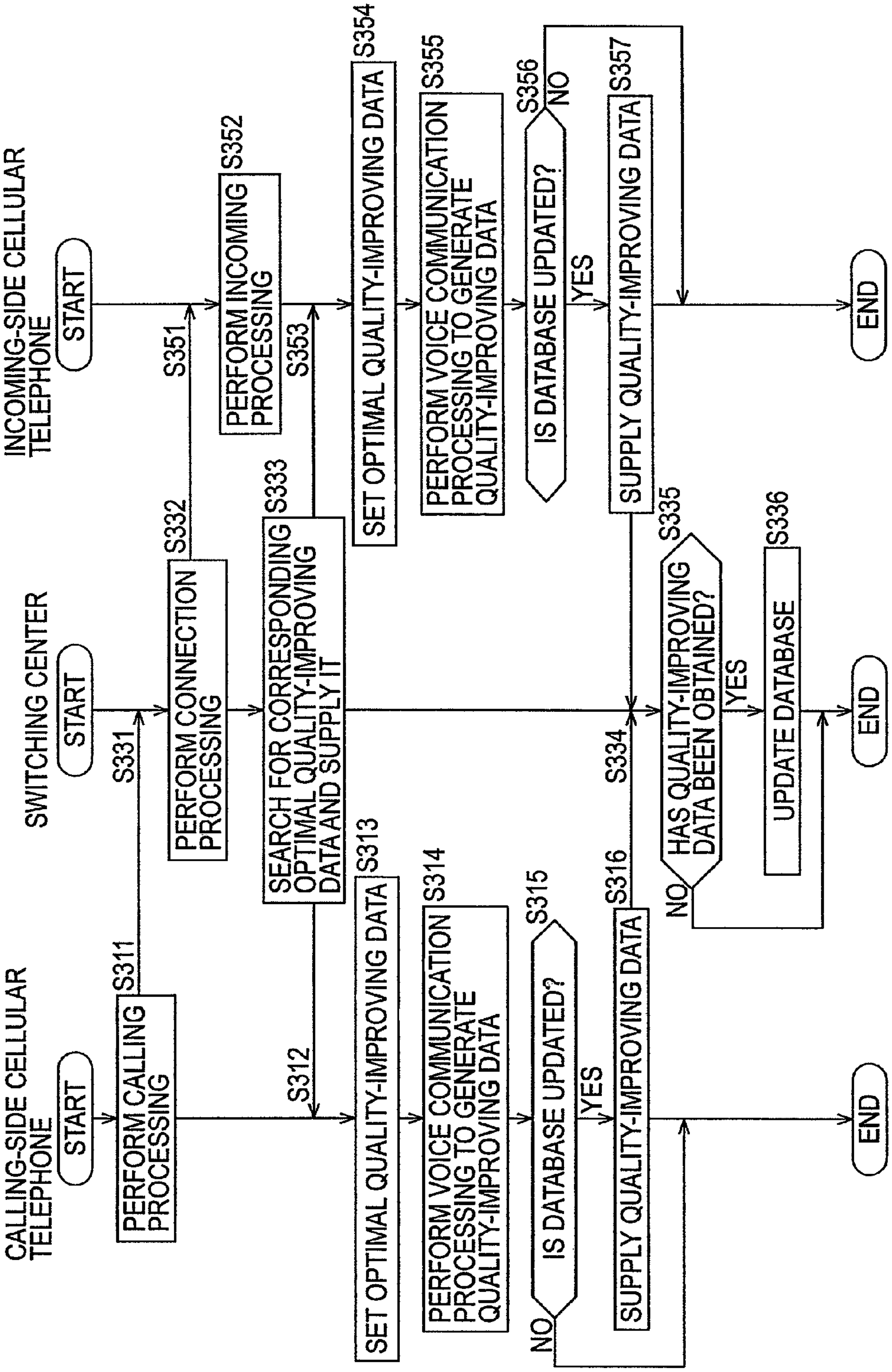
FIG. 37 is a flowchart illustrating processing performed by the transmission system shown in FIG. 36.

A description is now given, with reference to the flowchart of FIG. 37, of the processing performed by the individual devices in the transmission system shown in FIG. 36 when, for example, the cellular telephone 101$_1$ makes a telephone call to the cellular telephone 101$_2$ In step S311, based on a user's instruction, the transmitter 113 of the cellular telephone 101$_1$, which is a telephone at the calling side, performs calling processing for the cellular telephone 101$_2$ owned by the user, which is the communicating party, and accesses the switching center 423 to make a connection request.

In step S331, the CPU 441 of the switching center 423 receives the connection request. Then, in step S332, the CPU 441 controls the communication unit 464 to perform connection processing and to access the cellular telephone 101$_2$, which is the telephone at the incoming side, thereby making a connection request.

In step S351, the transmitter 113 and the receiver 114 of the cellular telephone 101$_2$ receive the connection request, and then, in step S352, the transmitter 113 and the receiver 114 perform incoming processing to establish a connection with the cellular telephone 101$_1$.

After establishing a connection, in step S333, the CPU 441 of the switching center 423 searches the user information database stored in the storage unit 425 for the optimal quality-improving data corresponding to the cellular telephones 101$_1$ and 101$_2$. If the optimal quality-improving data exists, the CPU 441 controls the communication unit 464 to supply the optimal quality-improving data to the corresponding cellular telephones. If the corresponding optimal quality-improving data does not exist, the CPU 441 of the switching center 423 searches the default database stored in the storage unit 425 for the corresponding default data, and controls the communication unit 464 to supply the default data, instead of the optimal quality-improving data, to the cellular telephones.

In step S312, the receiver 114 of the cellular telephone 101$_1$ receives the optimal quality-improving data (or default data) from the switching center 423, and then, in step S313, the receiver 114 sets the obtained data.

After setting the optimal quality-improving data (or default data), in step S314, the transmitter 113 and the receiver 114 of the cellular telephone 101$_1$ perform voice communication processing with the cellular telephone 101$_2$, and generate quality-improving data based on features generated in the voice communication processing.

After finishing the voice communication processing to disconnect the line with the cellular telephone 101$_2$, in step S315, the transmitter 113 of the cellular telephone 101$_1$ determines based on a user's instruction input via the operation unit 115 whether the user information database is to be updated. If it is determined that the user information database is to be updated, in step S316, the transmitter 113 supplies the generated quality-improving data to the switching center 423, and completes the processing. If it is determined in step S315 that the user information database is not updated, the transmitter 113 completes the processing by skipping step S316.

As in the cellular telephone 101$_1$, in step S353, the receiver 114 of the cellular telephone 101$_2$ receives the optimal quality-improving data (or default data) supplied in step S333. Then, in step S354, the receiver 114 sets the obtained optimal quality-improving data (or default data).

After setting the data, in step S355, the transmitter 113 and the receiver 114 of the cellular telephone 101$_2$ perform voice communication processing with the cellular telephone 101$_1$, and generate quality-improving data based on features generated in the voice communication processing.

After finishing the voice communication processing to disconnect the line with the cellular telephone 101$_1$, in step S356, the transmitter 113 of the cellular telephone 101$_2$ determines based on a user's instruction input via the operation unit 115 whether the user information database is to be updated. If it is determined that the user information database is to be updated, in step S357, the transmitter 113 supplies the generated quality-improving data to the switching center 423, and completes the processing. If it is determined in step S356 that the user information database is not updated, the transmitter 113 completes the processing by skipping step S357.

After supplying the optimal quality-improving data (or default data) in step S333, in step S334, the CPU 441 of the switching center 423 may receive the quality-improving data supplied from the cellular telephone 101$_1$ in step S316 or the quality-improving data supplied from the cellular telephone 101$_2$ in step S357.

In step S335, the CPU 441 of the switching center 423 determines whether the quality-improving data has been obtained. If the quality-improving data has been obtained, in step S336, the CPU 441 controls the storage unit 425 to update the user information database by reflecting the obtained quality-improving data in the user information database. The processing is then completed.

If it is determined in step S335 that the quality-improving data has not been obtained from the cellular telephone 101$_1$ or 101$_2$, the CPU 441 of the switching center 423 completes the processing by skipping step S336.

As described above, the quality-improving data generated in the cellular telephones 101$_1$ and 101$_2$ is supplied to the switching center 423, and the user information database stored in the storage unit 425 of the switching center 423 is updated based on the supplied quality-improving data. This eliminates the need for the cellular telephone 101 to store the user information database, thereby saving the space in the storage area.

In the above-described example, the quality-improving data is calculated in the cellular telephone 101$_1$ or 101$_2$, which extracts features, and the calculated quality-improving data (user information database) is stored in the switching center 423. Conversely, as shown in FIG. 38, quality-improving data may be calculated in the switching center 423, and the calculated quality-improving data may be supplied to the cellular telephones and be stored therein.

Figure 38:
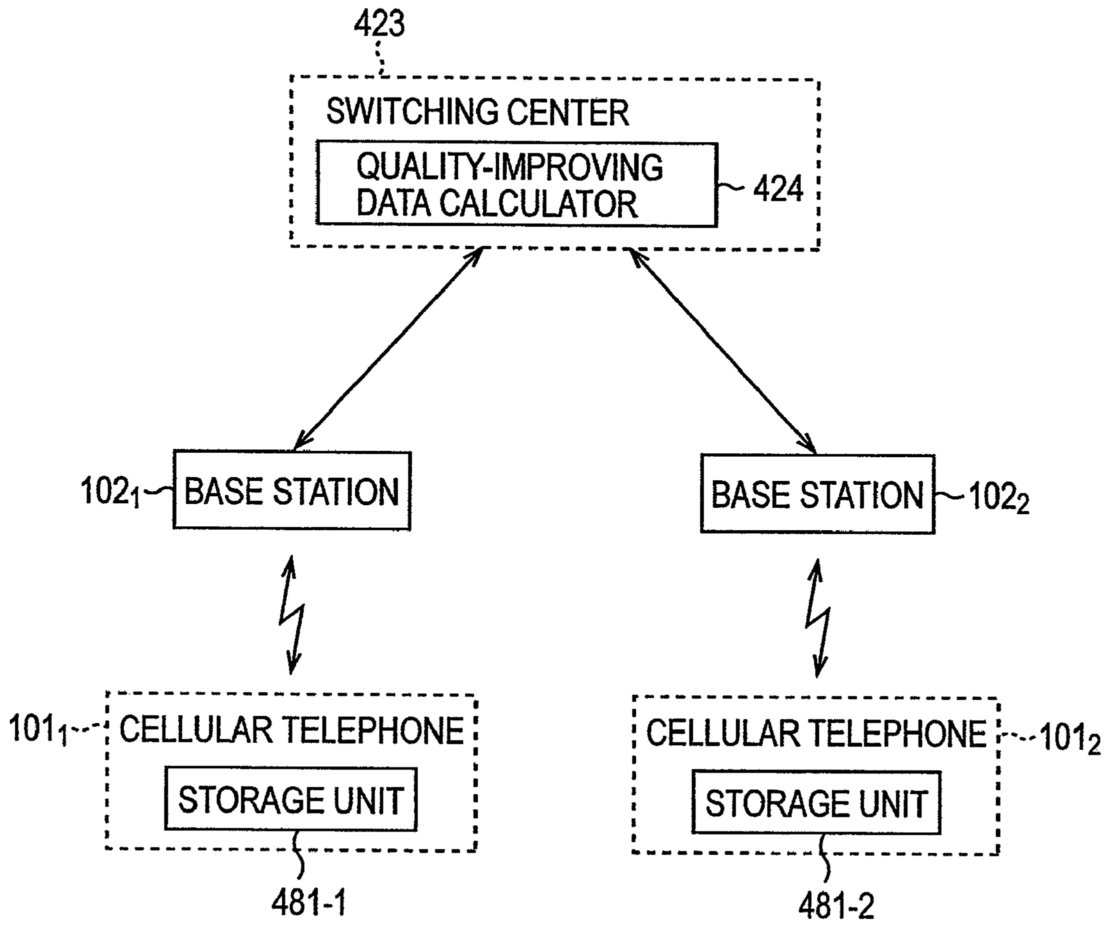
FIG. 38 is a block diagram illustrating another example of the configuration of the transmission system to which the present invention is applied.

In FIG. 38, the cellular telephone 101$_1$ is provided with a storage unit 481-1 including the storage unit 126 shown in FIG. 3 and the storage unit 136 shown in FIG. 4 in which a user information database generated based on quality-improving data supplied from the switching center 423 is stored. The cellular telephone 101$_2$ is also provided with a storage unit 481-2 similar to the storage unit 481-1 in which a user information database generated based on the quality-improving data supplied from the switching center 423 is stored.

As in FIG. 32, the switching center 423 is provided with the quality-improving data calculator 424 so as to calculate quality-improving data based on feature information supplied from the cellular telephones 101 and 101$_2$.

Figure 39:
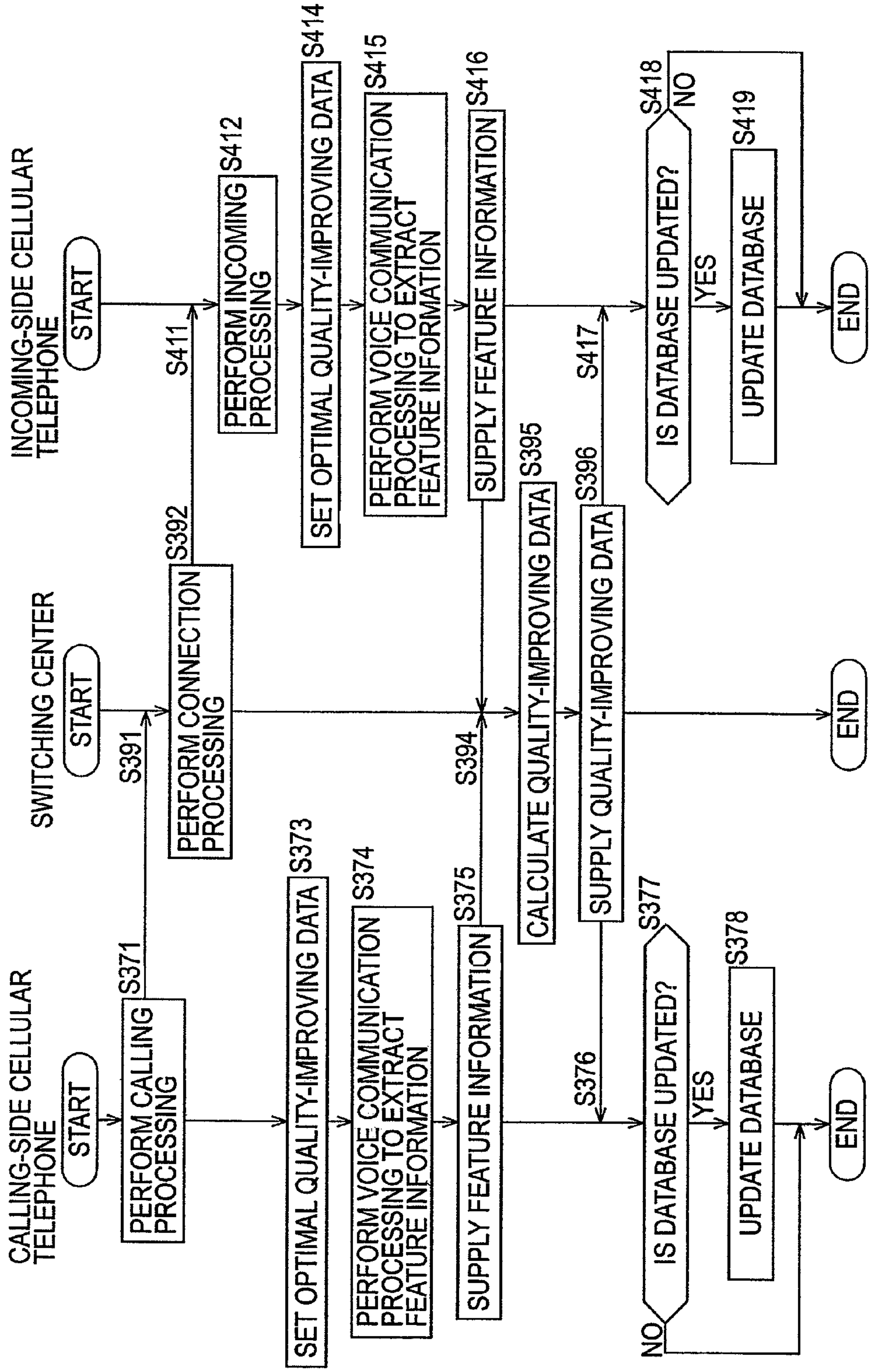
FIG. 39 is a flowchart illustrating processing performed by the transmission system shown in FIG. 38.

A description is given below, with reference to the flowchart of FIG. 39, of the processing performed by the individual devices in the transmission system shown in FIG. 38 when, for example, the cellular telephone 101$_1$ makes a telephone call to the cellular telephone 101$_2$.

In step S371, the transmitter 113 of the cellular telephone 101$_1$, which is the telephone at the calling side, performs calling processing for the cellular telephone 101$_2$ owned by the user, which is the communicating party, based on a user's instruction, and accesses the switching center 423 to make a connection request.

In step S391, the CPU 441 of the switching center 423 receives the connection request. Then, in step S392, the CPU 441 controls the communication unit 464 to perform connection processing and to access the cellular telephone 101$_2$, which is the telephone at the incoming side, thereby making a connection request.

In step S411, the transmitter 113 and the receiver 114 of the cellular telephone 101$_2$ receive the connection request, and then, in step S412, the transmitter 113 and the receiver 114 perform incoming processing to establish a connection with the cellular telephone 101$_1$.

After establishing a connection, in step S373, the receiver 114 of the cellular telephone 101$_1$ searches the user information database stored in the storage unit 481-1 for the optimal quality-improving data. If the optimal quality-improving data has been found, the receiver 114 sets the data. If the optimal quality-improving data does not exist, the receiver 114 sets the predetermined default data. Then, in step S374, the transmitter 113 and the receiver 114 of the cellular telephone 101$_1$ perform voice communication processing with the cellular telephone 101$_2$, and extract feature information generated in the voice communication processing.

After finishing the voice communication processing to disconnect the line with the cellular telephone 101$_2$, in step S375, the transmitter 113 of the cellular telephone 101$_1$ supplies the extracted feature information to the switching center 423.

As in the cellular telephone 101$_1$, after establishing a connection, in step S414, the receiver 114 of the cellular telephone 101$_2$ searches the user information database stored in the storage unit 481-2 for the optimal quality-improving data. If the optimal quality-improving data has been found, the receiver 114 sets the data. If the optimal quality-improving data does not exist, the receiver 114 sets the predetermined default data. Then, in step S415, the transmitter 113 and the receiver 114 of the cellular telephone 101$_2$ perform voice communication processing with cellular telephone 101$_1$, and extract feature information generated in the voice communication processing.

After finishing the voice communication processing to disconnect the line with the cellular telephone 101$_1$, in step S416, the transmitter 113 of the cellular telephone $\mathbf{101}_2$ supplies the extracted feature information to the switching center 423.

In step S394, the CPU 441 of the switching center 423 obtains the feature information supplied from the cellular telephones $\mathbf{101}_1$ and $\mathbf{101}_2$, and supplies the obtained feature information to the quality-improving data calculator 424.

In step S395, the quality-improving data calculator 424 of the switching center 423 calculates quality-improving data based on the supplied feature information. Then, in step S396, the CPU 441 of the switching center 423 supplies the quality-improving data calculated by the quality-improving data calculator 424 to the cellular telephone cellular telephone $\mathbf{101}_1$ or $\mathbf{101}_2$, which is the supplier of the feature information, via the communication unit 464. The processing is then completed.

After supplying the feature information, in step S376, the receiver 114 of the cellular telephone $\mathbf{101}_1$ obtains the quality-improving data supplied from the switching center 423. Then, in step S377, the receiver 114 determines based on a user's instruction input via the operation unit 115 whether the user information database is to be updated. If it is determined that the user information database is to be updated, the receiver 114 updates the user information database stored in the storage unit 481-1 by reflecting the obtained quality-improving data in the user information database. The processing is then completed. If it is determined in step S377 that the user information database is not updated, the receiver 114 completes the processing by skipping step S378.

As in the cellular telephone $\mathbf{101}_1$, after supplying the feature information, in step S417, the receiver 114 of the cellular telephone $\mathbf{101}_2$ obtains the quality-improving data supplied from the switching center 423. Then, in step S418, the receiver 114 determines based on a user's instruction input via the operation unit 115 whether the user information database is to be updated. If it is determined that the user information database is to be updated, in step S419, the receiver 114 updates the user information database stored in the storage unit 418-2 by reflecting the obtained quality-improving data in the user information database. The processing is then completed. If it is determined in step S418 that the user information database is not updated, the receiver 114 completes the processing by skipping step S419.

As described above, the quality-improving data generated in the switching center 423 is supplied to the cellular telephones $\mathbf{101}_1$ and $\mathbf{101}_2$, and the user information database stored in the storage units 481-1 and 481-2 is updated based on the supplied quality-improving data. Accordingly, the load on the cellular telephone 101 concerning the calculation of the quality-improving data can be reduced.

As is seen from the foregoing examples, the calculation processing and storage processing for quality-improving data may be performed by the cellular telephones or the switching center in the transmission system shown in FIG. 1, 30, 36, or 38.

In the foregoing examples, the processing of the switching center is performed by the switching center 423. However, part of or the entire processing of the switching center 423 may be executed by the base station $\mathbf{102}_1$ or $\mathbf{102}_2$. In this case, the base station $\mathbf{102}_1$ or $\mathbf{102}_2$ is configured as, for example, the switching center 423 shown in FIG. 32.

Figure 40:
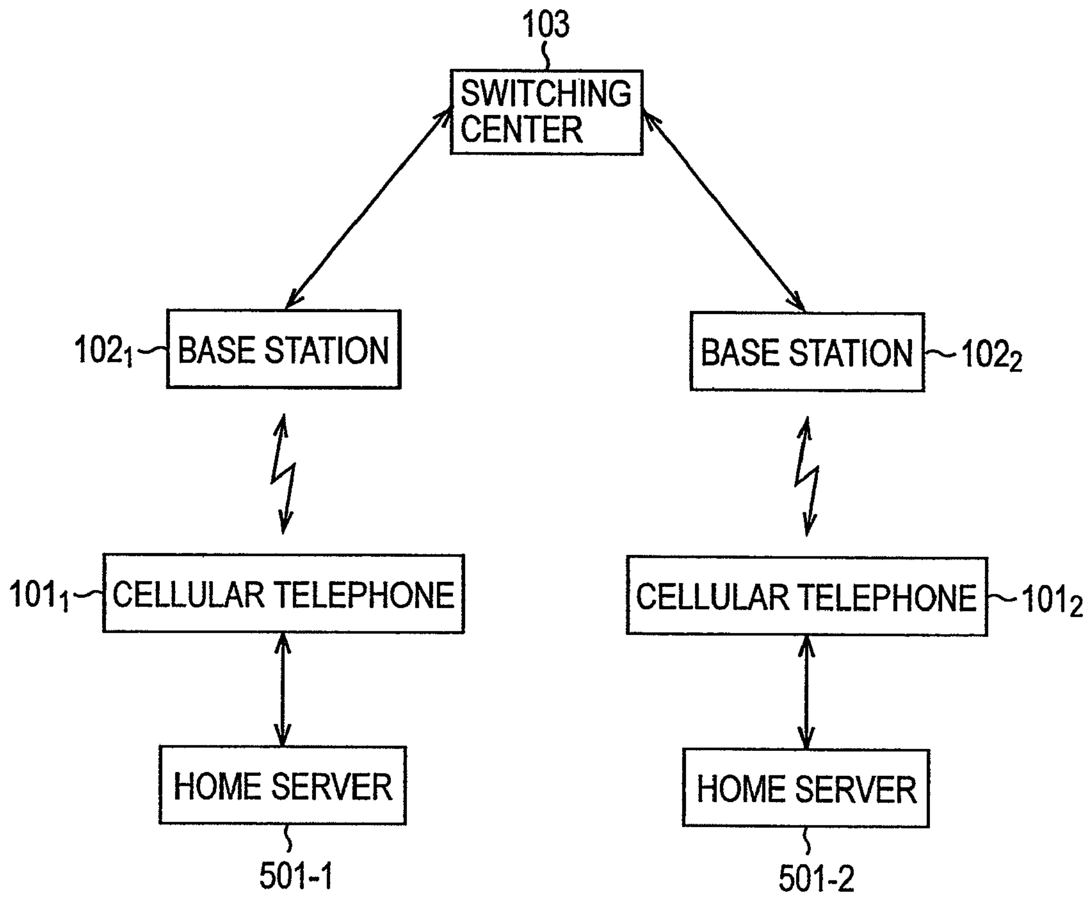
FIG. 40 is a block diagram illustrating another example of the configuration of the transmission system to which the present invention is applied.

Alternatively, as shown in FIG. 40, the calculation processing and storage processing for quality-improving data may be performed by, for example, home servers 501-1 and 501-2 installed in the homes of the users of the cellular telephones $\mathbf{101}_1$ or $\mathbf{101}_2$, respectively.

In FIG. 40, the home server 501-1 is a computer which is installed in the home of the cellular telephone $\mathbf{101}_1$ and which can communicate with the cellular telephone $\mathbf{101}_1$ by wired or wireless means.

Similarly, the home server 501-2 is a computer which is installed in the home of the cellular telephone $\mathbf{101}_2$ and which can communicate with the cellular telephone $\mathbf{101}_2$ by wired or wireless means.

The home servers 501-1 and 501-2 are connected to the cellular telephones $\mathbf{101}_1$ and $\mathbf{101}_2$, respectively, by wired or wireless means, separately from the switching center 423, and perform processing for quality-improving data performed by the switching center 423 in FIG. 30, 36, or 38. The home server 501-1 performs processing for the quality-improving data, which would be performed in the switching center 423, corresponding to the cellular telephone $\mathbf{101}_1$, while the home server 501-2 performs processing for the quality-improving data, which would be performed in the switching center 423, corresponding to the cellular telephone $\mathbf{101}_2$.

The home servers 501-1 and 501-2 are referred to as the "home server 501" unless they have to be particularly distinguished.

Figure 41:
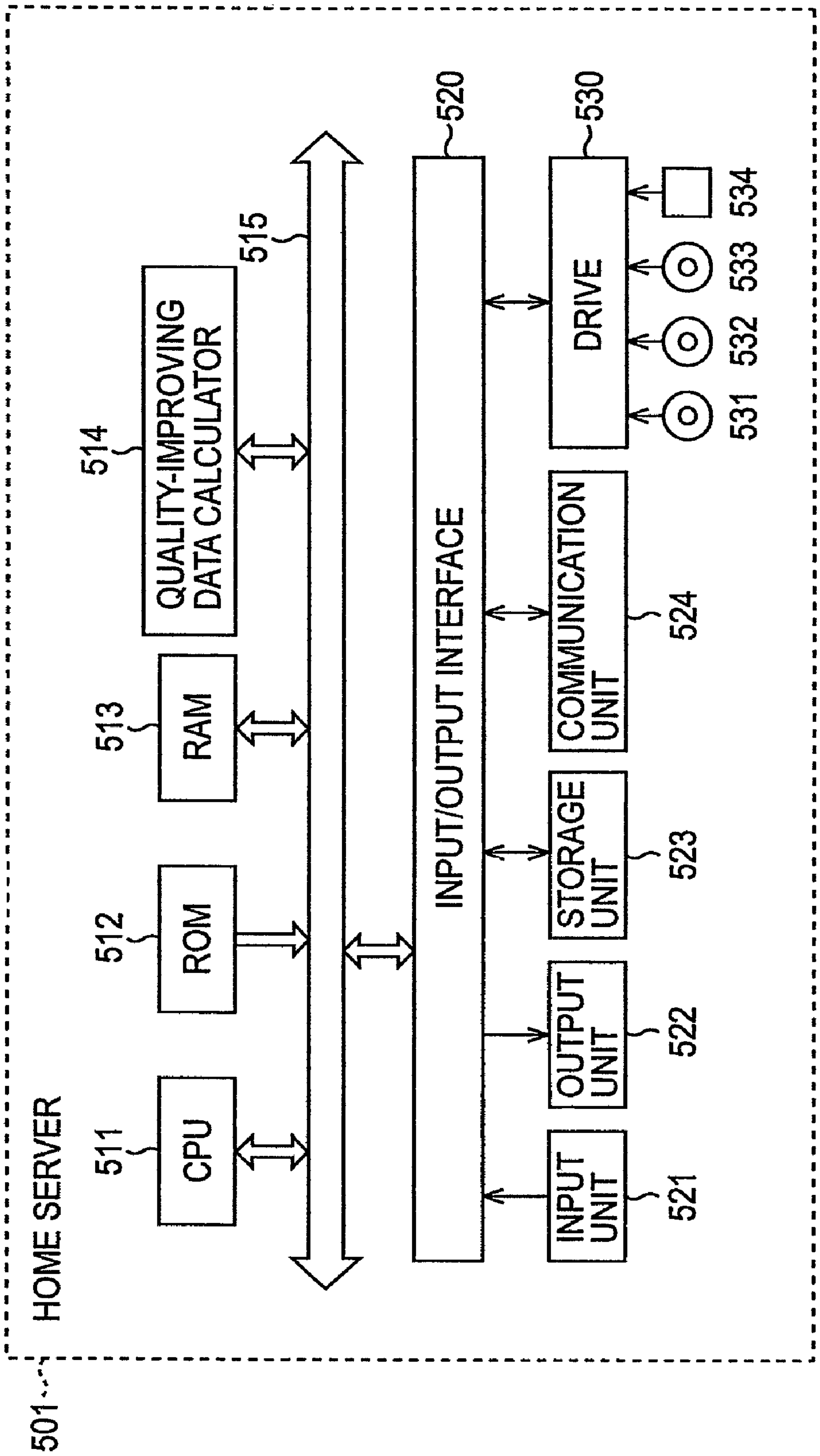
FIG. 41 is a block diagram illustrating an example of the configuration of a home server 501.

FIG. 41 illustrates an example of the internal configuration of the home server 501.

In FIG. 41, the home server 501 is configured similarly to the switching center 423 shown in FIG. 32. That is, elements, such as a CPU 511 through a semiconductor memory 534, of the home server 501 shown in FIG. 41 correspond to the CPU 441 through the semiconductor memory 474, respectively, of the switching center 423 shown in FIG. 32.

The communication unit 524 of the home server 501 communicates with the cellular telephone 101 by wired or wireless means.

Figure 42:
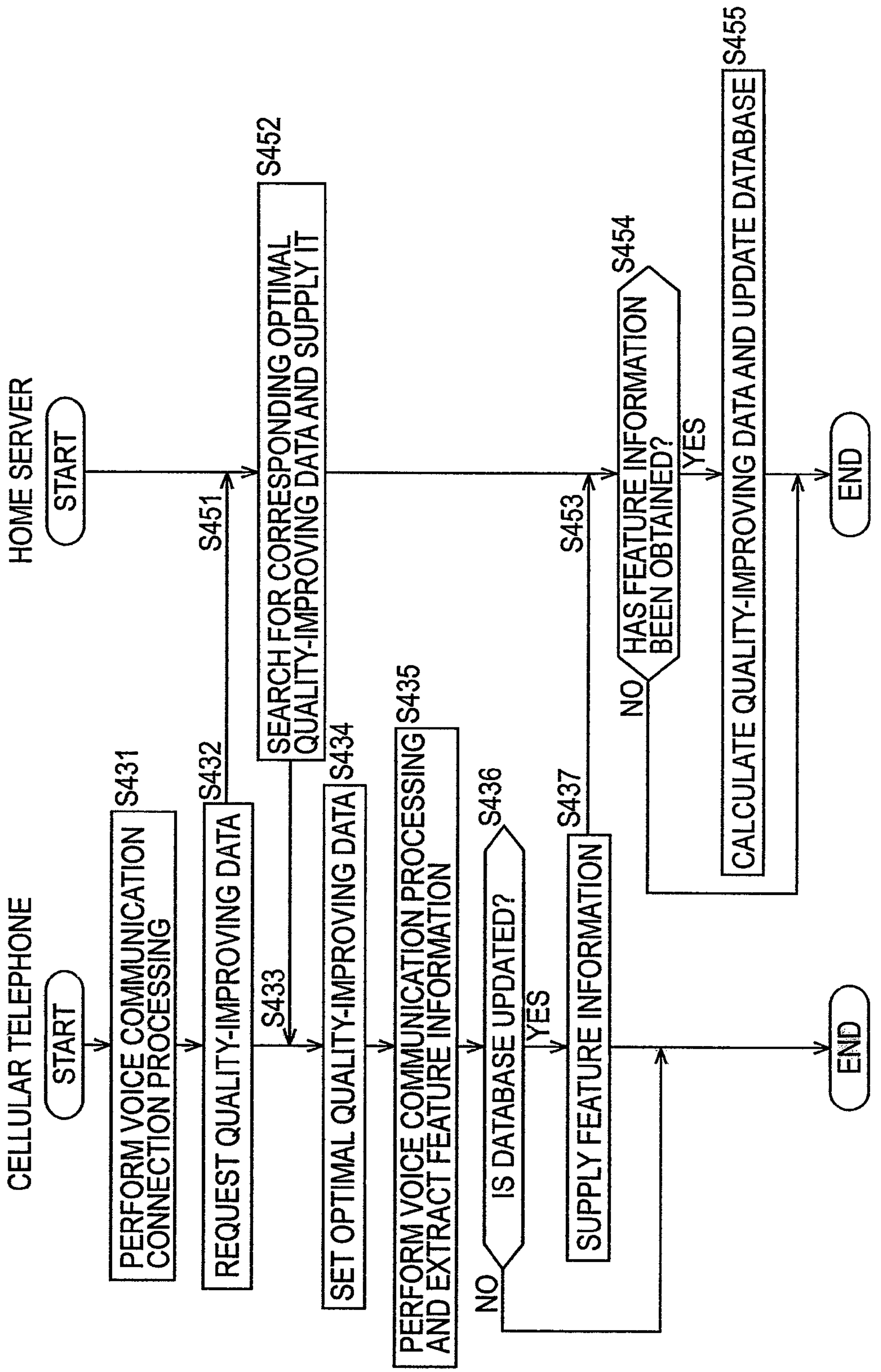
FIG. 42 is a flowchart illustrating processing performed by the transmission system shown in FIG. 40.

A description is now given, with reference to the flowchart of FIG. 42, of processing executed by the home server 501 and the cellular telephone 101 in the transmission system shown in FIG. 40 when the home server 501 performs processing similarly to the switching center 423 of the transmission system shown in FIG. 30, i.e., when the home server 501 performs both the calculation processing and storage processing for quality-improving data.

In step S431, the transmitter 113 and the receiver 114 of the cellular telephone 101 perform voice communication connection processing for connecting the line with the cellular telephone of the communicating party via the switching center 423. That is, if the cellular telephone 101 is the cellular telephone $\mathbf{101}_1$, step S231 of FIG. 34 is performed, and if the cellular telephone 101 is the cellular telephone $\mathbf{101}_2$, steps S271 and S272 of FIG. 34 are performed to connect the line.

After connecting the line, in step S432, the transmitter 113 of the cellular telephone 101 accesses the home server 501 to request it to send quality-improving data. In step S451, the CPU 511 of the home server 501 receives this request, and then, in step S452, the CPU 511 searches the user information database stored in the storage unit 523 for the quality-improving data associated with the user information of the communicating party. If the corresponding quality-improving data has been found, the CPU 511 controls the communication unit 524 to supply the quality-improving data to the cellular telephone 101. If the corresponding quality-improving data does not exist, the CPU 511 controls the communication unit 524 to supply default data to the cellular telephone 101.

In step S433, the receiver 114 of the cellular telephone 101 receives the optimal quality-improving data or the default data supplied from the home server 501, and in step S434, the receiver 114 sets the obtained optimal quality-improving data or default data.

Then, in step S435, the transmitter 113 and the receiver 114 of the cellular telephone 101 perform voice communication processing, and extract feature information concerning the features generated in the voice communication processing.

After finishing the voice communication processing and disconnecting the line with the cellular telephone of the communicating party, in step S436, the transmitter 113 of the cellular telephone 101 determines based on a user's instruction input via the operation unit 115 whether the user information database stored in the storage unit 523 of the home server 501 is to be updated. If it is determined that the user information database is to be updated, in step S437, the transmitter 113 supplies the extracted feature information to the home server 501, and completes the processing. If it is determined in step S436 that the user information database is not updated, the transmitter 113 completes the processing by skipping step S437.

After supplying the optimal quality-improving data (or default data) in step S452, in step S453, the CPU 511 of the home server 501 may receive the feature information supplied from the cellular telephone 101 in step S437.

Then, in step S454, the CPU 511 of the home server 501 determines whether the feature information has been obtained. If it is determined that the feature information has been obtained, in step S455, the CPU 511 controls the quality-improving data calculator 514 to calculate quality-improving data based on the obtained feature information and to calculate new optimal quality-improving data by using the calculated quality-improving data and the information of the user information database stored in the storage unit 523, and updates the user information database stored in the storage unit 523. The processing is then completed.

If it is determined in step S454 that the feature information has not been obtained from the cellular telephone 101, the CPU 511 of the home server 501 completes the processing by skipping step S455.

As described above, the feature information is supplied to the home server 501 from the cellular telephone 101, and the optimal quality-improving data is calculated in the quality-improving data calculator 514 of the home server 501, and the updated user information database is stored in the storage unit 523. Accordingly, the load on the cellular telephone 101 concerning the processing for quality-improving data can be reduced.

Figure 43:
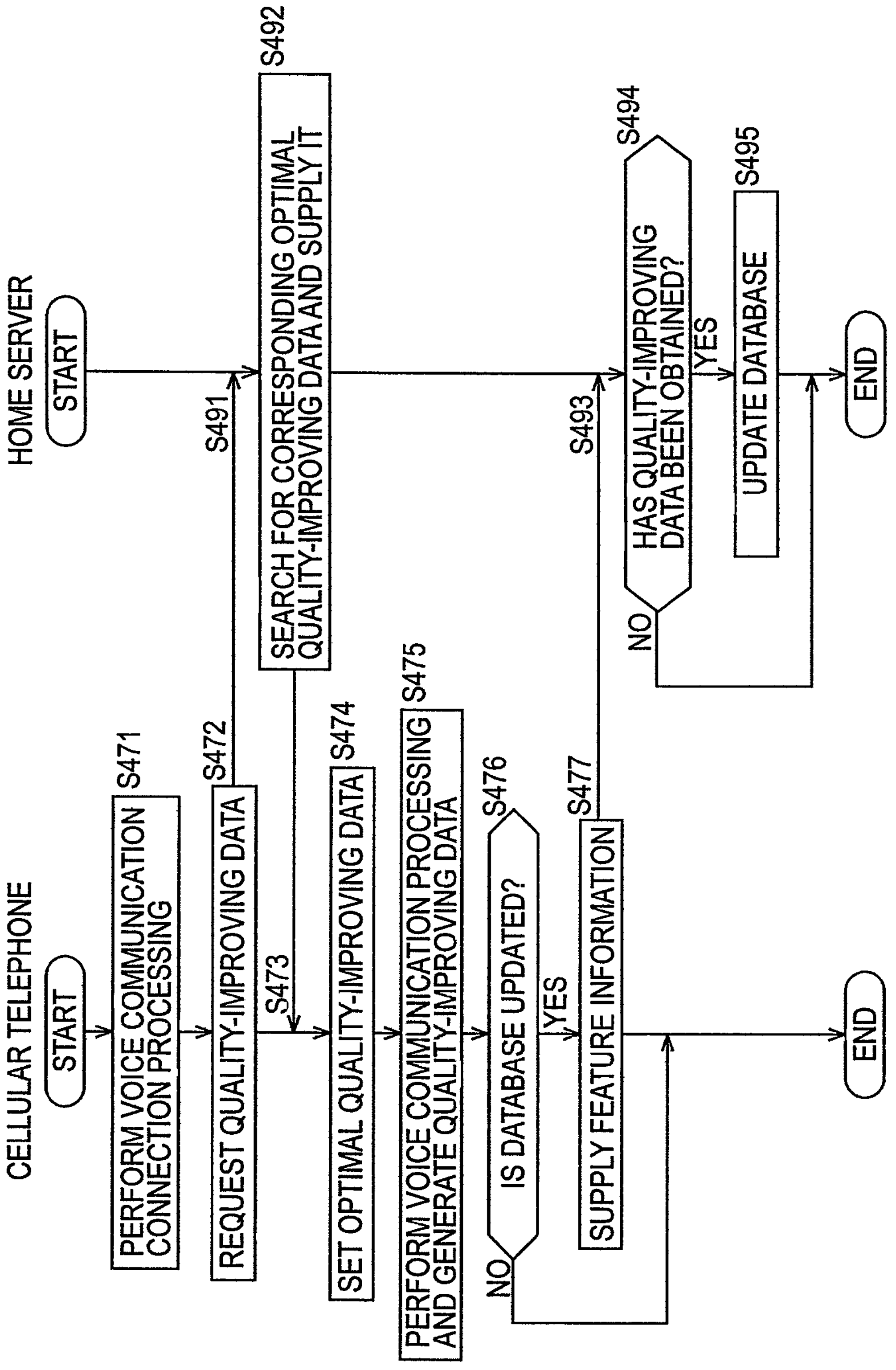
FIG. 43 is a flowchart illustrating another example of the processing performed by the transmission system shown in FIG. 40.

A description is now given, with reference to the flowchart of FIG. 43, of the processing executed by the home server 501 and the cellular telephone 101 in the transmission system shown in FIG. 40 when the home server 501 performs processing similarly to the switching center 423 of the transmission system shown in FIG. 36, i.e., when the home server 501 performs processing for the storage of quality-improving data and when the cellular telephone 101 performs processing for calculating the quality-improving data.

In step S471, the transmitter 113 and the receiver 114 of the cellular telephone 101 perform voice communication connection processing, as in step S431 of FIG. 42.

After connecting the line, as in step S432 of FIG. 42, in step S472, the transmitter 113 of the cellular telephone 101 accesses the home server 501 to request it to send quality-improving data. As in steps S451 and S452 of FIG. 42, in step S491, the CPU 511 of the home server 501 receives this request. Then, in step S492, the CPU 511 searches the user information database of the storage unit 523 for the quality-improving data associated with the user information of the communicating party. If the corresponding quality-improving data has been found, the CPU 511 supplies it to the cellular telephone 101, and if the corresponding quality-improving data has not been found, the CPU 511 supplies default data to the cellular telephone 101.

As in steps S433 and S434 of FIG. 42, in step S473, the receiver 114 of the cellular telephone 101 receives the optimal quality-improving data or default data, and in step S474, the receiver 114 sets the obtained data.

Then, in step S475, the transmitter 113 and the receiver 114 of the cellular telephone 101 perform voice communication processing, and generate quality-improving data based on feature information generated in the voice communication processing.

After finishing the voice communication processing and disconnecting the line with the cellular telephone of the communicating party, as in step S436 of FIG. 42, the transmitter 113 of the cellular telephone 101 determines in step S476 based on a user's instruction whether the user information database is to be updated. If it is determined that the user information database is to be updated, in step S477, the transmitter 113 supplies the generated quality-improving data to the home server 501, and completes the processing. If it is determined in step S476 that the user information database is not updated, the transmitter 113 completes the processing by skipping step S477.

If the cellular telephone 101 supplies the quality-improving data in step S477, in step S493, the CPU 511 of the home server 501 receives the quality-improving data.

Then, in step S494, the CPU 511 of the home server 501 determines whether the quality-improving data has been obtained. If it is obtained, in step S495, the CPU 511 calculates new optimal quality-improving data by using the obtained quality-improving data and the information of the user information database stored in the storage unit 523, and updates the user information database of the storage unit 523. The processing is then completed.

If it is determined in step S494 that the quality-improving data has not been obtained from the cellular telephone 101, the CPU 511 of the home server 501 completes the processing by skipping step S495.

As discussed above, the quality-improving data calculated in the cellular telephone 101 is supplied to the home server 501, and the user information database updated in the home server 501 is stored in the storage unit 523. This eliminates the need for the cellular telephone 101 to store the user information database, thereby saving the space of the storage area.

Figure 44:
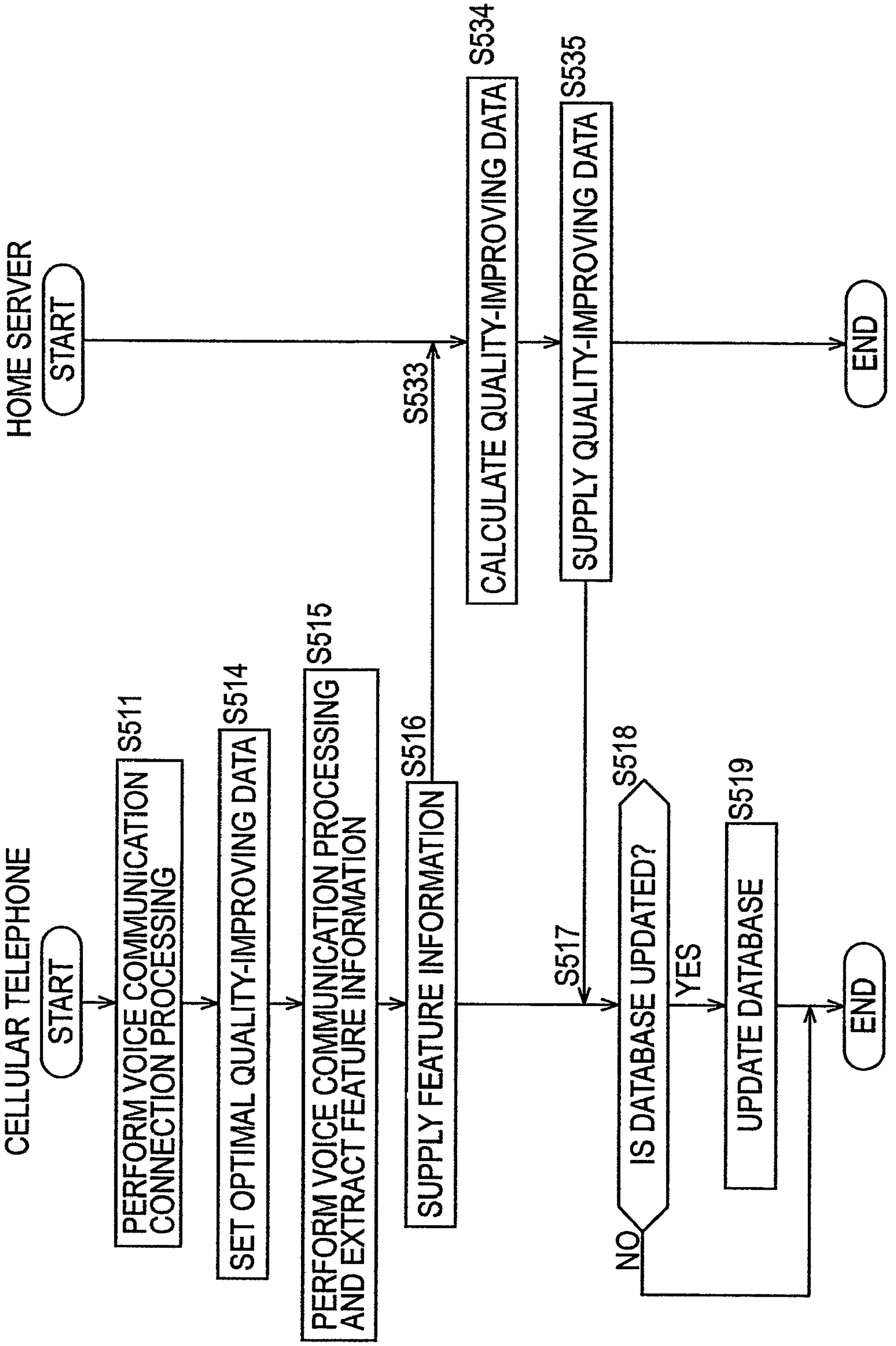
FIG. 44 is a flowchart illustrating still another example of the processing performed by the transmission system shown in FIG. 40.

A description is given below, with reference to the flowchart of FIG. 44, of processing executed by the home server 501 and the cellular telephone 101 in the transmission system shown in FIG. 40 when the home server 501 performs processing similarly to the switching center 423 of the transmission system shown in FIG. 38, i.e., when the home server 501 performs processing for calculating quality-improving data and when the cellular telephone 101 performs processing for the storage of the quality-improving data.

In step S511, as in step S431 of FIG. 42, the transmitter 113 and the receiver 114 of the cellular telephone 101 perform voice communication connection processing.

After connecting the line, in step S514, the transmitter 113 and the receiver 114 of the cellular telephone 101 search the user information database of the storage unit 126 or 136 (storage unit 481) for the optimal quality-improving data, and set the data. If the corresponding quality-improving data has not been found, the transmitter 113 and the receiver 114 of the cellular telephone 101 select the default data from the default database of the default data memory 137, and set the default data.

Then, as in step S435 of FIG. 42, in step S515, the transmitter 113 and the receiver 114 of the cellular telephone 101 perform voice communication processing, and extract feature information concerning the features generated in the voice communication processing.

After finishing the voice communication processing and disconnecting the line with the cellular telephone of the communicating party, in step S516, the transmitter 113 of the cellular telephone 101 supplies the extracted feature information to the home server 501.

In step S533, the CPU 511 of the home server 501 receives the feature information, and supplies it to the quality-improving data calculator 514.

In step S534, the quality-improving data calculator 514 of the home server 501 calculates quality-improving data based on the supplied feature information. Then, in step S535, the CPU 511 of the home server 501 supplies the quality-improving data calculated by the quality-improving data calculator 514 to the cellular telephone 101, which is the supplier of the feature information, via the communication unit 524. The processing is then completed.

In step S517, the receiver 114 of the cellular telephone 101 receives the quality-improving data from the home server 501. Then, the receiver 114 determines in step S518 based on a user's instruction input via the operation unit 115 whether the user information database is to be updated. If it is determined that the user information database is to be updated, in step S519, the receiver 114 updates the user information database by reflecting the obtained quality-improving data in the user information database stored in the storage unit 126 or 136 (storage unit 481). The processing is then completed. If it is determined in step S518 that the user information database is not updated, the receiver 114 completes the processing by skipping step S519.

As described above, the quality-improving data generated in the home server 501 is supplied to the cellular telephone 101, and the user information database stored in the storage unit 126 or 136 (storage unit 481) is updated based on the supplied quality-improving data. This makes it possible to reduce the load on the cellular telephone 101 concerning the calculation of quality-improving data.

The above-described series of processing can be executed by hardware or software. If software is used to execute the series of processing, a corresponding software program is installed into a general-purpose computer.

Figure 45:
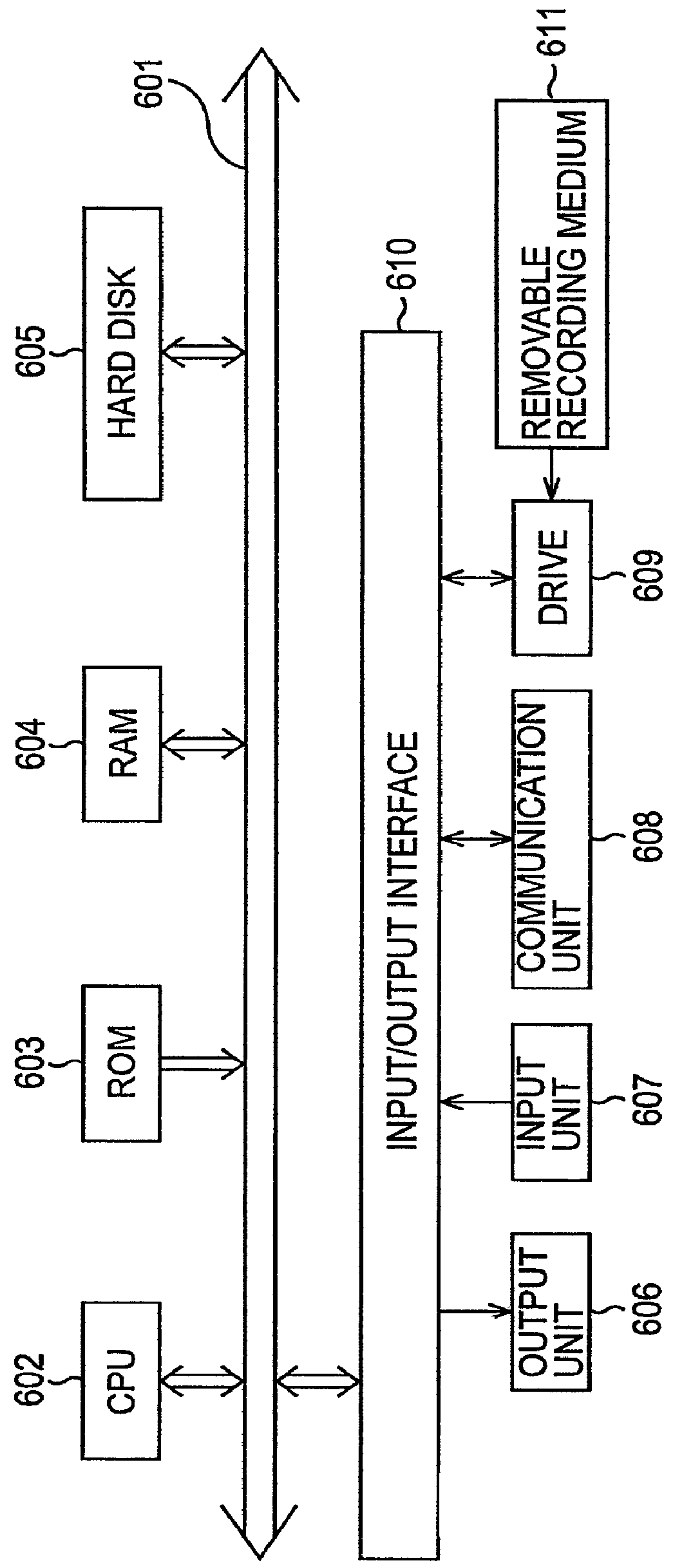
FIG. 45 is a block diagram illustrating an example of the configuration of an embodiment of a computer to which the present invention is applied.

Then, FIG. 45 illustrates an example of the configuration of an embodiment of a computer of the cellular telephone 101 into the program for executing the above-described series of processing is installed.

The program can be recorded in advance in a hard disk 605 or a ROM 603, which serves as a recording medium integrated in the computer.

Alternatively, the program may be temporarily or permanently stored (recorded) in a removable recording medium 611, such as a flexible disk, a CD-ROM (Compact Disc Read Only Memory), an MO (Magneto optical) disk, a DVD (Digital Versatile Disc), a magnetic disk, or a semiconductor memory. The removable recording medium 611 can be provided as so-called package software.

When installing the program from the above-described removable recording medium 611 into the computer, it can be wirelessly transferred from a download site to the computer via a satellite for digital satellite broadcasting, or may be transferred to the computer by wired means via a network, such as a LAN (Local Area network) or the Internet. The computer then receives the program by a communication unit 608 and installs it in the built-in hard disk 605.

The computer has a built-in CPU 602. An input/output interface 610 is connected to the CPU 602 via a bus 601. When an instruction is input by operating an input unit 607, such as a keyboard, a mouse, or a microphone, by the user via the input/output interface 610, the CPU 602 executes a program stored in the ROM 603. The CPU 602 also loads programs to the ROM 604 and executes them: programs stored in the hard disk 605, programs transferred from a satellite or a network, received by the communication unit 608, and installed into the hard disk 605, or programs read from the removable recording medium 411 fixed to a drive 609 and installed into the hard disk 605. Accordingly, the CPU 602 executes the processes indicated by the above-described flowcharts or the processes performed by the elements of the above-described block diagrams. Then, the CPU 602 outputs processing results from an output unit 606, such as an LCD or a speaker, via the input/output interface 610, or sends the processing results via the communication unit 608 or records them in the hard disk 605.

In this specification, steps forming the program for allowing the computer to execute various types of processing do not have to be executed in chronological order designated in the flowcharts. They may be executed concurrently or individually (for example, parallel processing or object processing).

The program may be processed by a single computer, or distribution processing may be executed on the program by using a plurality of computers. The program may be transferred to a remote computer and be executed.

In this embodiment, the telephone number sent from the calling side when a telephone call is made is used as information for allowing the incoming side to specify the calling side. Alternatively, a unique ID (Identification) may be assigned to each user, and the ID can be used as such information.

In this embodiment, the present invention is applied to a transmission system for performing voice communication between cellular telephones. However, the present invention can be widely applied to other systems for performing voice communication.

INDUSTRIAL APPLICABILITY

According to a transmitting apparatus, a transmitting method, and a first program of the present invention, coded voice data can be transmitted. In particular, coded voice data can be transmitted with optimal settings, and high quality voice can be decoded at a receiving side.

According to a receiving apparatus, a receiving method, and a second program of the present invention, coded voice data can be received. In particular, coded voice data can be received with optimal settings, and high quality voice can be decoded.

According to a transceiver apparatus of the present invention, coded voice data can be transmitted and received. In particular, coded voice data can be transmitted and received with optimal settings, and high quality voice can be decoded.

According to a first communication apparatus, a first communication method, and a third program of the present invention, communication can be performed with the transceiver apparatus. In particular, the storage area required for the transceiver can be decreased.

According to a second communication apparatus, a second communication method, and a fourth program of the present invention, communication can be performed with the transceiver apparatus. In particular, the load on the transceiver can be reduced.

The invention claimed is:

1. A receiving apparatus for receiving coded voice data obtained by coding voice data, comprising:

receiving means for receiving the coded voice data;

decoding means for decoding the coded voice data received by the receiving means;

parameter storage means for storing a parameter concerning the reception performed by the receiving means and a parameter concerning the decoding performed by the decoding means in association with specifying information for specifying a transmitting side that transmits the coded voice data; and parameter setting means for selecting and setting, based on the specifying information, the parameter concerning the reception performed by the receiving means and the parameter concerning the decoding performed by the decoding means stored in the parameter storage means, wherein the receiving means further receives quality-improving data obtained by decoding the coded voice data and by improving the quality of decoded voice data, wherein the parameter storage means further stores the quality-improving data received by the receiving means in association with the specifying information.

2. The receiving apparatus according to claim 1, wherein the receiving means receives the quality-improving data while receiving the coded voice data, and the parameter storage means further stores the quality-improving data received by the receiving means while the coded voice data is being received in association with the specifying information.

3. The receiving apparatus according to claim 1, wherein the quality-improving data includes a tap coefficient for classification adaptive processing, a codebook, a parameter concerning a transmission mode, a parameter concerning a coding structure, a parameter concerning creation.

4. The receiving apparatus according to claim 1, wherein the quality-improving data includes a tap coefficient used for, together with the decoded voice data, performing predictive computation for determining a predictive value of quality-improved voice data.

* * * * *